(12) United States Patent
Chen et al.

(10) Patent No.: US 9,325,990 B2
(45) Date of Patent: Apr. 26, 2016

(54) TEMPORAL MOTION VECTOR PREDICTION IN VIDEO CODING EXTENSIONS

(71) Applicant: QUALCOMM Incorporated, San Diego, CA (US)

(72) Inventors: Ying Chen, San Diego, CA (US); Vadim Seregin, San Diego, CA (US); Marta Karczewicz, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 13/937,130

(22) Filed: Jul. 8, 2013

(65) Prior Publication Data

US 2014/0016701 A1   Jan. 16, 2014

Related U.S. Application Data

(60) Provisional application No. 61/669,575, filed on Jul. 9, 2012, provisional application No. 61/673,982, filed on Jul. 20, 2012, provisional application No. 61/694,623, filed on Aug. 29, 2012, provisional application No. 61/708,508, filed on Oct. 1, 2012, provisional application No. 61/747,807, filed on Dec. 31, 2012.

(51) Int. Cl.
*H04N 11/02* (2006.01)
*H04N 19/503* (2014.01)
*H04N 19/105* (2014.01)
(Continued)

(52) U.S. Cl.
CPC ....... *H04N 19/00575* (2013.01); *H04N 19/105* (2014.11); *H04N 19/147* (2014.11); *H04N 19/172* (2014.11)

(58) Field of Classification Search
USPC ........................................ 375/240.01–240.29
See application file for complete search history.

(56) References Cited

U.S. PATENT DOCUMENTS

2004/0234143 A1* 11/2004 Hagai et al. ................... 382/238
2012/0177123 A1   7/2012 Zhou
2012/0269270 A1   10/2012 Chen et al.
(Continued)

FOREIGN PATENT DOCUMENTS

WO   2012171442 A1   12/2012

OTHER PUBLICATIONS

Bross et al., "High efficiency video coding (HEVC) text specification draft 10 (For FDIS & Last Call)," 12th Meeting: Geneva, Ch, Jan. 14-23, 2013, JCTVC-L1003_v34, 310 pp.
(Continued)

*Primary Examiner* — Leron Beck
(74) *Attorney, Agent, or Firm* — Shumaker & Sieffert, P.A.

(57) ABSTRACT

A first reference index value indicates a position, within a reference picture list associated with a current prediction unit (PU) of a current picture, of a first reference picture. A reference index of a co-located PU of a co-located picture indicates a position, within a reference picture list associated with the co-located PU of the co-located picture, of a second reference picture. When the first reference picture and the second reference picture belong to different reference picture types, a video coder sets a reference index of a temporal merging candidate to a second reference index value. The second reference index value is different than the first reference index value.

27 Claims, 12 Drawing Sheets

(51) Int. Cl.
H04N 19/147 (2014.01)
H04N 19/172 (2014.01)

(56) References Cited

U.S. PATENT DOCUMENTS

| | | | | |
|---|---|---|---|---|
| 2012/0320984 | A1* | 12/2012 | Zhou | 375/240.16 |
| 2013/0004093 | A1* | 1/2013 | Sugio et al. | 382/236 |
| 2013/0114717 | A1 | 5/2013 | Zheng et al. | |
| 2013/0272404 | A1* | 10/2013 | Park et al. | 375/240.15 |
| 2013/0301736 | A1* | 11/2013 | Sugio et al. | 375/240.16 |
| 2013/0343459 | A1* | 12/2013 | Bici et al. | 375/240.16 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 6," 8th Meeting: San Jose, CA, USA, Feb. 1-10, 2012, JCTVC-H1003, 259 pp.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen, et al., "AHG10: Motion related hooks for HEVC multiview/3DV extension based on long-term reference pictures", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16 ), No. JCTVC-J0121, XP030112483, 8 pp.

Chen, et al., "AHG10: On video parameter set for HEVC extensions," JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0124, XP030112486, 15 pp.

Chen, et al., "AHG12: Hooks for temporal motion vector prediction and weighted prediction in HEVC multiview/3DV extension", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-10353, XP030112116, 7 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pp.

ITU-T H.263, "Video Coding for Low Bit Rate Communication", Series H: Audiovisual and Multimedia Systems, Infrastructure of audiovisual services—Coding of moving video, Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

ITU-T Rec. H.261 (Dec. 1990), "Line Transmission on Non-Telephone Signals, Video Codec for Audiovisual Services AT $p \times 64$ kbit/s", 32 pp.

Schwarz, et al., "Description of 3D Video Technology Proposal by Fraunhofer HHI (HEVC compatible; configuration A)," ISO/IEC JTC1/SC29/WG11 MPEG2011/M22570, Geneva, Switzerland, Nov. 2011, 48 pp.

Schwarz, et al., "Description of 3D Video Technology Proposal by Fraunhofer HHI (HEVC compatible, configuration B)", 98. MPEG Meeting; Nov. 28, 2011-Dec. 2, 2011; Geneva; (Motion Picture Expert Group or ISO/IEC JTC1/SC29/WG11), No. m22571, Nov. 22, 2011, XP030051134; 46 pp.

Schwarz, et al., "Test Model under Consideration for HEVC based 3D video coding," ISO/IEC JTC1/SC29/WG11 MPEG2011/N12559, Feb. 2012, San Jose, CA, USA, 44 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Search Report and Written Opinion from U.S. International Application No. PCT/US2013/049751, dated Nov. 18, 2014, 11 pp.

Lee et al., "Disparity vector prediction in MVC", JVT Meeting; MPEG Meeting; Apr. 21-27, 2007; San Jose, CA, US; (Joint Video Team of ISO/IEC JTC1/SC29/WG11 and ITU-T SG.16), No. JVT-W104, XP030007064, 8 pp.

Takahashi, et al., "Descriptions of 3D Video Coding Proposal (HEVC-Compatible Category) by Sony", MPEG Meeting; Nov. 2011, Geneva; (Motion Picture Expert Group or ISO/IEC JTC1/SC29/WG11), No. m22566, XP030051129, 36 pp.

International Preliminary Report on Patentability from International Application No. PCT/US2013/049751, dated Jan. 22, 2015, 8 pp.

International Preliminary Report on Patentability from International Application No. PCT/US2013/049751, dated Jun. 18, 2015, 9 pp.

Response to Written Opinion dated Nov. 18, 2014, from International Application No. PCT/US2013/049751, filed on Feb. 18, 2015, 6 pp.

Second Written Opinion dated Apr. 20, 2015, from International Application No. PCT/US2013/049751, 7 pp.

Response to Second Written Opinion dated Apr. 20, 2015, from International Application No. PCT/US2013/049751, filed on May 20, 2015, 28 pp.

\* cited by examiner

US 9,325,990 B2

TEMPORAL MOTION VECTOR PREDICTION IN VIDEO CODING EXTENSIONS

This application claims the benefit of:
U.S. Provisional Patent Application No. 61/669,575, filed Jul. 9, 2012,
U.S. Provisional Patent Application No. 61/673,982, filed Jul. 20, 2012,
U.S. Provisional Patent Application No. 61/694,623, filed Aug. 29, 2012,
U.S. Provisional Patent Application No. 61/708,508, filed Oct. 1, 2012, and
U.S. Provisional Patent Application No. 61/747,807, filed Dec. 31, 2012,
the entire content of each of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards that have been developed, or are under development, make use of multiview coding aspects. For example, different views may transmit left and right eye views to support 3D video, or different views may be used to generate a composite 3D rendition. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques to support more efficient temporal motion vector prediction (TMVP) in video codecs e.g., High-Efficiency Video Coding (HEVC) and extensions of HEVC. In addition, this disclosure describes techniques to improve the coding efficiency of motion prediction in HEVC extensions. In some instances, an initial reference picture in a reference picture list associated with a current video unit and a reference picture indicated by a reference index of a temporal motion vector predictor (TMVP) for the current video unit belong to different reference picture types. In such instances, a video coder may set a reference index of a temporal merging candidate to a value that indicates a position in the reference picture list other than an initial position of the reference picture list. The reference index of the temporal merging candidate indicates a position in the reference picture list associated with the current video unit.

In one example, this disclosure describes a method of decoding video data, wherein a first reference index value indicates a position, within a reference picture list associated with a current prediction unit (PU) of a current picture, of a first reference picture, wherein a reference index of a co-located PU of a co-located picture indicates a position, within a reference picture list associated with the co-located PU of the co-located picture, of a second reference picture, and the method comprises: when the first reference picture and the second reference picture belong to different reference picture types, setting a reference index of a temporal merging candidate to a second reference index value, the second reference index value being different than the first reference index value; determining a selected merging candidate from among a plurality of merging candidates in a merging candidate list that includes the temporal merging candidate; determining, based at least in part on motion information specified by the selected merging candidate, a predictive block for the current PU; and generating, based at least in part on the predictive block for the current PU, a reconstructed sample block.

In another example, this disclosure describes a method of encoding video data, wherein a first reference index value indicates a position, within a reference picture list associated with a current PU of a current picture, of a first reference picture, wherein a reference index of a co-located PU of a co-located picture indicates a position, within a reference picture list associated with the co-located PU of the co-located picture, of a second reference picture, and wherein the method comprises: when the first reference picture and the second reference picture belong to different reference picture types, setting a reference index of a temporal merging candidate to a second reference index value, the second reference index value being different than the first reference index value; determining a selected merging candidate from among a plurality of merging candidates in a merging candidate list that includes the temporal merging candidate: and generating a bitstream that includes data that identify the selected merging candidate within the merging candidate list.

In another example, this disclosure describes a video coder comprising one or more processors, wherein a first reference index value indicates a position, within a reference picture list associated with a current PU of a current picture, of a first reference picture, wherein a reference index of a co-located PU of a co-located picture indicates a position, within a reference picture list associated with the co-located PU of the co-located picture, of a second reference picture, and wherein the one or more processors are configured such that when the first reference picture and the second reference picture belong to different reference picture types, the one or more processors set a reference index of a temporal merging candidate in a merging candidate list of the current PU to a second reference index value, the second reference index value being different than the first reference index value.

In another example, this disclosure describes a video coder comprising: means for setting a reference index of a temporal merging candidate of a merging candidate list of a current PU to a first reference index value when a first reference picture and a second reference picture belong to different reference picture types, wherein a second reference index value indicates a position, within a reference picture list associated with the current PU, of the first reference picture, the second reference index value being different than the first reference index value, and wherein a reference index of a co-located PU of a co-located picture indicates a position, within a reference picture list associated with the co-located PU, of the second reference picture.

In another example, this disclosure describes a computer-readable storage medium that stores instructions that, when executed, configure to a video coder to set a reference index of a temporal merging candidate of a merging candidate list of a current PU to a first reference index value when a first reference picture and a second reference picture belong to different reference picture types, wherein a second reference index value indicates a position, within a reference picture list associated with the current PU, of the first reference picture, the second reference index value being different than the first reference index value, and wherein a reference index of a co-located PU of a co-located picture indicates a position, within a reference picture list associated with the co-located PU, of the second reference picture.

The details of one or more examples of the disclosure are set forth in the accompanying drawings and the description below. Other features, objects, and advantages will be apparent from the description, drawings, and claims.

DETAILED DESCRIPTION

Figure 1:
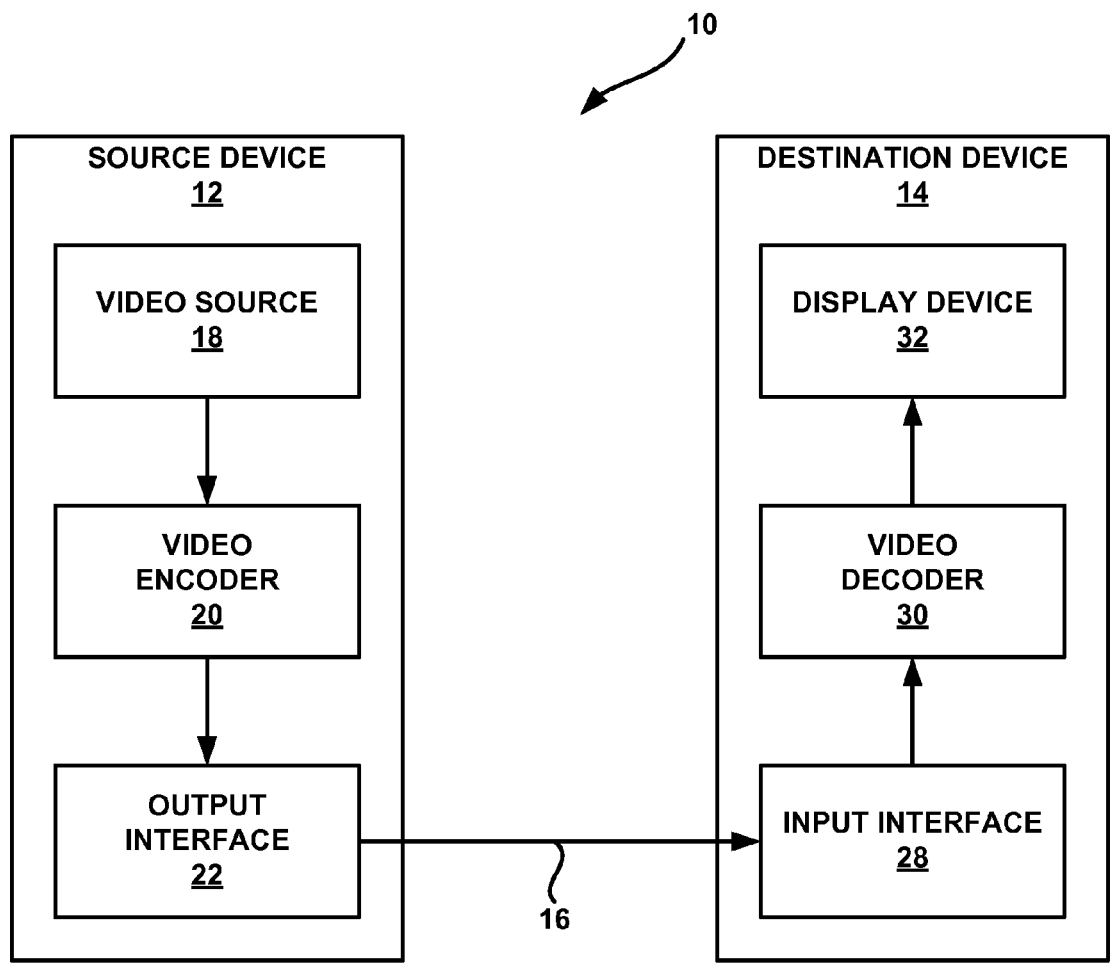
FIG. 1 is a block diagram illustrating an example video coding system that may utilize the techniques described in this disclosure.

In High-Efficiency Video Coding (HEVC), when a video coder (e.g., a video encoder or a video decoder) begins coding a current slice of a current picture, the video coder may generate one or more reference picture lists for the current slice. Each of the reference picture lists includes a list of reference pictures. The data in the reference pictures may be used to predict data in a current slice. In this disclosure, a reference picture list for a slice is associated with a prediction unit (PU) if the PU is in the slice. A reference picture list associated with a PU may also be referred to herein as the PU's reference picture list. Furthermore, each PU of the current picture may have one or more motion vectors, one or more reference indexes, and one or more prediction direction indicators. The motion vectors, reference indexes and prediction direction indicators of a PU may be collectively referred to as the motion information of the PU. A reference index of a PU may indicate a position, within a reference picture list, of a reference picture. The motion vector of the PU may indicate a spatial displacement between a prediction block of the PU and a location in the reference picture.

In some examples, the motion information of a PU may be signaled using a merge/skip mode or an advanced motion vector prediction (AMVP) mode. When a video encoder signals the motion information of a current PU using merge mode, the video encoder may generate a merging candidate list that includes one or more merging candidates. Each of the merging candidates specifies the motion information of a spatial motion vector predictor or a temporal motion vector predictor (i.e., a TMVP). A spatial motion vector predictor may be a PU in the current picture (i.e., the picture that includes the current PU). A TMVP may be a PU in a temporal reference picture (i.e., a picture that occurs at a different time instance than the current picture). A merging candidate that specifies the motion information of a TMVP may be referred to as a "temporal merging candidate."

After generating the merging candidate list, the video encoder may select one of the merging candidates and include, in a bitstream, a syntax element that indicates the position, within the merging candidate list, of the selected merging candidate. When a video decoder decodes the current PU, the video decoder may generate the same merging candidate list. Furthermore, the video decoder may obtain the syntax element from the bitstream and use the syntax element to determine the selected merging candidate in the merging candidate list. The video decoder may then use the motion information indicated by the selected merging candidate as the motion information of the current PU.

In HEVC, the reference indexes of temporal merging candidates are always set to 0. Thus, the reference indexes of temporal merging candidates always indicate the first reference picture in a reference picture list associated with the current PU. Furthermore, if a reference index of a TMVP indicates a picture other than the first reference picture in the reference picture list associated with the current PU, a temporal merging candidate may specify a scaled version of a motion vector of the TMVP. A video coder may generate the scaled version of the motion vector of the TMVP based on a temporal distance between the first reference picture in the reference picture list associated with the current PU and the reference picture indicated by the reference index of the TMVP.

In the multi-view and 3-dimensional video (3DV) coding extensions of HEVC (i.e., MV-HEVC and 3D-HEVC), a bitstream may include multiple views. Each of the views may represent of a scene from a different viewing perspective. Furthermore, MV-HEVC and 3D-HEVC support inter-view prediction. In inter-view prediction, the reference picture list for a slice of a current picture may include one or more reference pictures that are associated with the same time instance as the current picture, but are associated with different views than the current picture. Reference pictures that are associated with the same time instance as the current picture, but are associated with different views than the current picture, may be referred to as "disparity reference pictures" or "inter-view reference pictures." In contrast, reference pictures that are associated with the same view as the current picture, but are associated with different time instances than the current picture, may be referred to as "temporal reference pictures." Disparity reference pictures and temporal reference pictures are said to belong to different "types" of reference pictures (i.e., different "reference picture types").

A reference index of a PU may indicate a position, in a reference picture list, of a disparity reference picture. A motion vector associated with a reference index that indicates a position, in a reference picture list, of a disparity reference picture may be referred to as a "disparity motion vector." Likewise, a reference index of a PU may indicate a position, in a reference picture list, of a temporal reference picture. A motion vector associated with a reference index that indicates a position, in a reference picture list, of a temporal reference picture may be referred to as a "temporal motion vector."

As mentioned above, merging candidate lists may include temporal merging candidates. A temporal merging candidate may specify the motion information based on the motion information of a TMVP. In MV-HEVC and 3D-HEVC, the TMVP itself may have a disparity motion vector and/or a temporal motion vector. If the motion vector of the TMVP is a disparity motion vector and the first reference picture in the reference picture list associated with a current PU is a temporal reference picture, the video coder does not scale the motion vector of the TMVP. Thus, if the motion vector of the TMVP is a disparity motion vector and the first reference picture in the reference picture list associated with the current PU is a temporal reference picture, a temporal merging candidate based on the TMVP specifies a reference index equal to 0 and specifies an unsealed motion vector. Accordingly, the video coder may use the motion vector of such a temporal merging candidate as a temporal motion vector, despite this motion vector originally being a disparity motion vector.

Similarly, if a motion vector of the TMVP is a temporal motion vector and the first reference picture of the reference picture list associated with a current PU is a disparity motion vector, the video coder does not scale the motion vector of the TMVP. Rather, the video coder may generate a temporal merging candidate that specifies a reference index equal to 0 and the unscaled motion vector of the TMVP. The video coder may use the motion vector of the temporal merging candidate as a disparity motion vector, despite this motion vector originally being a temporal motion vector. Using temporal motion vectors as disparity motion vectors and using disparity motion vectors as temporal motion vectors may result in significant inaccuracies. Consequently, in the scenarios where a reference picture indicated by a TMVP and the first reference picture of a corresponding reference picture list associated with a current PU belong to different reference picture types, a video coder is unlikely to use the resulting temporal merging candidate. This may decrease coding efficiency and increase the size of a bitstream.

One or more techniques of this disclosure may resolve this problem. For example, an initial reference picture in a reference picture list associated with the current video unit may be denoted $RF_0$. In this example, a reference index of a temporal motion vector predictor (TMVP) for the current video unit may be denoted $RF_1$. When $RF_0$ and $RF_1$ belong to the same reference picture type, a video coder may set the reference index of a temporal merging candidate to a default value (e.g., 0). Otherwise, if $RF_0$ and $RF_1$ belong to different reference picture types, the video coder may set the reference index of the temporal merging candidate to a value other than the default value. For example, when $RF_0$ and $RF_1$ belong to different reference picture types, a video coder may set a reference index of a temporal merging candidate in a merging candidate list of a current video unit (e.g., a current PU) to a non-default value. The reference index of the temporal merging candidate indicates a position in the reference picture list associated with the current video unit.

Because the video coder does not always set the reference index of the temporal merging candidate to the default value (e.g., 0), the temporal merging candidate may indicate other reference pictures in the reference picture list. This may increase the probability that use of the motion information specified by the temporal merging candidate will yield a better rate/distortion value than the motion information specified by the other merging candidates. Hence, the techniques of this disclosure may increase coding efficiency and decrease bitstream size.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium, such as, e.g., a storage medium remotely accessible via a file server or streaming server or a locally accessible storage device, in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any legal bitstream conforming to MVC-based 3DV always contains a sub-bitstream that is compliant to a MVC profile, e.g. stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262, or ISO/IEC MPEG-2 Visual, ITU-T H.263, ISO/IEC MPEG-4 Visual, and ITU-T H.264, ISO/IEC Visual, or another video coding specification.

In the example of FIG. 1, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 7" is described in Bross et al., "High Efficiency Video Coding (HEVC) text specification draft 7," Joint Collaborative Team on Video Coding (JCT-VC) of ITU-T SG16 WP3 and ISO/IEC JTC1/SC29/WG11, 9th Meeting. Geneva, Switzerland. April-May 2012, which as of Jul. 8, 2013, is available from http://phenix.int-evry.fr/jct/doc_end_user/documents/9_Geneva/wg11/JCTVC-I1003-v5.zip. Another draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10th Meeting, Shanghai, China, October 2012, which as of Jul. 8, 2013, is available from http://phenix.int-evry.fr/jct/doc_end_user/documents/11_Shanghai/wg11/JCTVC-K1003-v13.zip. Another draft of the HEVC standard, referred to as "HEVC Working Draft 9" is described in Bross et al. "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting, Stockholm, SE, July 2012, which as of Jul. 8, 2013, is available from http://phenix.int-evry.fr/jct/doc_end_user/documents/10_Stockholm/wg11/JCTVC-J1003-v8.zip.

Furthermore, there are ongoing efforts to produce a SVC extension for HEVC. The SVC extension of HEVC may be referred to as SHEVC. In addition, a Joint Collaboration Team on 3D Video Coding (JCT-3C) of VCEG and MPEG is developing a 3DV standard based on HEVC, for which part of the standardization efforts includes the standardization of a multi-view codec based on HEVC ("MV-HEVC") and another part for 3DV coding based on HEVC ("3D-HEVC"). The 3DV extension of HEVC may be referred to as HEVC-based 3DV or 3D-HEVC. 3D-HEVC is based, at least in part, on solutions proposed in Schwarz et al, "Description of 3D Video Coding Technology Proposal by Fraunhofer HHI (HEVC compatible configuration A), ISO/IEC JTC1/SC29/WG11, Doc. MPEG11/M22570, Geneva, Switzerland, November/December 2011, and Schwarz et al, "Description of 3D Video Coding Technology Proposal by Fraunhofer HHI (HEVC compatible configuration B), ISO/IEC JTC1/SC29/WG11, Doc. MPEG11/M22571, Geneva, Switzerland, November/December 2011. A reference software description for 3D-HEVC, referred to herein as 3D-HTM, is available at Schwarz et al, "Test Model under Consideration for HEVC based 3D video coding," ISO/IEC JTC1/SC29/WG11 MPEG2011/N12559, San Jose, USA, February 2012. Reference software, namely HTM version 3.0 is available, as of Jul. 8, 2013, from https://hevc.hhi.fraunhofer.de/svn/svn_3DVCSoftware/tags/HTM-3.0/. Alternatively, software for 3D-HTM for 3D-HEVC is available, as of Jul. 8, 2013, from https://hevc.hhi.fraunhofer.de/svn/svn_HEVCSoftware/trunk/.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples. A sample may be a pixel-domain value.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. Video encoder 20 may generate predictive luma, Cb and Cr blocks for luma. Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma. Cb and Cr residual blocks of a CU into one or more luma, Cb and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video decoder 30 may receive a bitstream. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

When a video coder (e.g. video encoder 20 or video decoder 30) begins processing a current picture, the video coder may determine five reference picture set (RPS) subsets for the current picture: RefPicSetStCurrBefore, RefPicSetStCurrAfter, RefPicSetFollBefore, RefPicSetLtFoll, RefPicSetLtCurr, and RefPicSetLtFoll. RefPicSetStCurrBefore may include short-term reference pictures that occur before the current picture in output order and are used for reference by the current picture. RefPicSetStFollBefore may include short-term reference pictures that occur before the current picture in output order and are not used for reference by the current picture. RefPicStCurrAfter may include short-term reference pictures that occur after the current picture in output order and are used for reference by the current picture. RefPicSetStFollAfter may include short-term reference pictures that occur after the current picture in output order and are not used for reference by the current picture. RefPicSetLtCurr may include long-term reference pictures that are used for reference by the current picture. RefPicSetLtFoll may include long-term reference pictures that are not used for reference by the current picture. Video encoder 20 may include, in a slice header, syntax elements (e.g. delta_poc_s0_minus1 syntax elements, used_by_curr_pic_s0_flag syntax elements, delta_poc_s1_minus1 syntax elements, used_by_curr_pic_s1_flag syntax elements, delta_poc_lsb_lt syntax elements, etc.) that video decoder 30 may use to determine RefPicSetStCurrBefore, RefPicSetStCurrAfter, RefPicSetFollBefore, RefPicSetLtCurr, and RefPicSetLtFoll.

As indicated above, when a video coder (e.g., video encoder 20 or video decoder 30) begins coding a current slice of a picture, the video coder may initialize a first reference picture list, which may be referred to as "List 0" or "RefPicList0." Furthermore, if the current slice is a B slice, the video coder may initialize a second reference picture list, which may be referred to as "List 1" or "RefPicList1." The reference picture list initialization may be an explicit mechanism that puts the reference pictures in a reference picture memory (i.e., a decoded picture buffer) into a list based on picture order count ("POC") values of the reference pictures. The POC value of a picture may be aligned with a display order of the picture.

For example, to generate RefPicList0, a video coder (e.g., a video encoder or a video decoder) may generate an initial version of RefPicList0. In the initial version of RefPicList0, reference pictures in RefPicSetStCurrBefore are listed first, followed by reference pictures in RefPicSetStCurrAfter, followed by reference pictures in RefPicSetLtCurr, if available.

In the initial version of RefPicList0, short-term pictures with earlier output order (i.e., reference pictures in RefPicSetStCurrBefore) are firstly inserted into RefPicList0 in ascending order of picture order count (POC) distance to the current picture, then short-term pictures with later output order (i.e., reference pictures in RefPicSetStCurrAfter) are inserted into RefPicList0 in ascending order of POC distance to the current picture, and finally the long-term pictures (i.e., reference pictures in RefPicSetLtCurr) are inserted at the end. A POC distance is the difference between POC values for pictures. A POC is variable that is associated with each picture that indicates the position of the associated picture in output order relative to the output order positions of the other pictures in the same coded video sequence.

Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr. In the initial version of RefPicList1, short-term pictures with later output order (i.e., reference pictures in RefPicSetStCurrAfter) are firstly inserted into RefPicList1 in ascending order of POC distance to the current picture, then short-term pictures with earlier output order (i.e., reference pictures in RefPicSetStCurrBefore) are inserted into RefPicList1 in ascending order of POC distance to the current picture, and finally the long-term pictures (i.e., reference pictures in RefPicSetLtCurr) are inserted at the end. In this way, reference picture list initialization creates default List 0 and List 1 (if the slice is a B slice) based on three RPS subsets: RefPicSetStCurrBefore, RefPicSetStCurrAfter, and RefPicSetLtCurr.

After a video coder has initialized a reference picture list (e.g., RefPicList0 or RefPicList1), the video coder may modify the order of the reference pictures in the reference picture list. In other words, the video coder may perform a reference picture list modification (RPLM) process. For instance, typically a reference picture list construction for the first or the second reference picture list of a B picture includes two steps: reference picture list initialization and reference picture list reordering (modification).

The video coder may modify the order of the reference pictures in any order, including the case where one particular reference picture may appear in more than one position in the reference picture list. For instance, the reference picture list reordering mechanism can modify the position of a picture that was put in the reference picture list during the reference picture list initialization to any new position. Furthermore, the reference picture list reordering mechanism may put any reference picture in the reference picture memory in any position of the reference picture list, even if the reference picture was not in the initial version of the reference picture list. After the reference picture list reordering (modification), some pictures may be put in a very furthest position in the reference picture list. However, if a position of a reference picture exceeds the number of active reference pictures of the list, the video coder does not consider the reference picture to be an entry of the final version of the reference picture list. Video encoder 20 may signal, in a slice header, the number of active reference pictures of each reference picture list. After a video coder constructs a reference picture list (e.g., RefPicList0 or RefPicList1), a reference index to a reference picture list can be used to identify any reference picture included in the reference picture list. In this disclosure, a reference index that identifies a position in RefPicList0 may be referred to as a RefPicList0 reference index and a reference index that identifies a position in RefPicList1 may be referred to as a RefPicList1 reference index.

Video encoder 20 may signal the motion information of a PU using merge mode or advanced motion vector prediction (AMVP) mode. In other words, in HEVC, there are two modes for the prediction of motion parameters, one being the merge mode and the other being AMVP. The motion information of a PU may include motion vector(s) of the PU and reference index(es) of the PU. When video encoder 20 signals the motion information of a current PU using merge mode, video encoder 20 generates a merging candidate list. In other words, video encoder 20 may perform a merging candidate list construction process. The merging candidate list includes a set of merging candidates. The merging candidate list may include merging candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merging candidate from the merging candidate list and may use the motion information indicated by the selected merging candidate as the motion information of the current PU. Video encoder 20 may signal the position in the merging candidate list of the selected merging candidate. For instance, video encoder 20 may signal the selected motion vector parameters by transmitting an index into the merging candidate list. Video decoder 30 may obtain, from the bitstream, the index into the merging candidate list (i.e., a candidate list index). In addition, video decoder 30 may generate the same merging candidate list and may determine, based on the indication of the position of the selected merging candidate, the selected merging candidate. Video decoder 30 may then use the motion information of the selected merging candidate to generate predictive blocks for the current PU. That is, video decoder 30 may determine, based at least in part on the candidate list index, a selected merging candidate in the merging candidate list, wherein the selected merging candidate specifies the motion vector for the current PU. In this way, at the decoder side, once the index is decoded, all motion parameters of the corresponding block where the index points are to be inherited by the current PU.

Skip mode is similar to merge mode. In skip mode, video encoder 20 and video decoder 30 generate and use a merging candidate list in the same way that video encoder 20 and video decoder 30 use the merging candidate list in merge mode. However, when video encoder 20 signals the motion information of a current PU using skip mode, video encoder 20 does not signal any residual data for the current PU. Accordingly, video decoder 30 may use, as a predictive block for the PU, a reference block indicated by the motion information of a selected merging candidate in the merging candidate list.

AMVP mode is similar to merge mode in that video encoder 20 generates a candidate list and selects a candidate from the candidate list. Candidates in an AMVP candidate list may be referred to as motion vector predictor (MVP) candidates. When video encoder 20 signals the motion information of a current PU using AMVP mode, video encoder 20 may signal a motion vector difference (MVD) for the current PU and a reference index in addition to signaling a position of the selected MVP candidate in the candidate list. An MVD for the current PU may indicate a difference between a motion vector of the current PU and a motion vector of the selected candidate from the AMVP candidate list. In uni-prediction, video encoder 20 may signal one MVD and one reference index for the current PU. In bi-prediction, video encoder 20 may signal two MVDs and two reference indexes for the current PU.

Furthermore, when the motion information of a current PU is signaled using AMVP mode, video encoder 30 may obtain, from the bitstream, a MVD for a current PU and a candidate list index. Video decoder 30 may generate the same AMVP candidate list and may determine, based on the indication of the position of the selected MVP candidate in the AMVP candidate list, the selected candidate. Video decoder 30 may recover a motion vector of the current PU by adding a MVD to the motion vector indicated by the selected MVP candidate. That is, video decoder 30 may determine, based at least in part on a motion vector indicated by the selected MVP candidate and the MVD, a motion vector of the current PU. Video decoder 30 may then use the recovered motion vector or motion vectors of the current PU to generate predictive blocks for the current PU.

Figure 2:
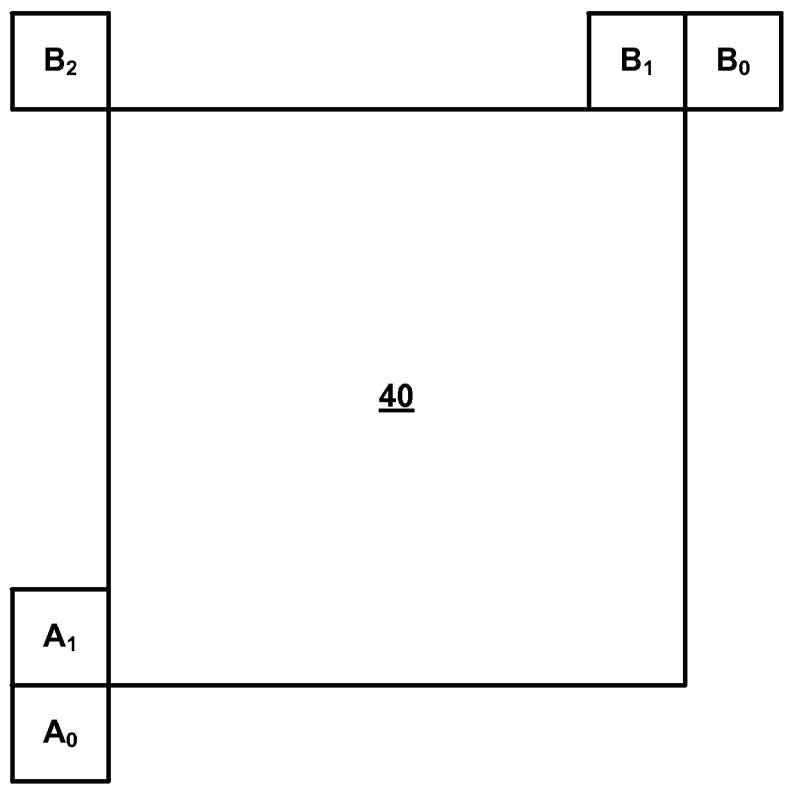
FIG. 2 is a conceptual diagram illustrating example spatial motion vector neighbors relative to a current prediction unit (PU).

As indicated above, candidate lists for merge mode or AMVP may include candidates based on PUs that spatially neighbor a current PU. This disclosure may refer to such PUs as spatially-neighboring PUs or spatial motion vector neighbors. FIG. 2 is a conceptual diagram illustrating example spatial motion vector neighbors relative to a current PU 40. That is, an example relationship between PU 40 and spatially-neighboring PUs of PU 40 is depicted in FIG. 2. In the example of FIG. 2, the spatially-neighboring PUs may be PUs that cover the locations indicated as $A_0, A_1, B_0, B_1,$ and $B_2$. A PU may cover a location when a prediction block of the PU includes the location.

With regard to the example of FIG. 2, a luma location (xP, yP) may specify the top-left luma sample of PU 40 relative to a top-left luma sample of the current picture. Furthermore, the variables nPSW and nPSH may respectively denote the width and height, in luma samples, of PU 40. The top-left luma sample of a PU N relative to the top-left sample of the current picture is (xN, yN), where N denotes a PU covering positions $A_0, A_1, B_0, B_1,$ or $B_2$. For PUs covering positions $A_0, A_1, B_0, B_1,$ or $B_2$, (xN, yN) may be defined as (xP−1, yP+nPSH), (xP−1, yP+nPSH−1), (xP+nPSW, yP−1), (xP+nPSW−1, yP−1) or (xP−1, yP−1), respectively.

As indicated above, a merging candidate list or an AMVP candidate list may include candidates that specify the motion information of PUs that temporally neighbor a current PU. This disclosure may use the term "temporal merging candidate" to refer to a merging candidate that specifies the motion information of a PU that temporally neighbors a current PU. Similarly, this disclosure may use the term "temporal MVP candidate" to refer to an MVP candidate in an AMVP candidate list that specifies the motion information of a PU that temporally neighbors a current PU. This disclosure may use the term "temporal motion vector predictor" or "TMVP" to refer to a PU that temporally neighbors a current PU and whose motion information is specified by a temporal merging candidate or a temporal MVP candidate.

To determine a TMVP, a video coder may first identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, if the current slice (i.e., the slice containing the current PU) is in a B slice and a collocated_from_l0_flag syntax element in a slice header of the current slice indicates that the co-located reference picture is in RefPicList1, the co-located reference picture may be the reference picture in RefPicList1 at a location indicated by a collocated_ref_idx syntax element of the slice header. Otherwise, if the current slice is a P slice or the current slice is a B slice and the collocated_from_10_flag syntax element in the slice header of the current slice indicates that the co-located reference picture is in RefPicList0, the co-located reference picture may be the reference picture in RefPicList0 at a location indicated by the collocated_ref_idx syntax element of the slice header. After the video coder identifies the reference picture list, the video coder may use another syntax element (e.g., collocated_ref_idx), which may be signaled in a slice header, to identify a picture (i.e., the co-located picture) in the identified reference picture list.

The video coder may identify a co-located PU by checking the co-located picture. Either the motion of the right-bottom PU of the CU containing this PU, or the motion of the right-bottom PU within the center PUs of the CU containing the co-located PU is used. The right-bottom PU of the CU containing the co-located PU may be a PU that covers a location immediately below and right of a bottom-right sample of a prediction block of the PU. In other words, the TMVP may be a PU that is in the co-located picture and that covers a location that is co-located with a bottom right corner of the current PU, or the TMVP may be a PU that is in the co-located picture and that covers a location that is co-located with a center of the current PU. Thus, the co-located PU may be a PU that covers a center block of a co-located region of the co-located picture or a PU that covers a bottom-right block of the co-located region of the co-located picture, the co-located region being co-located with the current PU.

The video coder may use the motion vectors identified by the above process (i.e., the motion vectors of the identified TMVP) to generate a merging candidate for merge mode or an MVP candidate for AMVP mode. Furthermore, when the motion vectors of the identified TMVP are used to generate a merging candidate or an MVP candidate, the video coder may scale the motion vectors based on the temporal location (reflected by POC value) of the current picture and the temporal location of the co-located picture. For instance, a video coder may increase the magnitude of a motion vector by greater amounts when a difference between the POC values of the current picture and the co-located picture is greater than when a difference between the POC values of the current picture and the co-located picture is less.

In HEVC, an SPS may include a sps_temporal_mvp_enable_flag syntax element and a slice header may include a pic_temporal_mvp_enable_flag syntax element when the sps_temporal_mvp_enable_flag syntax element is equal to 1. When both the pic_temporal_mvp_enable_flag syntax element and a temporal_id syntax element of a NAL unit that encapsulates the slice header are equal to 0 for a particular picture, no motion vector from pictures before that particular picture in decoding order may be used as a TMVP in decoding of the particular picture or a picture after the particular picture in decoding order. The temporal_id syntax element of a NAL unit may specify a temporal identifier for the NAL unit.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Figure 3:
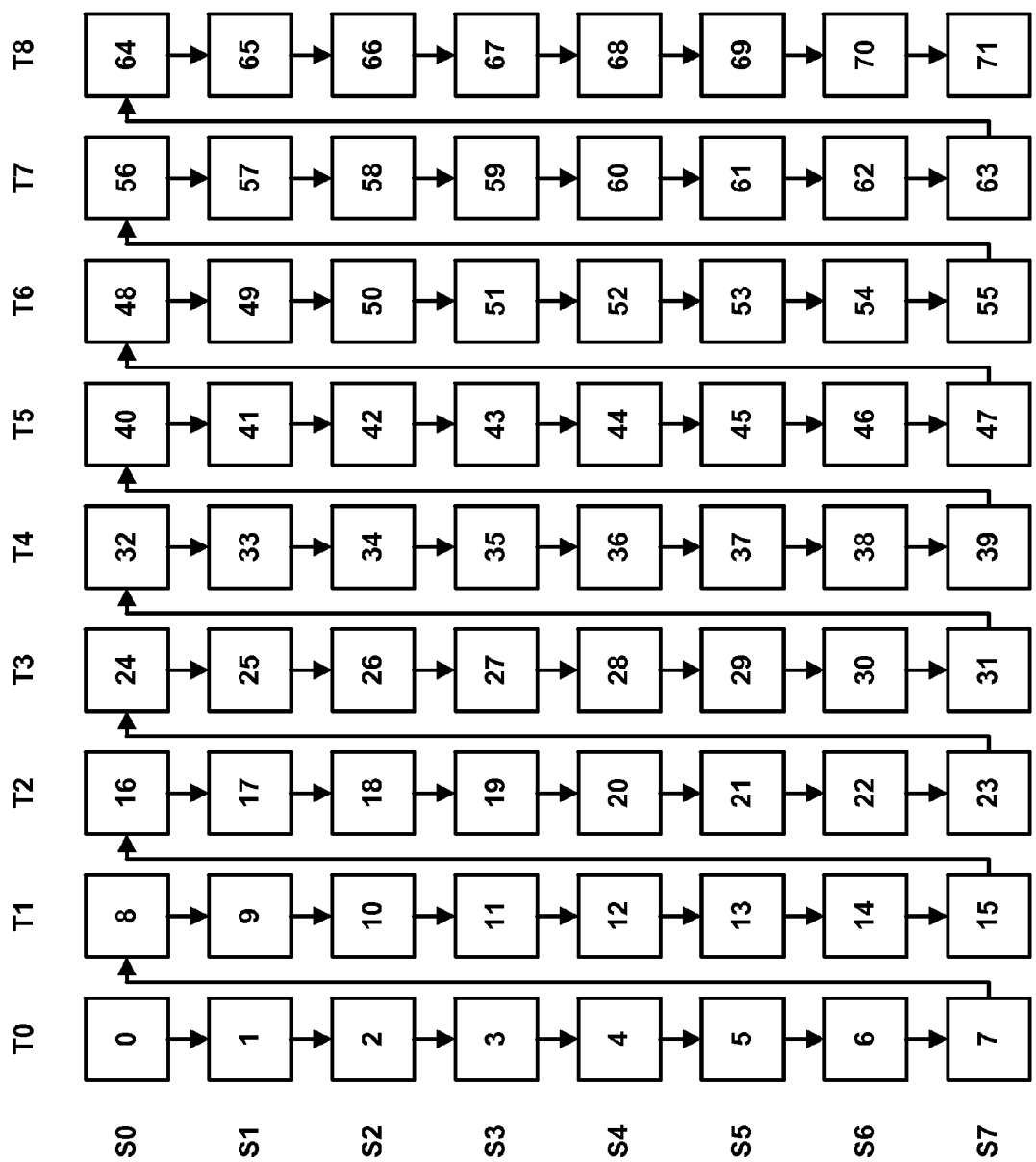
FIG. 3 is a conceptual diagram illustrating an example multi-view coding decoding order.

FIG. 3 is a conceptual diagram illustrating an example multi-view decoding order. The multi-view decoding order may also be referred to as a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T8 and the views are labeled S0 . . . S7. Because each view component of an access unit is decoded before any view component of the next access unit, the decoding order of FIG. 3 may be referred to as time-first coding. The decoding order of access units may not be identical to the output or display order.

Multi-view coding supports inter-view prediction. Inter-view prediction is similar to the inter prediction used in H.264/AVC, HEVC, or other video coding standards and may use the same syntax elements. However, when a video coder performs inter-view prediction on a current video unit (such as a macroblock), the video coder may use, as a reference picture, a picture that is in the same access unit as the current video unit, but in a different view. In contrast, conventional inter prediction only uses pictures in different access units as reference pictures.

Figure 4:
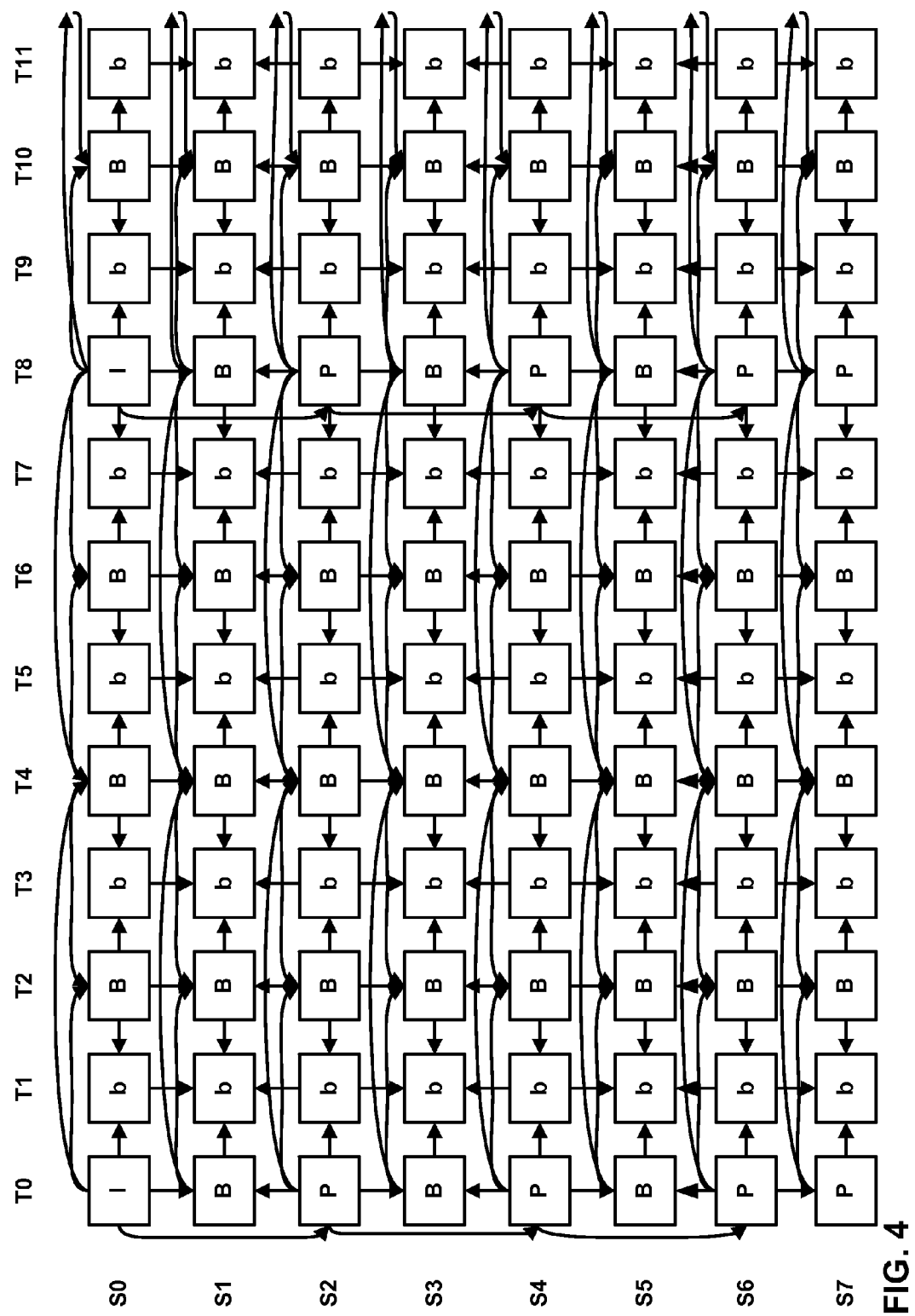
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multiview representation. Consequently, any renderer with a MVC decoder may expect 3D video contents with more than two views.

In the MVC extension of H.264/AVC, inter-view prediction is allowed among pictures in the same access unit (i.e., with the same time instance). When coding a picture in a non-base view, a video coder (such as video encoder 20 or video decoder 30) may add a picture into a reference picture list (e.g., RefPicList0 or RefPicList1) if the picture is in a different view but within a same time instance (i.e. access unit) as the picture that the video coder is currently coding. Like other inter prediction reference pictures, the video coder may insert an inter-view prediction reference picture at any position of a reference picture list. A view may be referred to as a "base view" if a video decoder (e.g., video decoder 30) can decode pictures in the view without reference to pictures in any other view.

3D-HEVC provides for multiple views of the same scene from different viewpoints. Part of the standardization efforts for 3D-HEVC includes the standardization of the multiview video codec based on HEVC. In HEVC based 3DV (i.e., 3D-HEVC), inter-view prediction based on the reconstructed view components from different views is enabled. To improve coding efficiency further, two new coding tools, namely inter-view motion prediction and inter-view residual prediction, have been adopted in some versions of the reference software for 3D-HEVC. Thus, like MVC in H.264/AVC, 3D-HEVC supports inter-view motion prediction.

In 3D-HEVC, inter-view motion prediction is similar to the motion compensation used in standard HEVC and may utilize the same or similar syntax elements. Merge mode and AMVP mode are example motion prediction techniques. When a video coder performs inter-view motion prediction on a PU, the video coder may use, as a source of motion information, a picture that is in the same access unit as the PU, but in a different view. In contrast, conventional motion compensation only uses pictures in different access units as reference pictures. Thus, in 3D-HEVC, the motion parameters of a block in a dependent view may be predicted or inferred based on already-coded motion parameters in other views of the same access unit.

A video coder may generate a candidate list (e.g., a merging candidate list or an AMVP candidate list) when the motion information of a current PU is signaled using merge mode or AMVP mode. To implement inter-view motion prediction in 3D-HEVC, the candidate list may include inter-view predicted motion vector candidates in merging candidate lists and AMVP candidate lists. The video coder may use an inter-view predicted motion vector candidate in the same manner as other candidates in a candidate list. An inter-view predicted motion vector candidate specifies the motion information of a PU (i.e. a reference PU) of a disparity reference picture. The disparity reference picture may be in the same access unit as a current PU, but in a different view than the current PU. To determine a reference PU in a disparity reference picture, the video coder may perform a disparity vector construction process to determine a disparity vector for the current PU. The disparity vector for the current PU may indicate a horizontal spatial displacement between a prediction block of the current PU and a location within the disparity reference picture. The reference PU may be a PU of the disparity reference picture that covers the location indicated by the disparity vector.

Furthermore, in 3D-HEVC, as in the base HEVC specification, a merging candidate list may include a temporal merging candidate. Likewise, in 3D-HEVC, as in the base HEVC specification, an AMVP candidate list may include a temporal MVP candidate. As in the base HEVC specification, temporal merging candidates and temporal MVP candidates may specify the motion vectors of a TMVP. In 3D-HEVC, temporal merging candidates and temporal MVP candidates may always have reference indices equal to 0. This disclosure may refer to the reference picture indicated by a reference index of a temporal merging candidate as the target reference picture for the temporal merging candidate. Similarly, this disclosure may refer to the reference picture indicated by a reference index of a temporal MVP candidate as the target reference picture for the temporal MVP candidate.

The reference picture indicated by a reference index of a TMVP and the target reference picture for a temporal merging candidate may belong to different reference picture types. Thus, the reference picture type of the reference picture that the TMVP in the co-located picture points to and that of the target reference picture for a temporal merging candidate (whose reference index is always equal to 0 in HEVC) may be different. For example, one of the reference pictures may be an inter-view reference picture (type set to disparity) and the other reference picture may be a temporal reference picture (type set to temporal). This disclosure may use the term "disparity reference picture" to denote a reference picture that is associated with a same time instance as a current picture, but is associated with a different view than the current picture. Furthermore, this disclosure may use the term "temporal reference picture" to denote a reference picture that is associated with the same view as a current picture, but is associated with a different time instance than the current picture.

In a more specific example, a reference picture to which a reference index of the TMVP points may be a temporal reference picture and the target reference picture for the temporal merging candidate may be a disparity reference picture, or vice versa. In some versions of the test model software for 3D-HEVC (i.e., the 3D-HTM software), the video coder may set the target reference picture for the temporal merging candidate to 0 or equal to the value of the reference index of the left neighboring PU. Therefore, the reference index for the temporal merging candidate may not be equal to 0.

As mentioned above, video encoder 20 may signal the motion information of a PU using skip mode or merge mode (i.e., skip/merge mode). In skip/merge mode, a video coder (e.g., video encoder 20 or video decoder 30) may generate a list of MVP candidates for a current PU. Furthermore, in MV-HEVC and 3D-HEVC, the video coder may include a determine a disparity vector for the current PU as described elsewhere in this disclosure. Based on the disparity vector, the video coder may determine an inter-view predicted motion vector. If such an inter-view predicted motion vector is available, the video coder may add the inter-view predicted motion vector to the merging candidate list as a new motion vector candidate (i.e., merging candidate). This inter-view predicted motion vector, if available, is a temporal motion vector.

To determine the inter-view predicted motion vector for use in the skip/merge mode, the video coder may use a disparity vector for a current PU to locate a corresponding block of the current PU/CU in a reference view of the same access unit as the current PU. Furthermore, if the corresponding block is not intra-coded, the corresponding block is not inter-view predicted, and a reference block of the corresponding block has a POC value equal to that of a reference picture in a reference picture list of the current PU (i.e., a reference picture list of the current slice), the video coder may convert a reference index of the corresponding block based on POC values. That is, the video coder may determine a position, in a reference picture list associated with the current PU, of a reference picture that has the same POC value as the reference picture indicated by the reference index of the corresponding block. The video coder may set the reference index of the inter-view predicted motion vector candidate to indicate the determined position.

After converting the reference index of the corresponding block, the video coder may then include, in the merging candidate list, the motion information of the corresponding block as the inter-view predicted motion vector. The motion information of the corresponding block may include a prediction direction, reference indexes, and motion vectors of the corresponding block.

Figure 5:
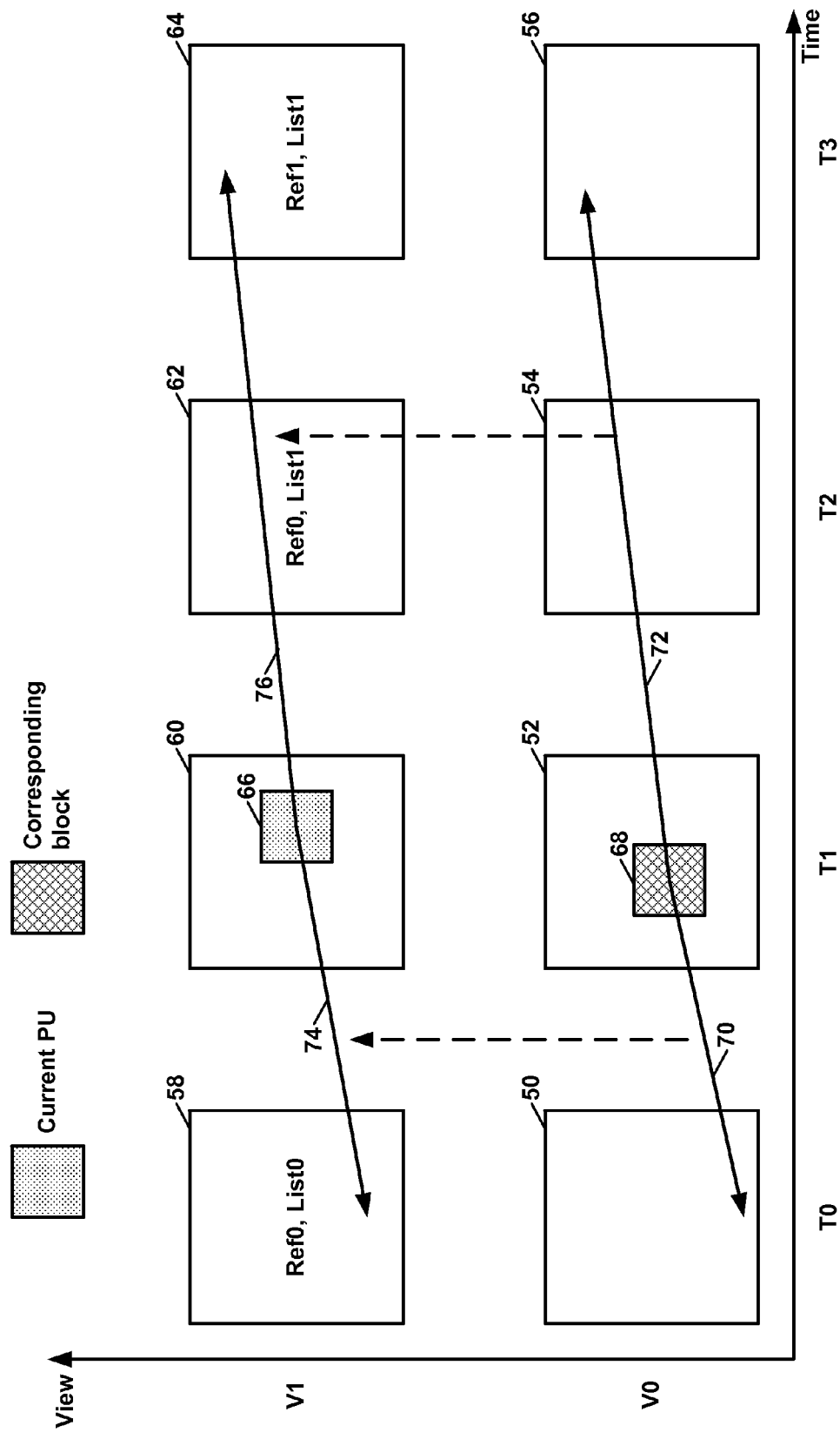
FIG. 5 is a conceptual diagram illustrating an example derivation process of an inter-view predicted motion vector candidate.

FIG. 5 is a conceptual diagram illustrating an example derivation process of an inter-view predicted motion vector candidate. In the example of FIG. 5, view V0 includes pictures 50, 52, 54, and 56. View V1 includes pictures 58, 60, 62, and 64. A video coder may be currently coding picture 62, hence picture 62 may be referred to as "current picture 62." Current picture 62 includes a current PU 66. Current PU 66 may be in a current slice of current picture 62. Picture 58 may be at position 0 (i.e., Ref0) of RefPicList0 (i.e. List0) for the current slice of current picture 62. Picture 62 may be at position 0 (i.e., Ref0) of RefPicList1 (i.e., List1) and Picture 64 may be at Position 1 of RefPicList1.

Furthermore, in the example of FIG. 5, a video coder may determine a disparity vector for current PU 66. The video coder may then determine, based at least in part on the disparity vector for current PU 66, a corresponding block 68 in picture 52. Picture 52 and current picture 62 are associated with the same time instance (i.e. time instance TI). In the example of FIG. 5, corresponding block 68 is bi-directionally inter predicted. Hence, corresponding block 68 has two motion vectors: a RefPicList0 motion vector 70 and a RefPicList1 motion vector 72. RefPicList0 motion vector 70 indicates a location in picture 50. RefPicList1 motion vector 72 indicates a location in picture 56. Accordingly, an inter-view predicted motion vector candidate in a merging candidate list or an AMVP candidate list of current PU 66 may specify a RefPicList0 motion vector 74 and a RefPicList1 motion vector 76. RefPicList0 motion vector 74 may have horizontal and vertical components equal to the horizontal and vertical components of RefPicList0 motion vector 70. RefPicList1 motion vector 76 may have horizontal and vertical components equal to the horizontal and vertical components of RefPicList1 motion vector 72. Furthermore, inter-view predicted motion vector candidate may specify a RefPicList0 reference index that indicates a position in RefPicList0 for current PU of picture 58 because picture 58 has the same POC value as picture 50 (i.e., the picture indicated by the RefPicList0 reference index of corresponding block 68). The inter-view predicted motion vector candidate may specify a RefPicList1 reference index that indicates a position in RefPicList1 for current PU of picture 64 because picture 64 has the same POC value as picture 56 (i.e., the picture indicated by the RefPicList1 reference index of corresponding block 68).

A video coder may determine that an inter-view predicted motion vector candidate is not available if a corresponding PU indicated by a disparity vector of a current PU is intra predicted, the corresponding PU is not inter predicted, or a reference index of the corresponding PU refers to a reference picture having a POC value that does not match the POC value of any reference picture in a corresponding reference picture list associated with the current PU, the video coder may determine that the inter-view predicted motion vector candidate is not available. If a video coder determines that an inter-view predicted motion vector candidate is not available, the video coder may convert the disparity vector for the current PU into an inter-view disparity motion vector. The video coder may then add the inter-view disparity motion vector to the merging candidate list at the position where the video coder would have added the inter-view predicted motion vector.

In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only 2 candidates for the AMVP mode. A merge candidate may contain motion vectors corresponding to both reference picture lists (list 0 and list 1) and the reference indices. If a merge candidate is identified by a merge index, the reference pictures used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

For these two inter coding modes, the reference index for the current PU, if coded with AMVP is explicitly signaled. However, the reference index for the current PU if coded with merge is derived as part of the merge candidate. For simplicity, the reference index either signaled in AMVP mode, or derived as part of the merge candidate list is called target reference index. In HEVC, the target reference index for a TMVP merge candidate may always be set to 0.

In AMVP mode, if a target reference index corresponds to a temporal motion vector, the video coder may use the disparity vector of a current PU to determine a corresponding block in a different view. Furthermore, if the target reference index corresponds to a temporal motion vector, the video coder may find an inter-view predicted motion vector by checking the motion vectors in the corresponding block. In other words, if the target reference index corresponds to a temporal motion vector, the inter-view predicted motion vector is found by checking the motion vectors in the corresponding block of the current PU located by the disparity vector.

Furthermore, in AMVP mode, if the target reference index corresponds to a disparity motion vector, the video coder does not derive the inter-view predicted motion vector. Rather, the video coder may convert the disparity vector for the current PU into an inter-view disparity motion vector. The video coder may include the inter-view disparity motion vector in AMVP candidate list. Thus, if the inter-view predicted motion vector is not available, the disparity vector is converted to an inter-view disparity motion vector, which is added into the AMVP or merging candidate list, in the same position, as inter-view predicted motion vector when it is available.

In skip/merge mode, the video coder may always insert an inter-view predicted motion vector, if available, before all spatial and temporal merging candidates in the merging candidate list. If the inter-view predicted motion vector is not available, the video coder may insert the inter-view disparity motion vector, if available, in the same position (i.e., before all spatial and temporal merging candidates in the merging candidate list). In some versions of the test model of 3D-HEVC (i.e., the 3D-HTM software), the inter-view predicted motion vector or inter-view disparity motion vector follows after all the valid spatial candidates in the AMVP candidate list, if the inter-view predicted motion vector or the inter-view disparity motion vector is different from all the spatial candidates in the AMVP candidate list.

The MVC extension of H.264/AVC may be implemented such that the MVC extension of H.264/AVC fulfills a "HLS-only" requirement. The HLS-only requirement guarantees that there are only high-level syntax (HLS) changes in the MVC extension of H.264/AVC. Thus, no module in the macroblock level in H.264/AVC was redesigned. Rather, each module in the macroblock level in H.264/AVC may be fully reused in the MVC extension of H.264/AVC. If multi-loop decoding is acceptable, it is possible that MV-HEVC, 3D-HEVC and SHEVC may fulfill the "HLS-only" requirement. For instance, in MV-HEVC, it should be guaranteed that there are only HLS changes in it, such that no module in the CU/PU level in HEVC may need to be redesigned and can be fully reused for MV-HEVC. In 3D-HEVC, new coding tools, including those in the CU/PU level in HEVC for both texture and depth views, may be included and supported.

In some instances, to enable inter-view prediction, the minimum and essential HLS changes are for the following purpose:

Picture identification: reference picture list construction and marking need to be able to identify a picture in a specific view.

The HLS changes are not sufficient to fulfill the "HLS-only" requirement in H.264/MVC, other constraints, assumptions are made, so that the low-level coding modules never encounter a situation of, for example, handling zero motion related scaling. Such constraints, modifications and assumptions may include:

Disabling temporal direct mode if a co-located picture is an inter-view (only) reference picture.

Considering an inter-view (only) reference picture as not short-term: related to spatial direct. An inter-view (only) reference picture may be a reference picture in the reference picture list of the current picture that is used for inter-view prediction.

Disabling implicit weighted prediction.

To fulfill the "HLS-only" required in a potential HEVC extension, the modifications in the potential HEVC extension may only be in the high-level. Thus, no modifications are made for the syntax elements under the slice header and there are no CU-level decoding process changes for the potential HEVC extension. For example, the motion vector prediction of the HEVC extension specification should be exactly the same as that in a HEVC base specification. The HLS changes may be normative decoder changes of the extension specification, however, from the base specification point of view, such changes do not necessarily need to be known and can be informative.

To enable functionalities such as efficient inter-view prediction, both modifications in the HEVC extension and base specifications may be needed. The base specification changes, which do not impact the typical decoding processes or coding efficiency of the base HEVC decoders, but target at enabling functionalities in the extension specification are called hooks. In most cases, a "HLS-only" requirement has to be fulfilled with both hooks in the base specification and HLS changes in the extension specification. If the hooks in the base specifications are not defined well, certain desired functionality may not be enabled in the extension specification or may require the extension specification to provide considerable modifications. In HLS-only SVC, a base layer representation, possibly after up-sampling and/or filtering, may be put into the reference picture list of the current picture of the current layer. Such a picture may be called an inter-layer reference picture.

In some instances, this disclosure may describe a motion vector as consisting of both a reference index and the x and y values of the motion vector itself. As indicated above, a reference index may be a pointer to a reference picture. Equivalently, this disclosure may refer to the reference picture corresponding to the reference index as the reference picture to which the motion vector is referring. If a motion vector refers to a reference picture in the same view, the motion vector may be called a temporal motion vector. If a motion vector refers to a reference picture of a different view, the motion vector may be called a disparity motion vector.

A temporal motion vector may be either a short-term temporal motion vector (short-term motion vector in short) or a long-term temporal motion vector (long-term motion vector in short). For example, a motion vector is short-term if the motion vector refers to a short-term reference picture. Similarly, a motion vector is long-term if the motion vector refers to a long-term reference picture. Unless otherwise mentioned, disparity motion vectors and long-term motion vectors belong to different categories, throughout this disclosure. This disclosure may jointly refer to short-term and long-term reference pictures as temporal reference pictures. Similarly, a disparity motion vector can be replaced by an inter-layer motion vector in the context of SVC. This disclosure may use the term "inter-layer motion vector" to refer to a layer representation (possibly up-sampled and filtered) of a different layer.

Chen et al., "AHG10: Motion Related Hooks for HEVC Multiview/3DV Extension Based on Long-Term Reference Pictures," Joint Collaborative Team on Video Coding (JCT-VC) of ITU-T SG16 WP3 and ISO/IEC JTC1/SC29/WG11, 10th Meeting, Stockholm, SE, July 2012, document JCTVC-J0121 (hereinafter "document JCTVC-J0121"), proposes that a motion vector corresponding to inter-view (only) reference pictures when considered as long-term, is not used to predict a temporal motion vector during merge or AMVP, including the situation when a TMVP candidate is used. In JCTVC-J0121 and the HEVC base specification, no prediction means that a motion vector is considered as unavailable and could not be used to be put into the merge or AMVP candidate list.

Chen et al., "AHG10: On Video Parameter Set for HEVC Extensions," Joint Collaborative Team on Video Coding (JCT-VC) of ITU-T SG16 WP3 and ISO/IEC JTC1/SC29/WG11, 10th Meeting, Stockholm, SE, July 2012, document JCTVC-J0124 (hereinafter "document JCTVC-J0124") proposed various approaches. One of the approaches described in document JCTVC-J0124 is more advanced in a way that an inter-view motion vector can be identified by a view index or layer index. As a result, prediction of motion vectors is further constrained such that prediction of motion vectors is enabled only within either temporal motion vectors inside the same view, or inter-view motion vectors referring to the same view. Furthermore, even within the same view, prediction is constrained such that prediction is enabled only within the same view belonging to the same category of either long-term or short-term. In addition, an inter-view reference picture is marked as a different type of reference picture (non-temporal reference picture). Furthermore, document JCTVC-J0124 defines a function AddPicId( ) to return the additional picture identification as part of the high-level decoding process. In some examples, the return value of AddPicId( ) is a view order index in multiview context. A view order index indicates a position of a view in an ordering of views based on camera positions associated with the views. In other examples, the return value of AddPicId( ) is a generic layer ID (layer_id), e.g., the value of reserved_one_5bits minus1, wherein reserved_one_5bits is as specified in the HEVC Working Draft 7.

Chen et al., "AHG12: Hooks for Temporal Motion Vector Prediction and Weighted Prediction in HEVC Multiview/3DV Extension, Joint Collaborative Team on Video Coding (JCT-VC) of ITU-T SG16 WP3 and ISO/IEC JTC1/SC29/WG11, 9th Meeting, Geneva, CH, April-May 2012, document JCTVC-I0353 (hereinafter "document JCTVC-I0353") proposes a new type of motion vector indicated in the HEVC base specification, e.g., for inter-view (only) references. Such a case is equivalent to the solution mentioned above in JCTVC-J0124, if there is only one inter-view reference. However, when multiple inter-view references are possible, it is not possible to tell whether two inter-view motion vectors refer to the same view.

There may be several problems with the system described in HEVC Working Draft 7 for the usage of a TMVP. For example, when the motion information of a current PU is signaled using merge mode, a video coder may generate a temporal merging candidate that specifies the motion information of a TMVP (i.e., a collocated PU of a reference picture in a different access unit than the current PU). In HEVC Working Draft 7, the reference index of the temporal merging candidate is always set equal to 0. In other words, the reference index of the temporal merging candidate is always the first reference picture in RefPicList0 or RefPicList1. Thus, in merge mode, HEVC Working Draft 7 only allows a reference index for the merging candidate from a TMVP to be zero.

If the TMVP indicates a reference picture for a motion vector other than the first reference picture in the current PU's RefPicList0 or RefPicList1, the video coder may scale the motion vector based on the temporal distance between the first reference picture in RefPicList0 or RefPicList1 associated with the current PU and the reference picture indicated for the motion vector by the collocated PU. That is, if a motion vector corresponds to a reference picture that is not the same as the first reference picture in RefPicListX (with X being 0 or 1), the motion vector is scaled based on the temporal distance.

However, if the RefPicListX (with X being 0 or 1) motion vector of the TMVP is a disparity motion vector (i.e., a motion vector that indicates a location in a picture in the same access unit as the picture containing the TMVP but in a different view than the picture containing the TMVP), and the reference picture at position 0 of the current PU's RefPicListX is a temporal reference picture (i.e., a picture in a different access unit than the current access unit), the video coder does not scale the disparity motion vector. Rather, the video coder may use the disparity motion vector as if the disparity motion vector is a temporal motion vector. If the RefPicListX motion vector of the TMVP is a temporal motion vector (i.e., a motion vector that indicates a location in a picture that is in a different access unit than the picture containing the TMVP) and the reference picture at position 0 of the current PU's RefPicListX is a disparity reference picture (i.e., a picture in a different view but the same access unit as the current picture), the video coder does not scale the temporal motion vector. Rather, the video coder may use the temporal motion vector as a disparity motion vector.

In the solution proposed in Document JCTVC-J0124, the reference index for the TMVP merging candidate (i.e., the merging candidate from TMVP) is still set to be 0. However, when either of the two scenarios above occur (i.e., the reference picture at position 0 of a reference picture list is a temporal reference picture and the motion vector of the TMVP is a disparity motion vector or the reference picture at position 0 of a reference picture list is a disparity reference picture and the motion vector of the TMVP is a temporal motion vector), the video coder may consider the temporal merging candidate to be unavailable.

Figure 6:
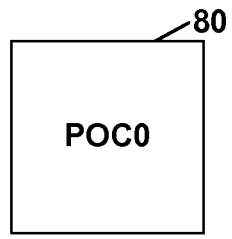
FIG. 6 is a conceptual diagram illustrating prediction between a temporal motion vector and a disparity motion vector in merge mode.
Figure 6:
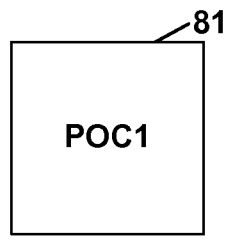
Figure 6:
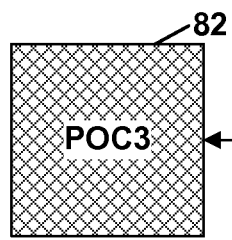
Figure 6:
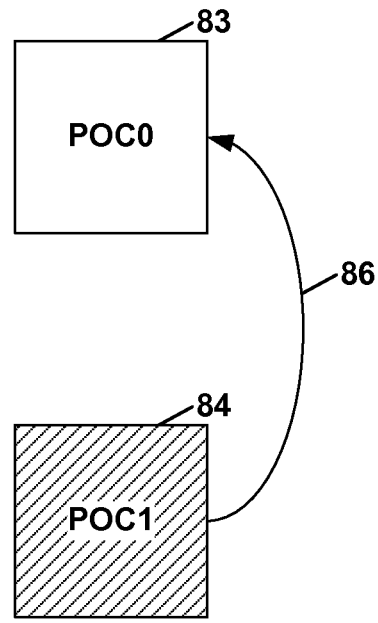
Figure 6:
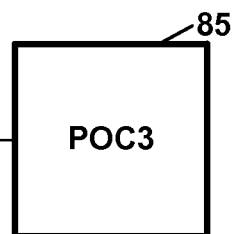

FIG. 6 is a conceptual diagram illustrating prediction between a temporal motion vector and a disparity motion vector in merge mode. As illustrated in the example of FIG. 6, View 1 includes pictures 80, 81, and 82. View 2 includes pictures 83, 84, and 85. Pictures 80 and 83 have POC values equal to 0, pictures 81 and 84 have POC values equal to 1, and pictures 82 and 85 have POC values equal to 2. A video coder is currently coding picture 84. That is, picture 84 is the current picture. An arrow 86 represents a temporal motion vector (i.e., a motion vector that indicates a location in a picture that is in the same view as the current picture but in a different time instance). Furthermore, in the example of FIG. 6, picture 85 may be a co-located picture for a current PU of picture 84. A TMVP in picture 85 has a disparity motion vector (i.e., a motion vector that indicates a location in a picture in a different view than picture 85). In the example of FIG. 6, the disparity vector of the TMVP indicates a location in picture 82.

The techniques of this disclosure may resolve one or more of the issues described above for merge mode. In accordance with a first example technique of this disclosure, when the reference picture type of a picture in RefPicListX with reference index equal to 0 and the reference picture type of a picture referred to by a motion vector of a TMVP is the same, the video coder may set a final reference index of RefPicListX of a temporal merging candidate to 0. For example, if the RefPicListX motion vector of the TMVP indicates a location in a disparity reference picture and the first reference picture in the current PU's RefPicListX is a disparity reference picture, the video coder may set the RefPicListX reference index of the temporal merging candidate to 0. In another example, if the RefPicListX motion vector of the TMVP indicates a location in a temporal reference picture and the first reference picture in the current PU's RefPicListX is a temporal reference picture, the video coder may set the RefPicListX reference index of the temporal merging candidate to 0.

Otherwise, in the first example technique of this disclosure, the video coder may change the final reference index of RefPicListX of the temporal merging candidate as follows. If the reference picture type of RefPicListX[0] (i.e., the first reference picture in the current PU's RefPicListX) is temporal and the RefPicListX motion vector of the TMVP indicates a disparity reference picture, the video coder may set a RefPicListX reference index to the first entry in the current PU's RefPicListX that belongs to the reference picture type of disparity. In other words, if the first reference picture in the current PU's RefPicListX is a temporal reference picture, the video coder may set the RefPicListX reference index of the temporal merging candidate such that the RefPicListX reference index of the temporal merging candidate indicates the first temporal reference picture in the current PU's RefPicListX. For instance, if the first temporal reference picture in the current PU's RefPicListX is the second reference picture in the current PU's RefPicListX, the video coder may set the RefPicListX reference index of the temporal merging candidate to 1 (i.e., 2-1).

Furthermore, in the first example technique of this disclosure, if the reference picture type of RefPicListX[0] is disparity and the RefPicListX motion vector of the TMVP indicates a temporal reference picture, the video coder may set a reference index to the first entry in RefPicListX that belongs to the reference picture type of temporal. In other words, if the first reference picture in the current PU's RefPicListX is a temporal reference picture, the video coder may set the RefPicListX reference index of the temporal merging candidate such that the RefPicListX reference index of the temporal merging candidate indicates the first temporal reference picture in the current PU's RefPicListX. For instance, if the first temporal reference picture in the current PU's RefPicListX is the third reference picture in the current PU's RefPicListX, the video coder may set the RefPicListX reference index of the temporal merging candidate to 2 (i.e., 3-1).

In this way, when a first reference picture and a second reference picture belong to different reference picture types, video encoder 20 may set a reference index of a temporal merging candidate to a non-zero value. The first reference picture may be an initial reference picture in a reference picture list associated with a current video unit (e.g., a PU). The second reference picture may be indicated by a reference index of a TMVP for the current video unit. The reference index of the temporal merging candidate indicates a position in the reference picture list associated with the current video unit. Furthermore, video encoder 20 may determine a selected merging candidate from among a plurality of merging candidates in a merging candidate list that includes the temporal merging candidate. Video encoder 20 may generate a bitstream that includes data (e.g. a merge_idx syntax element) that identify the selected merging candidate in the merging candidate list.

Similarly, when a first reference picture and a second reference picture belong to different reference picture types, video decoder 30 may set a reference index of a temporal merging candidate to a non-zero value. The first reference picture may be an initial reference picture in a reference picture list associated with a current video unit. The second reference picture may be indicated by a reference index of a TMVP for the current video unit. The reference index of the temporal merging candidate indicates a position in the reference picture list associated with the current video unit. Furthermore, video decoder 30 may determine a selected merging candidate from among a plurality of merging candidates in a merging candidate list that includes the temporal merging candidate. Video decoder 30 may determine, based at least in part on motion information specified by the selected merging candidate, a predictive block for the current video unit. In addition, video decoder 30 may generate, based at least in part on the predictive block for the current video unit, a reconstructed sample block (e.g., a reconstructed coding block).

In one alternative, a disparity motion vector can be denoted/replaced as a long-term motion vector, and an inter-view (only) reference can be denoted/replaced as a long-term reference, and the temporal reference/motion vector can be denoted/replaced by temporal short-term reference/motion vector. For example, if the first reference picture in the current PU's RefPicListX is a short-term reference picture and the RefPicListX motion vector of the TMVP is a short-term motion vector, the video coder may set the RefPicListX reference index of the temporal merging candidate to 0. Likewise, if the first reference picture in the current PU's RefPicListX is a long-term reference picture and the RefPicListX motion vector of the TMVP is a long-term motion vector, the video coder may set the RefPicListX reference index of the temporal merging candidate to 0. However, if the first reference picture in the current PU's RefPicListX is a short-term reference picture and the RefPicListX motion vector of the TMVP is a long-term motion vector, the video coder may set the RefPicListX reference index of the temporal merging candidate to a non-zero value. For instance, the video coder may set the RefPicListX reference index of the temporal merging candidate to the first long-term reference picture in the current PU's RefPicListX. Similarly, if the first reference picture in the current PU's RefPicListX is a long-term reference picture and the RefPicListX motion vector of the TMVP is a short-term motion vector, the video coder may set the RefPicListX reference index of the temporal merging candidate to a non-zero value. For instance, the video coder may set the RefPicListX reference index of the temporal merging candidate to the first short-term reference picture in the current PU's RefPicListX.

In another alternative, the reference index ("ref_idx") of a temporal reference picture ("T_ref_idx") and the ref_idx of an inter-view reference (only) picture ("D_ref_idx") are signaled in a slice header. If the reference picture type of RefPicListX[0] is temporal, the final reference index is set to D_ref_idx. Otherwise, if the reference picture type of RefPicListX[0] is disparity, the final reference index is set to T_ref_idx.

In accordance with a second example technique of this disclosure, when both the initial reference picture of the current PU's RefPicListX and the reference picture referred to by the RefPicListX motion vector of the TMVP are temporal short-term reference pictures, the video coder may set the final RefPicListX reference index of the temporal merging candidate to 0. The initial reference picture of RefPicListX is the reference picture in RefPicListX with reference index equal to 0 (i.e., RefPicListX[0]).

Otherwise, the video coder may change the final RefPicListX reference index of the temporal merging candidate as follows. First, the AddPicId of the reference picture referred to by the RefPicListX motion vector of the TMVP may be denoted TargetAddPicId. As indicated above, in some examples, the AddPicId of a reference picture may, in a multi-view context, be a view order index of the reference picture. In some examples, the AddPicId of a reference picture may be a generic layer identifier (layer_id) of the reference picture. For instance, the AddPicId of a reference picture may be the value of a reserved_one_5bits_minus1 syntax element specified in NAL unit headers of NAL units associated with the reference picture.

If the type of RefPicListX[0] is temporal, the video coder may check each reference picture in the current PU's RefPicListX other than the initial reference picture of the current PU's RefPicListX. When the video coder checks a reference picture in a position j of the current PU's RefPicListX, the video coder may determine whether AddPicId(RefPicListXD[j]) is equal to TargetAddPicId. As indicated above, AddPicId( ) is a function that returns an additional picture identification. If AddPicId(RefPicListX[j]) is equal to TargetAddPicId, the video coder may set the final reference index of the RefPicListX motion vector of the temporal merging candidate to j. In other words, the video coder may perform the following for each j from 1 to num_ref_idx_1X_active_minus1, inclusive: if AddPicId (RefPicListX[j]) is equal to TargetAddPicId, the video coder may set the final reference index to j, and return, num_ref_idx_1X_active_minus1 may indicate the number of active reference pictures in the current PU's RefPicListX. If a final reference index is not returned after checking each reference picture in RefPicListX[j] from j=1 to j=num_ref_idx_1X_active_minus1, the video coder may determine that the motion vector of the temporal merging candidate is unavailable.

Furthermore, in the second example technique of this disclosure, if the reference picture type of RefPicListX[0] is not temporal and the RefPicListX motion vector of the TMVP is a temporal motion vector, the video coder may check each reference picture in RefPicListX other than the initial reference picture of the current PU's RefPicListX. When the video coder checks a reference picture at position j of the current PU's RefPicListX (i.e. RefPicListX[ ]), the video coder may determine whether RefPicListX[j] is a temporal reference picture. If RefPicListX[j] is a temporal reference picture, the video coder may set the final RefPicListX reference index of the temporal merging candidate to j and stop checking reference pictures in the current PU's RefPicListX. In other words, for j from 1 to num_ref_idx_1X_active_minus1, inclusive, if RefPicListX[j] is a temporal reference picture, set final reference index to j and return. If a final reference index is not returned after checking each reference picture in RefPicListX[j] from j=1 to j=num_ref_idx_1X_active_minus1, the video coder may determine that the motion vector of the temporal merging candidate is unavailable.

In an alternative example, if the reference picture type of the initial reference picture in the current PU's RefPicListX is not temporal and the RefPicListX motion vector of the TMVP is a temporal motion vector, the video coder may check each reference picture in the current PU's RefPicListX other than the initial reference picture of the current PU's RefPicListX. When the video coder checks a reference picture at position j of the current PU's RefPicListX (i.e., RefPicListX[j]), the video coder may determine whether a POC value of RefPicListX[j] is equal to the POC value of the reference picture to which the RefPicListX motion vector of the TMVP refers. If so, the video coder may set the final RefPicListX reference index of the temporal merging candidate to j and stop checking reference pictures in the current PU's RefPicListX. Thus, if the reference picture type of RefPicListX[0] is not temporal and the RefPicListX motion vector of the TMVP is a temporal motion vector, for j from 1 to num_ref_idx_1X_active_minus1, inclusive, if the POC value of RefPicListX[j] is equal to the POC value of the picture the motion vector is referring to, set the final reference index to j and return.

In some examples, after checking each reference picture in the current PU's RefPicListX other than the initial reference picture of the current PU's RefPicListX, the video coder determines that no reference picture in the current PU's RefPicListX is equal to the POC value of the reference picture to which the RefPicListX motion vector of the TMVP refers, and if a last reference picture in the current PU's RefPicListX is a temporal reference picture, the video coder may set the final RefPicListX reference index of the temporal merging candidate to j. Thus, in one alternative, if the loop described in the previous paragraph does not return successfully, for j from 1 to num_ref_idx_1X_active_minus1, inclusive, if RefPicListX[j] is a temporal reference picture, set the final reference index to j and return.

Furthermore, in accordance with the second example technique of this disclosure, if the initial reference picture in the current PU's RefPicListX is not a temporal reference picture and the RefPicListX motion vector of the TMVP is a temporal motion vector, the AddPicId of the reference picture referred to by the RefPicListX motion vector of the TMVP may be denoted as TargetAddPicId. Furthermore, the video coder may check each reference picture in the current PU's RefPicListX other than the initial reference picture of the current PU's RefPicListX. When the video coder checks a reference picture at position j of the current PU's RefPicListX, the video coder may determine whether the AddPicId of the reference picture is equal to TargetAddPicId. If the AddPicId of the reference picture is equal to TargetAddPicId, the video coder may set the final RefPicListX reference index of the temporal merging candidate to j and may stop checking reference pictures in the current PU's RefPicListX. If, after checking each reference picture in the current PU's RefPicListX other than the initial reference picture of the current PU's RefPicListX, the video coder determines that none of the reference pictures have AddPicIds equal to TargetAddPicId, the video coder may determine that the temporal merging candidate is unavailable.

Thus, if the type of RefPicListX[0] is not temporal and the motion vector is not temporal, the AddPicId of the picture referred to by the motion vector may be denoted as TargetAddPicId. For j from 0 to num_ref_idx_1X_active_minus1, inclusive, if AddPicId(RefPicListX[0]) is equal to TargetAddPicId, set the final reference index to j and return. If not returned yet, the motion vector is considered as unavailable.

In one alternative example, when the initial reference picture in the current PU's RefPicListX is not a temporal reference picture and the RefPicListX motion vector of the TMVP is not a temporal motion vector, the AddPicId of the reference picture referred to by the RefPicListX motion vector of the TMVP may be denoted as TargetAddPicId. Furthermore, in this example, if the AddPicId of the initial reference picture of the current PU's RefPicListX is equal to TargetAddPicId, the video coder may set the final RefPicListX reference index of the temporal merging candidate to 0 and return. Otherwise, the video coder may set the final RefPicListX reference index of the temporal merging candidate to 0 and scale the RefPicListX motion vector of the temporal merging candidate based on the difference between the AddPicId of the initial reference picture of the current PU's RefPicListX.

Thus, in the example of the previous paragraph, when the type of RefPicListX[0] is not temporal and motion vector is not temporal, denote the AddPicId of the picture referred to by the motion vector as TargetAddPicId. If AddPicId(RefPicListX[0]) is equal to TargetAddPicId, set the final reference index to 0 and return. Otherwise, set the final reference index to 0 and scale the motion vector based on the differences of AddPicId. In one example, the video coder may scale the motion vector ("mv") as follows: mv=mv*(AddPicId(RefPicListX[0])−AddPicId(current picture))/(TargetAddPicId−AddPicId(co-located picture)).

In another example technique of this disclosure, video encoder 20 may signal a target reference index to be used for a temporal merging candidate. The signaling of the target reference index may be at various levels. For example, video encoder 20 may signal the target reference index at a slice level. For instance, in this example, video encoder 20 may signal the target reference index in a slice header. In another example, video encoder 20 may signal the target reference index at a PU level. For instance, in this example, video encoder 20 may signal the target reference index in a prediction_unit syntax structure. In accordance with this example technique of this disclosure, the number of reference frames that can be used for the temporal merging candidate can be separately limited. For example, the video coder may use only the first two frames in a reference picture list for the temporal merging candidate. A first advantage of this approach may be that the number of bins spent for TMVP reference index signaling can be smaller than in the general case (e.g., in the previous example with two reference frames), it is only one bit indicating reference index 0 or reference index 1 is used. A second advantage may be that if the TMVP reference index is known in advance, the video coder may pre-derive TMVP candidates up front for entire frame or part of the frame and limiting number of possibilities is useful for this pre-calculation, (in the previous example it can be up to two variants).

In various scenarios, if a motion vector referring to picture A from picture B and picture A and picture B has the same POC, it may be considered that the motion vector is not temporal motion vector.

As indicated above, a TMVP may be a motion vector of a co-located PU and a target reference index is a reference index of a temporal merging candidate in a merge/skip candidate list or an AMVP candidate list. The target reference index may always be equal to 0. At least some of the techniques of this disclosure target cases when a video coder uses a TMVP in merge mode and the target reference index is always equal to 0. Thus, when the TMVP refers to a reference picture that has a different reference picture type (e.g., temporal or inter-view) than the reference picture of the current PU identified by the reference index equal to 0 (i.e., the initial or first reference picture of a reference picture list), the video coder may change the target reference index of the temporal merging candidate. This disclosure may denote the condition where the TMVP refers to a reference picture that has a different type (e.g., temporal or inter-view) than the reference picture of the current PU identified by the reference index equal to 0 as the "reference type not matching condition."

In the above example, a video coder may identify two different pictures having the same reference picture types (e.g., by whether they have been both long-term reference pictures or both short-term pictures, whether they have been both inter-view reference pictures, or whether each of them has the same POC value as the picture referring to it). The target reference index, even after being modified, can only be 0 and one specific value C, which is fixed for the whole slice. Assume 0 corresponds to type 0 (long-term or inter-view), C is the reference index that corresponds to the first entry in a reference picture list which corresponds to type 1 (short-term or temporal). Assume 0 corresponds to type 1 (short-term or temporal), C is the reference index that corresponds to the first entry in a reference picture list which corresponds to type 0 (long-term or inter-view). When the reference type not matching condition is true, the video coder may change the final reference index to be C.

Some designs for the motion-related technologies in HEVC-based multi-view (i.e., MV-HEVC) and 3D-HEVC have several additional problems. For example, in some versions of the 3D-HTM, the target reference index (TIdx) for a temporal merging candidate may be determined by the reference index from the left neighboring PU which may be not be equal to zero. If the motion vector of the TMVP is a disparity motion vector, and TIdx corresponds to a temporal reference picture, the video coder does not scale the disparity motion vector. On the contrary, if the motion vector of the TMVP is a temporal motion vector, and TIdx corresponds to an inter-view reference picture, the video coder does not scale the temporal motion vector. In these two cases, the video coder may consider the temporal merging candidate to be unavailable. The same problem can be observed in the AMVP mode where TIdx represents the decoded reference index for the current CU/PU.

In another example problem with some designs for the motion-related technologies for MV-HEVC and 3D-HEVC, the disparity vector derivation process is terminated once a disparity motion vector is identified. However, the first available disparity motion vector may not be sufficiently accurate. In another example problem, the inter-view candidate derivation process for the skip/merge mode always prefers the inter-view predicted motion vector. This may not be suitable for regions with high motion that will probably use inter-view prediction. In another example problem, the fixed position of the inter-view candidate, i.e. after or before all spatial candidates in the AMVP or merging candidate list, cannot be adaptive to the local characteristics.

This disclosure provides various methods for further improving the coding efficiency of motion prediction in MV-HEVC and/or 3DV coding. For example, when the target reference index (derived by the spatial neighboring blocks) of a temporal merging candidate corresponds to a reference picture that has a different reference picture type than the reference picture to which the TMVP points, a video coder may modify the temporal merging candidate to a reference index value corresponding to a picture with the same reference picture type (e.g., temporal or inter-view) as that of the reference picture of the TMVP. For instance, when the reference picture is a temporal reference picture and the reference picture to which the TMVP points is an inter-view reference picture, the video coder may modify the temporal merging candidate to a reference index value corresponding to a picture with the same reference picture type as that of the reference picture of the TMVP.

In accordance with another example technique of this disclosure, in merge/skip mode, even when an inter-view predicted motion vector is available, a video coder may not add the inter-view predicted motion vector to the merging candidate list. Rather, the video coder may instead convert the disparity vector to an inter-view disparity motion vector. The video coder may add the inter-view disparity motion vector into the merging candidate list. The video coder may determine, based on information of spatial neighboring blocks, whether to add the inter-view predicted motion vector or the inter-view disparity motion vector to the merging candidate list.

Furthermore, in accordance with another example technique of this disclosure, a video coder may collect, during a disparity vector derivation process, multiple available disparity motion vectors from neighboring blocks. The video coder may use the medium (e.g., median) or average of the multiple disparity motion vectors as the derived disparity vector. In accordance with another example technique of the disclosure, a video coder may, in merge/skip mode, insert an inter-view predicted motion vector or an inter-view disparity motion vector into a merging candidate list before or after the first available spatial merging candidate based on the information of spatial neighboring blocks.

Figure 7:
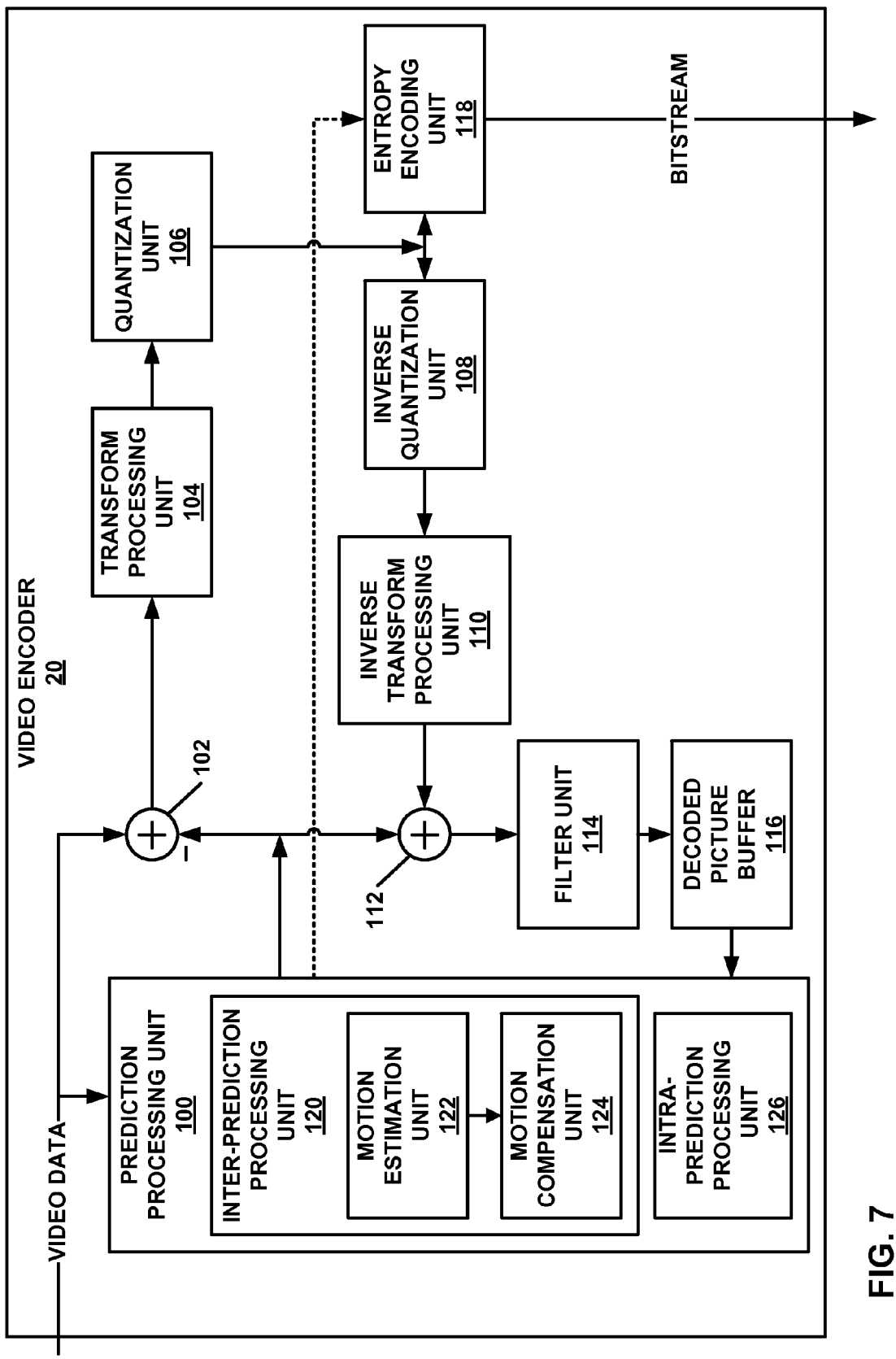
FIG. 7 is a block diagram illustrating an example video encoder that may implement the techniques described in this disclosure.

FIG. 7 is a block diagram illustrating an example video encoder 20 that may implement the techniques of this disclosure. FIG. 7 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 7, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU.

Assuming that the size of a particular CU is 2N×2N, video encoder 20 and video decoder 30 may support PU sizes of 2N×2N or N×N for intra prediction, and symmetric PU sizes of 2N×2N, 2N×N, N×2N. N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

PUs in a P slice may be intra predicted or uni-directionally inter predicted. For instance, if a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the prediction blocks of the PU. Motion estimation unit 122 may generate a reference index (i.e., a RefPicList0 reference index) that indicates a position in RefPicList0 of the reference picture containing the reference region for the PU. In addition, motion estimation unit 122 may generate a motion vector (i.e., a RefPicList0 motion vector) that indicates a spatial displacement between a prediction block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

PUs in a B slice may be intra predicted, uni-directionally inter predicted, or bi-directionally inter predicted. Hence, if a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes (i.e., a RefPicList0 reference index and a RefPicList1 reference index) that indicate positions in RefPicList0 and RefPicList1 of the reference pictures that contain the reference regions. In addition, motion estimation unit 122 may generate motion vectors (i.e., a RefPicList0 motion vector and a RefPicList1 motion vector) that indicate spatial displacements between the reference locations associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may generate a predictive block for a PU based on samples of neighboring PUs. The neighboring PUs may be above, above and to the right, above and to the left, or to the left of the PU, assuming a left-to-right, top-to-bottom encoding order for PUs, CUs, and CTUs. Different intra prediction modes may be associated with different sets of neighbor samples. Intra-prediction processing unit 126 may use various numbers of intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding blocks of a CU and the selected predictive luma, Cb, and Cr blocks of the PUs of the CU, a luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add samples of the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on some such data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU. The bitstream may also include syntax elements that are not entropy encoded.

Figure 8:
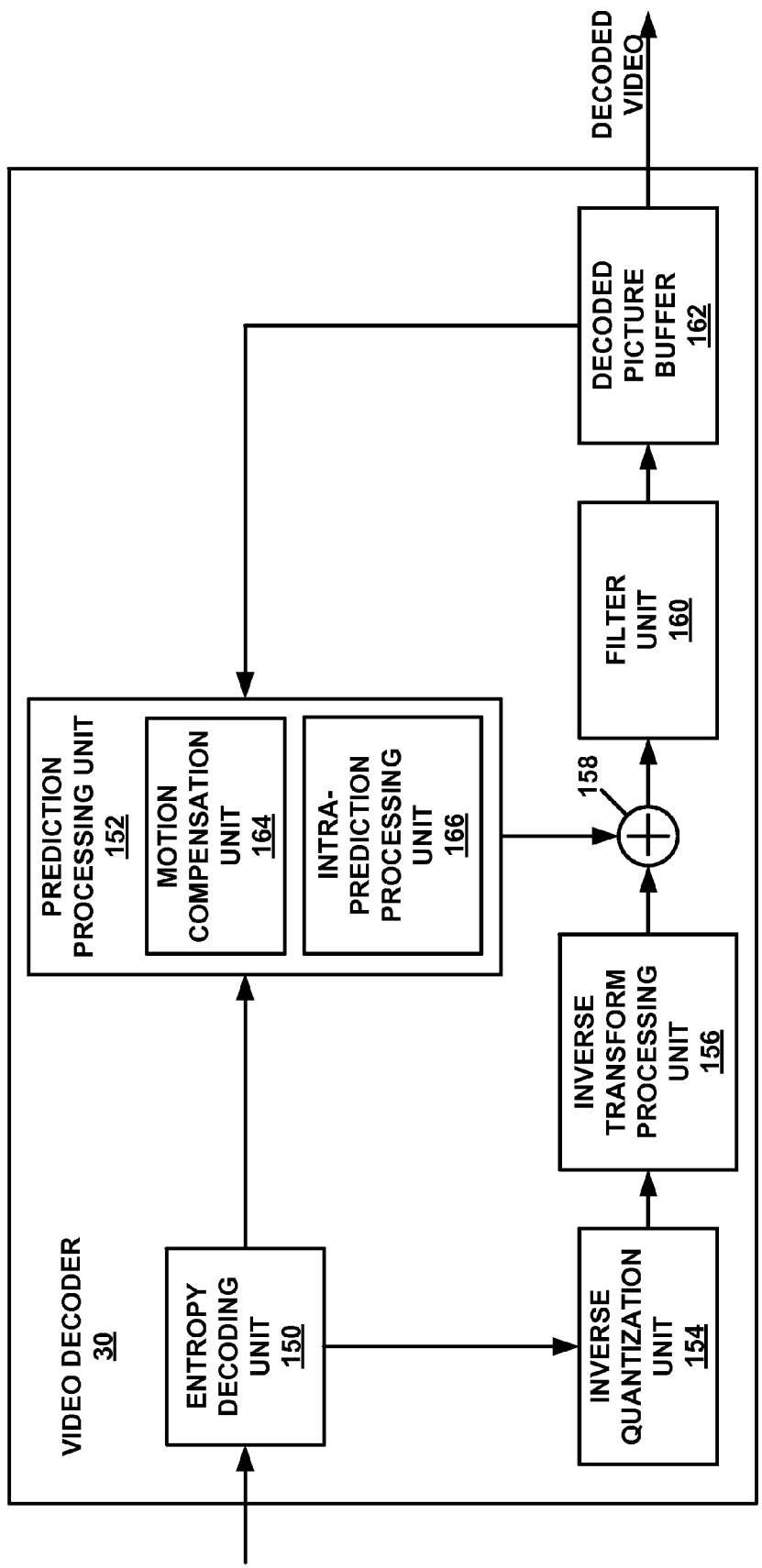
FIG. 8 is a block diagram illustrating an example video decoder that may implement the techniques described in this disclosure.

FIG. 8 is a block diagram illustrating an example video decoder 30 that may implement the techniques described in this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 8, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to obtaining syntax elements from the bitstream, video decoder 30 may perform reconstruction operations on CUs. To perform the reconstruction operation on a CU, video decoder 30 may perform a reconstruction operation on each TU of the CU. By performing the reconstruction operation on each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements obtained from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma. Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may obtain, from the bitstream, transform coefficient levels of the luma coefficient block, inverse quantize the transform coefficient levels, apply a transform to the transform coefficient levels to generate a transform block, generate, based at least in part on the transform block, a coding block, and output the coding block for display.

In accordance with a first example technique of this disclosure, when an initial reference picture in a reference picture list associated with a current video unit and a reference picture indicated by a reference index of a TMVP for the current video unit belong to different reference picture types, a video coder may set a reference index of a temporal merging candidate to a non-zero value (i.e. a value that indicates a position in the reference picture list other than the first position of the reference picture list). The reference index of the temporal merging candidate indicates a position in the reference picture list associated with the current video unit.

Furthermore, in accordance with the first example technique of this disclosure, an inter-view reference picture is considered as long-term. When the TMVP derivation is under merge mode, the video coder may change the final reference index. A variable mergeTMVP is set to 1 under merge mode and 0 under AMVP mode. In other words, mergeTMVP equal to 1 indicates merge mode and mergeTMVP equal to 0 indicates AMVP mode. For example, consider two reference pictures, one is the RefPicListX[0] and the other is the picture to which the RefPicListX motion vector of the TMVP refers. If one of the two reference pictures is short-term and the other is long-term, a video coder may perform a search in the current PU's RefPicListX until an entry i that satisfies RefPicListX[i] and the picture to which the RefPicListX motion vector of the TMVP refers are both short-term or both long-term.

To implement the first example technique of this disclosure, various changes may be made to HEVC Working Draft 7. Throughout the portions of this disclosure that indicate changes to various HEVC Working Drafts, text shown in bold and underline indicate added text. Furthermore, throughout the portions of this disclosure that indicate changes to various HEVC Working Drafts, text shown in SMALL CAPS indicate deleted text. To implement the first example technique of this disclosure, the following changes may be made to §8.5.2.1.1 of HEVC Working Draft 7. Portions of §8.5.2.1.1 of HEVC Working Draft 7 not shown in the following text may remain the same as in HEVC Working Draft 7.

8.5.2.1.1 Derivation Process for Luma Motion Vectors for Merge Mode

This process is only invoked when PredMode is equal to MODE_SKIP or PredMode is equal to MODE_INTER and merge_flag [xP][yP] is equal to 1, where (xP, yP) specify the top-left luma sample of the current prediction unit relative to the top-left luma sample of the current picture.

Inputs of this process are
- a luma location (xC, yC) of the top-left luma sample of the current coding unit relative to the top-left luma sample of the current picture,
- a luma location (xP, yP) of the top-left luma sample of the current prediction unit relative to the top-left luma sample of the current picture,
- a variable nCS specifying the size of the current coding unit.
- variables specifying the width and the height of the prediction unit for luma, nPSW and nPSH,
- a variable PartIdx specifying the index of the current prediction unit within the current coding unit.

Outputs of this process are
- the luma motion vectors mvL0 and mvL1,
- the reference indices refIdxL0 and retfdxL1,
- the prediction list utilization flags predFlagL0 and predFlagL1.

The variables singleMCLFlag is derived as follows.
- If log 2_parallel_merge_level_minus2 is greater than 0 and nCS is equal to 8, singleMCLFlag is set to 1.
- Otherwise, singleMCLFlag is set to 0.

When singleMCLFlag is equal to I, xP is set equal to xC, yP is set equal to yC, and both nPSW and nPSH are set equal to nCS.

NOTE—When singleMCLFlag is equal to 1, all the prediction units of the current coding unit share a single merging candidate list, which is identical to the merging candidate list of the 2N×2N prediction unit.

The motion vectors mvL0 and mvL1, the reference indices refIdxL0 and refIdxL1, and the prediction utilization flags predFlagL0 and predFlagL1 are derived as specified by the following ordered steps:

1. The derivation process for merging candidates from neighboring prediction unit partitions in subclause 8.5.2.1.2 is invoked with luma location (xP, yP), the variable singleMCLFlag, the width and the height of the prediction unit nPSW and nPSH and the partition index PartIdx as inputs and the output is assigned to the availability flags availableFlagN, the reference indices refIdxL0N and refIdxL1N, the prediction list utilization flags predFlagL0N and predFlagL1N and the motion vectors mvL0N and mvL1N with N being replaced by A0, A1, B0, B1 or B2.

2. The reference index for temporal merging candidate is derived as equal to 0 and mergeTMVP is set to 1.

3. . . . .

As shown in the changes to §8.5.2.1.1, the mergeTMVP variable is set to 1 during the derivation process for luma motion vectors for merge mode. Thus, the mergeTMVP variable indicates that the video coder is using merge mode.

Furthermore, in accordance with the first example technique of this disclosure, the following changes may be made to §8.5.2.1.7 of HEVC Working Draft 7.

8.5.2.1.7 Derivation Process for Temporal Luma Motion Vector Prediction

Inputs to this process are
- a luma location (xP, yP) specifying the top-left luma sample of the current prediction unit relative to the top-left sample of the current picture,
- variables specifying the width and the height of the prediction unit for luma, nPSW and nPSH,
- the reference index of the current prediction unit partition refIdxLX (with X being 0 or 1).

Outputs of this process are
- the motion vector prediction mvLXCol,
- the availability flag availableFlagLXCol.

The function RefPicOrderCnt(picX, refIdx, LX) returns the picture order count PicOrderCntVal of the reference picture with index refIdx from reference picture list LX of the picture picX and is specified as follows.

$$RefPicOrderCnt(picX, refIdx, LX) = PicOrderCnt(RefPicListX[refIdx] \text{ of the picture } picX) \quad (8\text{-}141)$$

Depending on the values of slice_type, collocated_from_10_flag, and collocated_ref_idx, the variable colPic, specifying the picture that contains the collocated partition, is derived as follows.

If slice_type is equal to B and collocated_from_10_flag is equal to 0, the variable colPic specifies the picture that contains the collocated partition as specified by RefPicList1[collocated_ref_idx].

Otherwise (slice_type is equal to B and collocated_from_10_flag is equal to 1 or slice_type is equal to P), the variable colPic specifies the picture that contains the collocated partition as specified by RefPicList0[collocated_ref_idx].

Variable colPu and its position (xPCol, yPCol) are derived in the following ordered steps:

1. The variable colPu is derived as follows $$yPRb = yP + nPSH \quad (8\text{-}139)$$

If(yP>>Log 2CtbSize) is equal to (yPRb>>Log 2CtbSize), the horizontal component of the right-bottom luma position of the current prediction unit is defined by $$xPRb = xP + nPSW \quad (8\text{-}140)$$

and the variable colPu is set as the prediction unit covering the modified position given by ((xPRb>>4)<<4, (yPRb>>4)<<4) inside the colPic.

Otherwise ((yP>>Log 2CtbSize) is not equal to (yPRb>>Log 2CtbSize)), colPu is marked as "unavailable".

2. When colPu is coded in an intra prediction mode or colPu is marked as "unavailable", the following applies.

Central luma position of the current prediction unit is defined by $$xPCtr = (xP + (nPSW>>1)) \quad (8\text{-}141)$$

$$yPCtr = (yP + (nPSH>>1)) \quad (8\text{-}142)$$

The variable colPu is set as the prediction unit covering the modified position given by ((xPCtr>>4)<<4, (yPCtr>>4)<<4) inside the colPic.

3. (xPCol, yPCol) is set equal to the top-left luma sample of the colPu relative to the top-left luma sample of the colPic.

The function LongTermRefPic(picX, refIdx, LX) is defined as follows. If the reference picture with index refIdx from reference picture list LX of the picture picX was marked as "used for long term reference" at the time when picX was the current picture. LongTermRefPic(picX, retfIdx, LX) returns 1; otherwise LongTermRefPic(picX, refIdx. LX) returns 0.

If mergeTMVP is 1 (under merge mode), the following applies and may change the value of refIdxLX.

If RefPicListX[0] is a long-term reference picture and LongTermRefPic(colPic, refIdxCol, listCol) is equal to 0, for 1 from 1 to num_ref_idx_1X_active_minus1. Inclusive, the following applies
If RefPicListX[i] is a short-term reference picture, refIdxLX is set to i, terminates the loop.

If RefPicListX[0] is a short-term reference picture and LongTermRefPic(colPic, refIdxCol, listCol) is equal to 1, for i from 1 to num_ref_idx_1X_active_minus1, inclusive, the following applies
if RefPicListX[i] is a long-term reference picture, refIdxLX is set to i, terminates the loop.

The variables mvLXCol and availableFlagLXCol are derived as follows.

If one or more of the following conditions are true, both components of mvLXCol are set equal to 0 and availableFlagLXCol is set equal to 0.
colPu is coded in an intra prediction mode.
colPu is marked as "unavailable".
pic_temporal_mvp_enable_flag is equal to 0.

Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MvL1[xPCol][yPCol], RefIdxL1[xPCol][yPCol], and L1, respectively.

Otherwise (PredFlagL0[xPCol][yPCol] is equal to 1), the following applies.
If PredFlagL1[xPCol][yPCol] is equal to 0, mvCol, refIdxCol, and listCol are set equal to MvL0[xPCol][yPCol], RefIdxL0[xPCol][yPCol], and L0, respectively.
Otherwise (PredFlagL1[xPCol][yPCol] is equal to 1), the following assignments are made.
If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_10_flag.

If one of the following conditions is true, the variable availableFlagLXCol is set equal to 0:
RefPicListX[refIdxLX] is a long-term reference picture and LongTermRefPic(colPic, refIdxCol, listCol) is equal to 0;
RefPicListX]refIdxLX] is a short-term reference picture and LongTermRefPic(colPic, refIdxCol, listCol) is equal to 1;

Otherwise, the variable availableFlagLXCol is set equal to 1, and the following applies.

IfRefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal−PicOrderCnt(RetPicListX[refIdxLX]), $mvLXCol=mvCol$ (8-143)

Otherwise, mvLXCol is derived as scaled version of the motion vector mvCol as specified below $tx=(16384+(Abs(td)>>1))/d$ (8-144)

$DistScaleFactor=Clip3(-4096,4095,(tb*tx+32)>>6)$ (8-145)

$mvLXCol=Clip3(-8192,8191.75,Sign(DistScaleFactor*mvCol)*((Abs(DistScaleFactor*mvCol)+127)>>8))$ (8-146)

where td and tb are derived as $td=Clip3(-128,127,PicOrderCnt(colPic)-RefPicOrderCnt(colPic,refIdxCol,listCol))$ (8-147)

$tb=Clip3(-128,127,PicOrderCntVal-PicOrderCnt(RefPicListX[refIdxLX]))$ (8-148)

As indicated in the changes shown above to section 8.5.2.1.7 of HEVC Working Draft 7, RefPicListX[0] indicates the first reference picture in the current PU's RefPicListX. Furthermore. LongTermRefPic(colPic, refIdxCol, listCol) indicates whether a reference picture in a reference picture list (i.e., listCol) of a co-located picture (i.e., colPic) at a position refIdxCol is a long-term reference picture.

Thus, if the first reference picture in the current PU's RefPicListX is a long-term reference picture and a reference picture indicated by a RefPicListX reference index of a TMVP in the co-located picture is not a long-term reference picture (i.e., LongTermRefPic(colPic, refIdxCol, listCol) is equal to 0), a video coder may set the RefPicListX reference index (i.e., refIdxLX) of a temporal merging candidate to a first short-term reference picture in the current PU's RefPicListX. If the first reference picture in the current PU's RefPicListX is a short-term reference picture and a reference picture indicated by a RefPicListX reference index of a TMVP in the co-located picture is not a long-term reference picture (i.e., LongTermRefPic(colPic, refIdxCol, listCol) is equal to 1), a video coder may set the RefPicListX reference index (i.e., refIdxLX) of a temporal merging candidate to a first long-term reference picture in the current PU's RefPicListX.

As described above, a video coder may, in accordance with a second example technique of this disclosure, determine whether both an initial reference picture of a current PU's RefPicListX and a reference picture referred to by a RefPicListX motion vector of a TMVP are both temporal short-term reference pictures. If so, the video coder may set a RefPicListX reference index of a temporal merging candidate to 0. Otherwise, the video coder may set the RefPicListX reference index of the temporal merging candidate to a non-zero value.

In the second example technique of this disclosure, an inter-view picture may be identified by a different dimension. In the second example technique of this disclosure, AddPicId may be used to identify the layer/view to which each picture belongs. For example, consider two reference pictures, one is the RefPicListX[0] and the other is a picture picT to which a RefPicListX motion vector of a TMVP refers. In this example, PicT is the target picture and if an i-th entry in RefPicListX has the same AddPicId as the PicT that is different from AddPicId of RefPicListX[0], i is set as the final reference index. When multiple entries meet the request, the video coder may set the smallest index as the final RefPicListX reference index of the temporal merging candidate.

In accordance with the second example technique of this disclosure, section 8.5.2.1.1 of HEVC Working Draft 7 may be changed as follows.

8.5.2.1.1 Derivation Process for Luma Motion Vectors for Merge Mode

This process is only invoked when PredMode is equal to MODE_SKIP or PredMode is equal to MODE_INTER and merge_flag [xP][yP] is equal to 1, where (xP, yP) specify the top-left luma sample of the current prediction unit relative to the top-left luma sample of the current picture.

Inputs of this process are
 a luma location (xC, yC) of the top-left luma sample of the current coding unit relative to the top-left luma sample of the current picture,
 a luma location (xP, yP) of the top-left luma sample of the current prediction unit relative to the top-left luma sample of the current picture,
 a variable nCS specifying the size of the current coding unit.
 variables specifying the width and the height of the prediction unit for luma, nPSW and nPSH,
 a variable PartIdx specifying the index of the current prediction unit within the current coding unit.

Outputs of this process are
 the luma motion vectors mvL0 and mvL1,
 the reference indices refIdxL0 and refIdxL1,
 the prediction list utilization flags predFlagL0 and predFlagL1.

The variables singleMCLFlag is derived as follows.
 If log 2_parallel_merge_level_minus2 is greater than 0 and nCS is equal to 8, singleMCLFlag is set to 1.
 Otherwise, singleMCLFlag is set to 0.

When singleMCLFlag is equal to 1, xP is set equal to xC, yP is set equal to yC, and both nPSW and nPSH are set equal to nCS.
 NOTE—When singleMCLFlag is equal to 1, all the prediction units of the current coding unit share a single merging candidate list, which is identical to the merging candidate list of the 2N×2N prediction unit.

The motion vectors mvL0 and mvL1, the reference indices refIdxL0 and refIdxL1, and the prediction utilization flags predFlagL0 and predFlagL1 are derived as specified by the following ordered steps:
 1. The derivation process for merging candidates from neighboring prediction unit partitions in subclause 8.5.2.1.2 is invoked with luma location (xP, yP), the variable singleMCLFlag, the width and the height of the prediction unit nPSW and nPSH and the partition index PartIdx as inputs and the output is assigned to the availability flags availableFlagN, the reference indices refIdxL0N and refIdxL1N, the prediction list utilization flags predFlagL0N and predFlag L1N and the motion vectors mvL0N and mvL1N with N being replaced by A0, A1, B0, B1 or B2.
 2. The reference index for temporal merging candidate is derived as equal to 0 and mergeTMVP is set to 1.
 3. . . . .

As shown in the changes to §8.5.2.1.1, a mergeTMVP variable is set to 1 during the derivation process for luma motion vectors for merge mode. Thus, the mergeTMVP variable indicates that the video coder is using merge mode.

In accordance with the second example technique of this disclosure, section 8.5.2.1.7 of HEVC Working Draft 7 may be modified as follows:

8.5.2.1.7 Derivation Process for Temporal Luma Motion Vector Prediction

Inputs to this process are
  a luma location (xP, yP) specifying the top-left luma sample of the current prediction unit relative to the top-left sample of the current picture,
  variables specifying the width and the height of the prediction unit for luma, nPSW and nPSH,
  the reference index of the current prediction unit partition refIdxLX (with X being 0 or 1).
Outputs of this process are
  the motion vector prediction mvLXCol,
  the availability flag availableFlagLXCol.
The function RefPicOrderCnt(picX, refIdx, LX) returns the picture order count PicOrderCntVal of the reference picture with index refIdx from reference picture list LX of the picture picX and is specified as follows.

$$RefPicOrderCnt(picX, refIdx, LX) = PicOrderCnt(RefPicListX[refIdx] \text{ of the picture } picX) \quad (8\text{-}141)$$

Depending on the values of slice_type, collocated_from_l0_flag, and collocated_ref_idx, the variable colPic, specifying the picture that contains the collocated partition, is derived as follows.
  If slice_type is equal to B and collocated_from_l0_flag is equal to 0, the variable colPic specifies the picture that contains the collocated partition as specified by RefPicList1[collocated_ref_idx].
  Otherwise (slice_type is equal to B and collocated_from_l0_flag is equal to 1 or slice_type is equal to P), the variable colPic specifies the picture that contains the collocated partition as specified by RefPicList0[collocated_ref_idx].
Variable colPu and its position (xPCol, yPCol) are derived in the following ordered steps:
1. The variable colPu is derived as follows $$yPRb = yP + nPSH \quad (8\text{-}139)$$

If (yP>>Log 2CtbSize) is equal to (yPRb>>Log 2CtbSize), the horizontal component of the right-bottom luma position of the current prediction unit is defined by $$xPRb = xP + nPSW \quad (8\text{-}140)$$

and the variable colPu is set as the prediction unit covering the modified position given by ((xPRb>>4)<<4, (yPRb>>4)<<4) inside the colPic.
  Otherwise ((yP>>Log 2CtbSize) is not equal to (yPRb>>Log 2CtbSize)), colPu is marked as "unavailable".
2. When colPu is coded in an intra prediction mode or colPu is marked as "unavailable", the following applies.
  Central luma position of the current prediction unit is defined by $$xPCtr = (xP + (nPSW>>1)) \quad (8\text{-}141)$$

$$yPCtr = (yP + (nPSH>>1)) \quad (8\text{-}142)$$

The variable colPu is set as the prediction unit covering the modified position given by ((xPCtr>>4)<<4, (yPCtr>>4)<<4) inside the colPic.

3. (xPCol, yPCol) is set equal to the top-left luma sample of the colPu relative to the top-left luma sample of the colPic.

The function LongTermRefPic(picX, refIdx, LX) is defined as follows. If the reference picture with index refIdx from reference picture list LX of the picture picX was marked as "used for long term reference" at the time when picX was the current picture, LongTermRefPic (picX, refIdx, LX) returns 1; otherwise LongTermRefPic(picX, refIdx, LX) returns 0.

AddPicId(picX, refIdx, LX) returns AddPicId(pic), wherein pic is the reference picture with index refIdx from reference picture list LX of the picture picX. Denote currpic as the current picture.

If mergeTMVP is 1 (under merge mode), the following applies and may change the value of refIdxLX.
  If AddPicId(RefPicListX[0]) is not equal to AddPicId (colPic, refIdxCol, listCol)
    If AddPicId(RefPicListX[0]) is equal to AddPicId (currPic), for i from 1 to num_ref_idx_1X_active_minus1, inclusive, the following applies
      If AddPicId(RefPicListX[i]) is equal to AddPicId (colPic, refIdxCol, listCol), refIdxLX is set to i, terminates the loop.
    Otherwise, if AddPicId(colPic, refIdxCol, listCol) is equal to AddPicId (currPic), for i from 1 to num_ref_idx 1X_active_minus1, inclusive, the following applies
      If AddPicId(RefPicListX[i]) is equal to AddPicId (currPic), refIdxLX is set to i, terminates the loop.
    Otherwise (AddPicId(colPic, refIdxCol, listCol) is not equal to AddPIcId (currPic) and AddPicId(RefPicListX[0] is not equal to AddPicId (currPic)), do nothing.
      If AddPicId(RefPicListX[i]) is equal to AddPicId (colPic, refIdxCol, listCol), refIdxLX Is set to i, terminates the loop.
      Alternatively, when refIdxLX is still 0, the motion vector can be scaled based on the AddPIcId distances. The scaling factor is (AddPicId(RefPicListX[0])−AddPicId (currPic))/(AddPicId (colPic, refIdxCol, listCol)−AddPicId(colPic))
  If AddPicId(RefPicListX[0]) is equal to AddPicId (colPic, refIdxCol, listCol)
    If AddPicId(RefPicListX[0]) is equal to AddPicId (currPic), do nothing.
    If AddPicId(RefPicListX[0]) is not equal to AddPicId (currPic), do nothing.
      Alternatively, the motion vector can be scaled based on the AddPicId distances if the AddPicId (colPic) is not equal to AddPicId(currPid). The scaling factor is (AddPicId(RefPicListX[0])−AddPicId (currPic))/(AddPicId(colPic, refIdxCol, listCol)−AddPIcId(colPic)).

The variables mvLXCol and availableFlagLXCol are derived as follows.
  If one or more of the following conditions are true, both components of mvLXCol are set equal to 0 and availableFlagLXCol is set equal to 0.
    colPu is coded in an intra prediction mode.
    colPu is marked as "unavailable".
    pic_temporal_mvp_enable_flag is equal to 0.
  Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MvL1[xPCol][yPCol], RefIdxL1[xPCol][yPCol], and L1, respectively.

Otherwise (PredFlagL0[xPCol][yPCol] is equal to 1), the following applies.

If PredFlagL1[xPCol][yPCol] is equal to 0, mvCol, refIdxCol, and listCol are set equal to MvL0[xPCol][yPCol], RefIdxL0[xPCol][yPCol], and L0, respectively.

Otherwise (PredFlagL1[xPCol][yPCol] is equal to 1), the following assignments are made.

If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_10_flag.

If one of the following conditions is true, the variable availableFlagLXCol is set equal to 0.

AddPicId(RefPicListX[refIdxLX]) is not equal to AddPicId(colPic, refIdxCol, listCol);

RefPicListX[refIdxLX] is a short-term reference picture and LongTermRefPic(colPic, refIdxCol, listCol) is equal to 1;

RefPicListX[refIdxLX] is a long-term reference picture and LongTermRefPic(colPic, refIdxCol, listCol) is equal to 0;

Otherwise, the variable availableFlagLXCol is set equal to 1, and the following applies.

If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal−PicOrderCnt(RefPicListX[refIdxLX]), $mvLXCol = mvCol$ (8-143)

Otherwise, mvLXCol is derived as scaled version of the motion vector mvCol as specified below $tx = (16384 + (Abs(td) >> 1))/td$ (8-144)

$DistScaleFactor = Clip3(-4096, 4095, (tb*tx+32) >> 6)$ (8-145)

$mvLXCol = Clip3(-8192, 8191.75, Sign(DistScaleFactor*mvCol)*((Abs(DistScaleFactor*mvCol)+127) >> 8))$ (8-146)

where td and tb are derived as $td = Clip3(-128, 127, PicOrderCnt(colPic) - RefPicOrderCnt(colPic, refIdxCol, listCol))$ (8-147)

$tb = Clip3(-128, 127, PicOrderCntVal - PicOrderCnt(RefPicListX[refIdxLX]))$ (8-148)

A third example technique of this disclosure is similar to the first and second example techniques described above. However, the third example technique distinguishes between short-term and long-term reference pictures. For example, consider two reference pictures. One of the reference pictures is RefPicListX[0] and the other reference picture is the picture picT (i.e., the picture to which the RefPicListX motion vector of a TMVP refers). When the additional picture identifier of picT (i.e., AddPicId(PicT)) is different than the additional picture identifier of RefPicListX[0] or both RefPicListX[0] and picT are temporal reference pictures but only one of RefPicListX[0] and picT is a short-term reference picture, an i-th entry in RefPicListX has the same AddPicId as the picT and they are both short-term temporal reference pictures or both long-term temporal reference pictures, or both are non-temporal reference pictures, the video coder may set the final reference index to i. When multiple entries in the current PU's RefPicListX meet the request, the video coder may set the smallest index as the final RefPicListX reference index of the temporal merging candidate.

In a fourth example technique of this disclosure, a video coder may signal, in a slice header, a ref_idx of a temporal reference picture (T_ref_idx_1x) and the ref_idx of an inter-view reference (only) picture (D_ref_idx_1x). If the reference picture type of RefPicListX[0] is temporal, the video coder may set the final RefPicListX reference index of the temporal merging candidate to D_ref_idx_1x. If the reference picture type of RefPicListX[0] is disparity, the video coder may set the final RefPicListX reference index of the temporal merging candidate to T_ref_idx_1x.

Alternatively, in some examples, the video coder may derive T_ref_idx_1X and D_ref_idx_1X as follows for both X equal to 0 and 1 if RefPicListX is available. For each j from 0 to num_ref_idx_1X_active_minus1, inclusive, the following applies: if RefPicListX[j] is a temporal reference picture. T_ref_idx_1X is set to j, and return. For each j from 0 to num_ref_idx_1X_active_minus1, inclusive, the following applies: if RefPicListX[j] is not a temporal reference picture, T_ref_idx_1X is set to j, and return. In one example, the video coder may determine whether RefPicListX[j] is a temporal reference picture or not by checking a marking status (e.g., long-term, short-term, or neither) of RefPicListX[j]. In another example, the video coder may determine whether RefPicListX[j] is a temporal reference picture or not by checking a hook in a base specification that identifies a reference picture type of a picture. In another example, the video coder may determine whether RefPicListX[j] is a temporal reference picture or not by comparing POC values of the current picture and RefPicListX[j].

In the fourth example technique of this disclosure, section 8.5.2.1.1 of HEVC Working Draft 7 may be modified as follows:

8.5.2.1.1 Derivation Process for Luma Motion Vectors for Merge Mode

This process is only invoked when PredMode is equal to MODE_SKIP or PredMode is equal to MODE_INTER and merge_flag [xP][yP] is equal to 1, where (xP, yP) specify the top-left luma sample of the current prediction unit relative to the top-left luma sample of the current picture.

Inputs of this process are a luma location (xC, yC) of the top-left luma sample of the current coding unit relative to the top-left luma sample of the current picture, a luma location (xP, yP) of the top-left luma sample of the current prediction unit relative to the top-left luma sample of the current picture, a variable nCS specifying the size of the current coding unit, variables specifying the width and the height of the prediction unit for luma, nPSW and nPSH, P a variable PartIdx specifying the index of the current prediction unit within the current coding unit.

Outputs of this process are
the luma motion vectors mvL0 and mvL1,
the reference indices refIdxL0 and refIdxL1,
the prediction list utilization flags predFlagL0 and predFlagL1.
The variables singleMCLFlag is derived as follows.
If log 2_parallel_merge_level_minus2 is greater than 0 and nCS is equal to 8, singleMCLFlag is set to 1.
Otherwise, singleMCLFlag is set to 0.
When singleMCLFlag is equal to 1, xP is set equal to xC, yP is set equal to yC, and both nPSW and nPSH are set equal to nCS.
NOTE—When singleMCLFlag is equal to 1, all the prediction units of the current coding unit share a single merging candidate list, which is identical to the merging candidate list of the 2N×2N prediction unit.
The motion vectors mvL0 and mvL1, the reference indices refIdxL0 and refIdxL1, and the prediction utilization flags predFlagL0 and predFlagL1 are derived as specified by the following ordered steps:
1. The derivation process for merging candidates from neighboring prediction unit partitions in subclause 8.5.2.1.2 is invoked with luma location (xP, yP), the variable singleMCLFlag, the width and the height of the prediction unit nPSW and nPSH and the partition index PartIdx as inputs and the output is assigned to the availability flags availableFlagN, the reference indices refIdxL0N and refIdxL1N, the prediction list utilization flags predFlagL0N and predFlagL1N and the motion vectors mvL0N and mvL1N with N being replaced by A0, A1, B0, B1 or B2.
2. The reference index for temporal merging candidate is derived as equal to 0 and mergeTMVP is set to 1.
3. . . . .

As shown in the changes to §8.5.2.1.1, a mergeTMVP variable is set to 1 during the derivation process for luma motion vectors for merge mode. Thus, the mergeTMVP variable indicates that the video coder is using merge mode.

Furthermore, in accordance with the fourth example technique of this disclosure, section 8.5.2.1.7 of HEVC Working Draft 7 may be modified as follows:

8.5.2.1.7 Derivation Process for Temporal Luma Motion Vector Prediction
Inputs to this process are
a luma location (xP, yP) specifying the top-left luma sample of the current prediction unit relative to the top-left sample of the current picture,
variables specifying the width and the height of the prediction unit for luma, nPSW and nPSH,
the reference index of the current prediction unit partition refIdxLX (with X being 0 or 1).
Outputs of this process are
the motion vector prediction mvLXCol,
the availability flag availableFlagLXCol.
The function RefPicOrderCnt(picX, refIdx, LX) returns the picture order count PicOrderCntVal of the reference picture with index refIdx from reference picture list LX of the picture picX and is specified as follows.

$$RefPicOrderCnt(picX, refIdx, LX) = PicOrderCnt(RefPicListX[refIdx] \text{ of the picture } picX) \quad (8\text{ }141)$$

Depending on the values of slice_type, collocated_from_l0_flag, and collocated_ref_idx, the variable colPic, specifying the picture that contains the collocated partition, is derived as follows.
If slice_type is equal to B and collocated_from_l0_flag is equal to 0, the variable colPic specifies the picture that contains the collocated partition as specified by RefPicList1[collocated_ref_idx].
Otherwise (slice_type is equal to B and collocated_from_l0_flag is equal to 1 or slice_type is equal to P), the variable colPic specifies the picture that contains the collocated partition as specified by RefPicList0[collocated_ref_idx].
Variable colPu and its position (xPCol, yPCol) are derived in the following ordered steps:
1. The variable colPu is derived as follows $$yPRb = yP + nPSH \quad (8\text{-}139)$$

If(yP>>Log 2CtbSize) is equal to (yPRb>>Log 2CtbSize), the horizontal component of the right-bottom luma position of the current prediction unit is defined by $$xPRb = xP + nPSW \quad (8\text{-}140)$$

and the variable colPu is set as the prediction unit covering the modified position given by ((xPRb>>4)<<4, (yPRb>>4)>>4) inside the colPic.
Otherwise ((yP>>Log 2CtbSize) is not equal to (yPRb>>Log 2CtbSize), colPu is marked as "unavailable".
2. When colPu is coded in an intra prediction mode or colPu is marked as "unavailable", the following applies.
Central luma position of the current prediction unit is defined by $$xPCtr = (xP + (nPSW >> 11) \quad (8\text{-}141)$$

$$yPCtr = (yP + (nPSH >> 1) \quad (8\text{-}142)$$

The variable colPu is set as the prediction unit covering the modified position given by ((xPCtr>>4)<<4, (yPCtr>>4)<<4) inside the colPic.
3. (xPCol, yPCol) is set equal to the top-left luma sample of the colPu relative to the top-left luma sample of the colPic.
The function LongTermRefPic(picX, refIdx, LX) is defined as follows. If the reference picture with index refIdx from reference picture list LX of the picture picX was marked as "used for long term reference" at the time when picX was the current picture, LongTermRefPic (picX, refIdx, LX) returns 1; otherwise LongTermRefPic(picX, refIdx, LX) returns 0.
If mergeTMVP is 1 (under merge mode), the following applies and may change the value of refIdxLX.
If LongTermRefPic(colPic, refIdxCol, listCol) is equal to 0, refIdxLX is set to T_ref_idx_1X
Otherwise, refIdxLX is set to D_ref_idx_1X.
. . . .
In an alternate version of the modified version of section 8.5.2.1.7 shown above, the last shown line is "Otherwise, refIdxLX is set to I, refIdxLX is set to D_ref_idx_1X."
As indicated in the modified version of section 8.5.2.1.7, if the derivation process for temporal luma motion vector prediction is being performed for merge mode (i.e., mergeTMVP is equal to 1), a video coder may determine whether LongTermRefPic(colPic, refIdxCol, listCol) is equal to 0. colPic indicates a co-located picture, refIdxCol indicates a reference index of a TMVP in the co-located picture, listCol indicates a reference picture list to which refIdxCol refers. Thus, LongTermRefPic(colPic, refIdxCol, listCol) equal to 0 indicates that a reference picture indicated by a RefPicListX reference index (with X equal to listCol) of a TMVP in colPic is not a long-term reference picture (i.e., a short-term reference picture). If so, the video coder sets refIdxLX (i.e. the RefPicListX reference index of a temporal merging candidate) to T_ref_idx_1X. Otherwise, the video coder sets refIdxLX to D_ref_idx_1X.

A fifth example technique of this disclosure is similar to the third example technique described above. However, in the fifth example technique, video encoder 20 may signal a tmvp_merge_temporal_flag syntax element in a slice header. The tmvp_merge_temporal_flag syntax element equal to 0 indicates the target reference index from the TMVP merge candidate is equal to T_ref_idx_1x. The tmvp_merge_temporal_flag syntax element equal to 1 indicates that the RefPicListX reference index of the temporal merging candidate (i.e., the target merge TMVP reference index) is equal to D_ref_idx_1x. When the tmvp_merge_temporal_flag syntax element is not present, video decoder 30 may infer that the tmvp_merge_temporal_flag syntax element is equal to 0 and the RefPicListX reference index of the temporal merging candidate is equal to 0. At least one of the T_ref_idx_1x and D_ref_idx_1x is equal to 0.

In the fifth example technique, section 8.5.2.1.1 of HEVC Working Draft 7 may be modified as follows:

Derivation Process for Luma Motion Vectors for Merge Mode

This process is only invoked when PredMode is equal to MODE_SKIP or PredMode is equal to MODE_INTER and merge_flag [xP][yP] is equal to 1, where (xP, yP) specify the top-left luma sample of the current prediction unit relative to the top-left luma sample of the current picture.

Inputs of this process are a luma location (xC, yC) of the top-left luma sample of the current coding unit relative to the top-left luma sample of the current picture, a luma location (xP, yP) of the top-left luma sample of the current prediction unit relative to the top-left luma sample of the current picture, a variable nCS specifying the size of the current coding unit, variables specifying the width and the height of the prediction unit for luma, nPSW and nPSH, a variable PartIdx specifying the index of the current prediction unit within the current coding unit.

Outputs of this process are the luma motion vectors mvL0 and mvL1, the reference indices refIdxL0 and refIdxL1, the prediction list utilization flags predFlagL0 and predFlagL1.

The variables singleMCLFlag is derived as follows.

If log 2_parallel_merge_level_minus2 is greater than 0 and nCS is equal to 8, singleMCLFlag is set to 1.

Otherwise, singleMCLFlag is set to 0.

When singleMCLFlag is equal to 1, xP is set equal to xC, yP is set equal to yC, and both nPSW and nPSH are set equal to nCS.

NOTE—When singleMCLFlag is equal to 1, all the prediction units of the current coding unit share a single merging candidate list, which is identical to the merging candidate list of the 2N×2N prediction unit.

The motion vectors mvL0 and mvL1, the reference indices refIdxL0 and refIdxL1, and the prediction utilization flags predFlagL0 and predFlagL1 are derived as specified by the following ordered steps:

1. The derivation process for merging candidates from neighboring prediction unit partitions in subclause 8.5.2.1.2 is invoked with luma location (xP, yP), the variable singleMCLFlag, the width and the height of the prediction unit nPSW and nPSH and the partition index PartIdx as inputs and the output is assigned to the availability flags availableFlagN, the reference indices refIdxL0N and refIdxL1N, the prediction list utilization flags predFlagL0N and predFlagL1N and the motion vectors mvL0N and mvL1N with N being replaced by $A_0, A_1, B_0, B_1$ or $B_2$.

The reference index for temporal merging candidate is derived as equal to T_ref_idx_1x when tmvp_merge_temporal_flag is 0 and T_ref_idx_1x when tmvp_merge_temporal_flag is 1. AS FOLLOWS.

IF THE FOLLOWING CONDITIONS ARE TRUE, REFIDXLX IS SET EQUAL TO REFIDXLX [XP−1, YP+NPSH−1].

THE PREDICTION UNIT COVERING LUMA LOCATION (XP−1, YP+NPSH−1) IS AVAILABLE [ED. (BB): REWRITE IT USING MINCBADDRZS[ ][ ] AND THE AVAILABILITY PROCESS FOR MINIMUM CODING BLOCKS]

THE PARTIDX IS EQUAL TO 0

PREDMODE IS NOT MODE_INTRA (XP>>(LOG 2_PARALLEL_MERGE_LEVEL_MINUS2+2))!=((XP−1)>>(LOG 2_PARALLEL_MERGE_LEVEL_MINUS2+2))|| (YP>>(LOG 2_PARALLEL_MERGE_LEVEL_MINUS2+2))!=((YP+NPSH−1)>>(LOG 2_PARALLEL_MERGE_LEVEL_MINUS2+2))

OTHERWISE, REFIDXLX IS SET EQUAL TO 0.

2. THE DERIVATION PROCESS FOR TEMPORAL LUMA MOTION VECTOR PREDICTION IN SUBCLAUSE 8.5.2.1.7 IS INVOKED WITH LUMA LOCATION (XP, YP), REFIDXLX AS THE INPUTS AND WITH THE OUTPUT BEING THE AVAILABILITY FLAG AVAILABIEFLAGLXCOL AND THE TEMPORAL MOTION VECTOR MVLXCOL. THE VARIABLES AVAILABLEFLAGCOL AND PREDFLAGLXCOL (WITH X BEING 0 or 1, RESPECTIVELY) ARE DERIVED AS SPECIFIED BELOW.

AVAILABLEFLAGCOL=AVAILABLEFLAGL0COL|| AVAILABLEFLAG1COL   (8-87)

PREDFLAGLXCOL=AVAILABLEFLAGLXCOL   (8-88)

3. THE MERGING CANDIDATE LIST, MERGECANDLIST, IS CONSTRUCTED AS FOLLOWS.
   1. $A_1$, IF AVAILABLEFLAG$A_1$ IS EQUAL TO 1
   2. $B_1$, IF AVAILABLEFLAG$B_1$ IS EQUAL TO 1
   3. $B_0$, IF AVAILABLEFLAG$B_0$ IS EQUAL TO 1
   4. $A_0$, IF AVAILABLEFLAG$A_0$ IS EQUAL TO 1
   5. $B_2$, IF AVAILABLEFLAG$B_2$ IS EQUAL TO 1
   6. COL, IF AVAILABLEFLAGCOL IS EQUAL TO 1
4. THE VARIABLE NUMMERGECAND AND NUMORIGMERGECAND ARE SET TO THE NUMBER OF MERGING CANDIDATES IN THE MERGECANDLIST.
5. WHEN SLICE_TYPE IS EQUAL TO B, THE DERIVATION PROCESS FOR COMBINED BI-PREDICTIVE MERGING CANDIDATES SPECIFIED IN SUBCLAUSE 8.5.2.1.3 IS INVOKED WITH MERGECANDLIST, THE REFERENCE INDICES REFIDXL0N AND REFIDXL1N, THE PREDICTION LIST UTILIZATION FLAGS PREDFLAGL0N AND PREDFLAGL1N, THE MOTION VECTORS MVL0N AND MVL1N OF EVERY CANDIDATE N BEING IN

MERGECANDLIST, NUMMERGECAND AND NUMORIGMERGECAND GIVEN AS INPUT AND THE OUTPUT IS ASSIGNED TO MERGECANDLIST, NUMMERGECAND, THE REFERENCE INDICES REFIDXL0COMBCAND$_K$ AND REFIDXL1COMBCAND$_K$, THE PREDICTION LIST UTILIZATION FLAGS PREDFLAGL0COMBCAND$_K$ AND PREDFLAGL1COMBCAND$_K$ AND THE MOTION VECTORS MVL0COMBCAND$_K$ AND MVL1CoMBCAND$_K$ OF EVERY NEW CANDIDATE COMBCAND$_K$ BEING ADDED IN MERGECANDLIST. THE NUMBER OF CANDIDATES BEING ADDED NUMCOMBMERGECAND IS SET EQUAL TO (NUMMERGECAND−NUMORIGMERGECAND). WHEN NUMCOMBMERGECAND IS GREATER THAN 0, K RANGES FROM 0 TO NUMCOMBMERGECAND−1, INCLUSIVE.

6. THE DERIVATION PROCESS FOR ZERO MOTION VECTOR MERGING CANDIDATES SPECIFIED IN SUBCLAUSE 8.5.2.1.4 IS INVOKED WITH THE MERGECANDLIST, THE REFERENCE INDICES REFIDXL0N AND REFIDXL1N, THE PREDICTION LIST UTILIZATION FLAGS PREDFLAGL0N AND PREDFLAGL1N, THE MOTION VECTORS MvL0N AND MVL1N OF EVERY CANDIDATE N BEING IN MERGECANDLIST AND THE NUMMERGECAND AS THE INPUTS AND THE OUTPUT IS ASSIGNED TO MERGECANDLIST, NUMMERGECAND, THE REFERENCE INDICES REFIDXL0ZEROCAND$_M$ AND REFIDXL1ZEROCAND$_M$, THE PREDICTION LIST UTILIZATION FLAGS PREDFLAGL0ZEROCAND$_M$ AND PREDFLAGL1ZEROCAND$_M$, THE MOTION VECTORS MVL0ZEROCAND$_M$ AND MVL1ZEROCAND$_M$ OF EVERY NEW CANDIDATE ZEROCAND$_M$ BEING ADDED IN MERGECANDLIST. THE NUMBER OF CANDIDATES BEING ADDED NUMZEROMERGECAND IS SET EQUAL TO (NUMMERGECAND−NUMORIGMERGECAND−NUMCOMBMERGECAND−NUMNSCALEMERGECAND). WHEN NUMZEROMERGECAND IS GREATER THAN 0, M RANGES FROM 0 TO NUMZEROMERGECAND−1, INCLUSIVE.

7. THE FOLLOWING ASSIGNMENTS ARE MADE WITH N BEING TIE CANDIDATE AT POSITION MERGE_IDX[XP][YP] IN THE MERGING CANDIDATE LIST MERGECANDLIST (N=MERGECANDLIST[MERGE_IDX[XP][YP]]) AND X BEING REPLACED BY 0 OR 1:

*MVLX[0]=MVLXN[0]* (8-89)

*MVLX[1]=MVLXN[1]* (8-90)

*REFIDXLX=REFIDXLXN* (8-91)

*PREDFLAGLX=PREDFLAGLXN* (8-92)

In a sixth example technique of this disclosure, an additional target reference index is enabled. In the above example, all short-term reference pictures are still scaled towards the reference picture with reference index equal to 0, as in the current HEVC specification. However, for all long-term reference pictures, the video coder derives a new reference index (ref_idx N, named refIdxL0A and refIdxL1A in the below description) so that the motion vectors referring to a long-term reference picture may be used to form a merging candidate. In general, when the first reference picture in a current PU's RefPicListX is a short-term reference picture (i.e., the reference index equal to 0 represents a short-term reference picture), the newly-added target reference index is used to represent a long-term reference picture. However, when the first reference picture in the current PU's RefPicListX is a long-term reference picture (i.e., the reference index equal to 0 represents a long-term reference picture), the video coder may use the newly-added target reference index to represent an inter-view reference picture. Similar to the current HEVC specification, if the target reference index corresponds to a long-term reference picture, the motion vector in a co-located block, if considered as available, is not scaled.

Section 8.3.5 of HEVC Working Draft 7 describes marking of reference pictures before decoding. In accordance with the sixth example technique of this disclosure, section 8.3.5 of HEVC Working Draft may be replaced with the following text:

8.3.5 Derivation Process for the Additional Target Reference Index for TMVP

This process is invoked when the current slice is a P or B slice. Additional target reference indices refIdxL0A and refIdxL1A are derived.

Set variables refIdxL0A and refIdxL1A to both −1.

The following apply to derive refIdxL0A

```
bZeroIdxLongTermFlag = RefPicList0[ 0 ] is a short-term reference
picture ? 0 : 1
bFound   = 0;
for( i = 1; i <= num_ref_idx_10_active_minus1&&! bFound; i++)
    if ( (bZeroIdxLongTermFlag && RefPicList0[ i ] is a short-term
    reference picture) ||
        (!bZeroIdxLongTermFlag && RefPicList0[ i ] is a long-term
reference picture) ) {
            refIdxL0A = i
            bFound =1
    }
```

When the slice is a B slice, the following apply to derive refIdxL1A.

```
bZeroIdxLongTermFlag = RefPicList1[ 0 ] is a short-term reference
picture ? 0 : 1
bFound   = 0;
for( i = 1; i <= num_ref_idx_11_active_minus1&&! bFound; i++)
    if ( (bZeroIdxLongTermFlag && RefPicList1[ i ] is a short-term
    reference picture) ||
        (!bZeroIdxLongTermFlag && RefPicList1[ i ] is a long-term
reference picture) ) {
            refIdxL1A = i
            bFound =1
    }
```

Furthermore, in the sixth example technique of this disclosure, during temporal motion vector prediction, when the current mode is merge mode, the target reference index 0 may be changed to refIdxLXA (with X being equal to 0 or 1), refIdxLXA may denote a non-zero reference index value. The AMVP mode is not changed.

Section 8.5.2.1.1 of HEVC Working Draft 7 describes a derivation process for luma motion vectors for merge mode. In the sixth example technique of this disclosure, section 8.5.2.1.1 of HEVC Working Draft 7 may be modified as follow:

8.5.2.1.1 Derivation Process for Luma Motion Vectors for Merge Mode

This process is only invoked when PredMode[xC][yC] is equal to MODE_SKIP or PredMode[xC][yC] is equal to MODE_INTER and merge_flag [xP][yP] is equal to 1, where (xP, yP) specify the top-left sample of the current luma prediction block relative to the top-left luma sample of the current picture.

Inputs of this process are
- a luma location (xC, yC) of the top-left sample of the current luma coding block relative to the top-left luma sample of the current picture,
- a luma location (xP, yP) of the top-left sample of the current luma prediction block relative to the top-left luma sample of the current picture,
- a variable nCS specifying the size of the current luma coding block, variables specifying the width and the height of the luma prediction block, nPbW and nPbH,
- a variable partIdx specifying the index of the current prediction unit within the current coding unit.

Outputs of this process are
- the luma motion vectors mvL0 and mvL1,
- the reference indices refIdxL0 and refIdxL1,
- the prediction list utilization flags predFlagL0 and predFlagL1.

The variables singleMCLFlag is derived as follows.
  If log 2_parallel_merge_level_minus2 is greater than 0 and nCS is equal to 8, singleMCLFlag is set to 1.
  Otherwise, singleMCLFlag is set to 0.

When singleMCLFlag is equal to 1, xP is set equal to xC, yP is set equal to yC, and both nPbW and nPbH are set equal to nCS.
  NOTE—When singleMCLFlag is equal to 1, all the prediction units of the current coding unit share a single merging candidate list, which is identical to the merging candidate list of the 2N×2N prediction unit.

The motion vectors mvL0 and mvL1, the reference indices refIdxL0 and refIdxL1, and the prediction utilization flags predFlagL0 and predFlagL1 are derived as specified by the following ordered steps:

1. The derivation process for merging candidates from neighboring prediction unit partitions in subclause 8.5.2.1.2 is invoked with the luma coding block location (xC, yC), the coding block size nCS, the luma prediction block location (xP, yP), the variable singleMCLFlag, the width and the height of the luma prediction block nPbW and nPbH and the partition index partIdx as inputs and the output is assigned to the availability flags availableFlagN, the reference indices refIdxL0N and refIdxL1N, the prediction list utilization flags predFlagL0N and predFlagL1N and the motion vectors mvL0N and mvL1N with N being replaced by A0, A1, B0, B1 or B2.
2. The reference index for temporal merging candidate refIdxLX (with X being 0 or 1) is set equal to 0.
3. The derivation process for temporal luma motion vector prediction in subclause 8.5.3.1.7 is invoked with luma location (xP, yP), the width and the height of the luma prediction block nPbW and nPbH, AND refIdxLX and mergeTMVP equal to 1 as the inputs and with the output being the availability flag availableFlagLXCol and the temporal motion vector mvLXCol. The variables availableFlagCol and predFlagLXCol (with X being 0 or 1, respectively) are derived as specified below.
4. . . . .
. . . .

Thus, in the modified version of section 8.5.2.1.1 shown above, the temporal luma motion vector prediction process of section 8.5.3.1.7 is invoked with the mergeTMVP variable equal to 1. A version of section 8.5.3.1.7 modified in accordance with the sixth example technique is described elsewhere in this disclosure.

Section 8.5.3.1.5 of HEVC Working Draft 7 describes a derivation process for luma motion vector prediction for AMVP mode. In accordance with the sixth example technique of this disclosure, section 8.5.3.1.5 of HEVC Working Draft 7 may be changed as follows:

8.5.3.1.5 Derivation Process for Luma Motion Vector Prediction

Inputs to this process are
- a luma location (xC, yC) of the top-left sample of the current luma coding block relative to the top-left luma sample of the current picture,
- a variable nCS specifying the size of the current luma coding block,
- a luma location (xP, yP) specifying the top-left sample of the current luma prediction block relative to the top-left luma sample of the current picture,
- variables specifying the width and the height of the luma prediction block, nPbW and nPbH,
- the reference index of the current prediction unit partition refIdxLX (with X being 0 or 1),
- a variable partIdx specifying the index of the current prediction unit within the current coding unit.

Output of this process is
- the prediction mvpLX of the motion vector mvLX (with X being 0 or 1).

The motion vector predictor mvpLX is derived in the following ordered steps.
1. The derivation process for motion vector predictor candidates from neighboring prediction unit partitions in subclause 8.5.3.1.6 is invoked with the luma coding block location (xC, yC), the coding block size nCS, the luma prediction block location (xP, yP), the width and the height of the luma prediction block nPbW and nPbH, retIdxLX (with X being 0 or 1, respectively), and the partition index partIdx as inputs and the availability flags availableFlagLXN and the motion vectors mvLXN with N being replaced by A, B as the output.
2. If both availableFlagLXA and availableFlagLXB are equal to 1 and mvLXA is not equal to mvLXB, availableFlagLXCol is set equal to 0, otherwise, the derivation process for temporal luma motion vector prediction in subclause 8.5.3.1.7 is invoked with luma location (xP, yP), the width and the height of the luma prediction block nPbW and nPbH. AND refIdxLX (with X being 0 or 1, respectively) and mergeTMVP equal to 0 as the inputs and with the output being the availability flag availableFlagLXCol and the temporal motion vector predictor mvLXCol.
. . . .

Thus, in the modified version of section 8.5.2.1.5 shown above, the temporal luma motion vector prediction process of section 8.5.3.1.7 is invoked with the mergeTMVP variable equal to 0. A version of section 8.5.3.1.7 modified in accordance with the sixth example technique is described elsewhere in this disclosure.

Section 8.5.3.1.7 of HEVC Working Draft 7 describes a derivation process for temporal luma motion vector prediction. In accordance with the sixth example technique of this disclosure, section 8.5.3.1.7 of HEVC Working Draft 7 may be changed as follows:

8.5.3.1.7 Derivation Process for Temporal Luma Motion Vector Prediction

Inputs to this process are
- a luma location (xP, yP) specifying the top-left sample of the current luma prediction block relative to the top-left luma sample of the current picture, variables specifying the width and the height of the luma prediction block, nPbW and nPbH,
a reference index refIdxLX (with X being 0 or 1),
a variable mergeTMVP.
Outputs of this process are
the motion vector prediction mvLXCol,
the availability flag availableFlagLXCol.
The function RefPicOrderCnt(picX, retfIdx, LX) returns the picture order count PicOrderCntVal of the reference picture with index refIdx from reference picture list LX of the picture picX and is specified as follows.

*RefPicOrderCnt(picX,refIdx,LX)=PicOrderCnt(RefPicListX[refIdx] of the picture picX)* (8 141)

Depending on the values of slice_type, collocated_from_10_flag, and collocated_ref_idx, the variable colPic, specifying the picture that contains the collocated partition, is derived as follows.
If slice_type is equal to B and collocated_from_10_flag is equal to 0, the variable colPic specifies the picture that contains the collocated partition as specified by RefPicList1[collocated_ref_idx].
Otherwise (slice_type is equal to B and collocated_from_10_flag is equal to 1 or slice_type is equal to P), the variable colPic specifies the picture that contains the collocated partition as specified by RefPicList0[collocated_ref_idx].
Variable colPb and its position (xPCol, yPCol) are derived in the following ordered steps:
1. The variable colPb is derived as follows

*yPRb=yP+nPbH* (8-151)

If(yP>>Log 2CtbSizeY) is equal to (yPRb>>Log 2CtbSizeY), the horizontal component of the right-bottom luma location of the current luma prediction block is defined by

*xPRb=xP+nPbW* (8-152)

and the variable colPb is set as the luma prediction block covering the modified location given by ((xPRb>>4)<<4, (yPRb>>4)<<4) inside the colPic.
Otherwise ((yP>>Log 2CtbSizeY) is not equal to (yPRb>>Log 2CtbSizeY)), colPb is marked as "unavailable".
2. When colPb is coded in an intra prediction mode or colPb is marked as "unavailable", the following applies.
Central luma location of the current prediction block is defined by

*xPCtr=(xP+(nPbW>>)* (8-153)

*yPCtr=(yP+(nPbH>>1)* (8-154)

The variable colPb is set as the luma prediction block covering the modified location given by ((xPCtr>>4)<<4, (yPCtr>>4)<<4) inside the colPic.
3. (xPCol, yPCol) is set equal to the top-left sample of the colPb relative to the top-left luma sample of the colPic.
refIdxLX is set to be refIdxLXA If all of the following conditions are true.
mergeTMVP is equal to 1.
LonfermRefPic(currPic, refIdxLX, ListX) is not equal to LongTermRefpic(colPic, refIdxCol, listCol).
refIdxLXA is larger than 0.
The variables mvLXCol and availableFlagLXCol are derived as follows.
If one or more of the following conditions are true, both components of mvLXCol are set equal to 0 and availableFlagLXCol is set equal to 0.

colPb is coded in an intra prediction mode.
colPb is marked as "unavailable".
slice_temporal_mvp_enable_flag is equal to 0.
LongTermRefPic(currPic, refIdxLX, ListX) is not equal to LongTermRefPic(colPic, refIdxCol, listCol).
Otherwise, the motion vector mvCol, the reference index refIdxCol, and the reference list identifier listCol are derived as follows.
If PredFlagL0[xPCol][yPCol] is equal to 0, mvCol, refIdxCol, and listCol are set equal to MvL1[xPCol][yPCol], RefIdxL1[xPCol][yPCol], and L1, respectively.
Otherwise (PredFlagL0[xPCol][yPCol] is equal to 1), the following applies.
If PredFlagL1[xPCol][yPCol] is equal to 0, mvCol, refIdxCol, and listCol are set equal to MvL0[xPCol][yPCol], RefIdxL0[xPCol][yPCol], and L0, respectively.
Otherwise (PredFlagL1[xPCol][yPCol] is equal to 1), the following assignments are made.
If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_10_flag.
and the variable availableFlagLXCol is set equal to 1 and the following applies.
If RefPicListX[refIdxLX] is a long-term reference picture, or PicOrderCnt(colPic)−RefPicOrderCnt (colPic, refIdxCol, listCol) is equal to PicOrderCntVal−PicOrderCnt(RefPicListX[refIdxLX]),

*mvLXCol=mvCol* (8-155)

Otherwise, mvLXCol is derived as scaled version of the motion vector mvCol as specified below

*tx=(16384+(Abs(td)>>1))/td* (8-156)

distScaleFactor=Clip3(−4096,4095,(*tb*tx*+32)>>6) (8-157)

*mvLXCol*=Clip3(−32768,32767,Sign2
(distScaleFactor**mvCol*)*((*Abs*
(distScaleFactor**mvCol*)+127)>>8)) (8-158)

where td and tb are derived as

*td=Clip3(−128,127,PicOrderCnt(colPic)−RefPicOrderCnt(colPic,refIdxCol,listCol))* (8-159)

*tb=Clip3(−128,127,PicOrderCntVal−PicOrderCnt
(RefPicListX[refIdxLX]))* (8-160)

In the modified version of section 8.5.3.1.7 shown above, refIdxLX is a RefPicListX reference index of a temporal merging candidate, refIdxLXA indicates . . . .

A seventh example technique of this disclosure is similar to the sixth example technique described above. However, the seventh example technique is compliant with HEVC Working Draft 9. In the seventh example technique, refIdxLXA (with X being 0 or 1) can be derived as in the sixth example technique or signaled/set otherwise.

Section 8.5.3.1.7 of HEVC Working Draft 9 describes a derivation process for temporal luma motion vector prediction. In the seventh example technique, section 8.5.3.1.7 of HEVC Working Draft 9 may be modified as follows:

8.5.3.1.7 Derivation Process for Temporal Luma Motion Vector Prediction

Inputs to this process are
- a luma location (xP, yP) specifying the top-left sample of the current luma prediction block relative to the top-left luma sample of the current picture,
- variables specifying the width and the height of the luma prediction block, nPbW and nPbH,
- a variable mergeTMVP,
- a reference index refIdxLX (with X being 0 or 1).

Outputs of this process are
- the motion vector prediction mvLXCol,
- the availability flag availableFlagLXCol.

The variable currPb specifies the current luma prediction block at luma location (xP, yP).

The variables mvLXCol and availableFlagLXCol are derived as follows.

If slice_temporal_mvp_enable_flag is equal to 0, both components of mvLXCol are set equal to 0 and availableFlagLXCol is set equal to 0.

Otherwise, the following ordered steps apply.
1. Depending on the values of slice_type, collocated_from_l0_flag, and collocated_ref_idx, the variable colPic, specifying the picture that contains the collocated partition, is derived as follows.
    If slice_type is equal to B and collocated_from_l0_flag is equal to 0, the variable colPic specifies the picture that contains the collocated partition as specified by RefPicList1[collocated_ref_idx].
    Otherwise (slice_type is equal to B and collocated_from_l0_flag is equal to 1 or slice_type is equal to P), the variable colPic specifies the picture that contains the collocated partition as specified by RefPicList0[collocated_ref_idx].
2. The bottom right collocated motion vector is derived as follows $xPRb=xP+nPbW$ (8-162)

$yPRb=yP+nPbH$ (8-163)

If (yP>>Log 2CtbSizeY) is equal to (yPRb>>Log 2CtbSizeY), and xPRb is less than pic_width_in_luma_samples, the following applies.
The variable colPb specifies the luma prediction block covering the modified location given by ((xPRb>>4)<<4, (yPRb>>4)<<4) inside the co-located picture specified by colPic.
The luma location (xPCol, yPCol) is set equal to the top-left sample of the of the collocated luma prediction block specified by colPb relative to the top-left luma sample of the co-located picture specified by colPic.
The derivation process for collocated motion vectors as specified in subclause 8.5.3.1.8 is invoked with currPb, colPic, colPb, (xPCol, yPCol), mergeTMVP, and refIdxLX as inputs and the output being assigned to mvLXCol and availableFlagLXCol.
Otherwise, both components of mvLXCol are set equal to 0 and availableFlagLXCol is set equal to 0.

3. When availableFlagLXCol is equal to 0, the central collocated motion vector is derived as follows.

$xPCtr=xP+(nPbW>>1)$ (8-164)

$yPCtr=yP+(nPbH>>1)$ (8-165)

The variable colPb specifies the luma prediction block covering the modified location given by ((xPCtr>>4)<<4, (yPCtr>>4)<<4) inside the colPic.
The luma location (xPCol, yPCol) is set equal to the top-left sample of the of the collocated luma prediction block specified by colPb relative to the top-left luma sample of the co-located picture specified by colPic.
The derivation process for collocated motion vectors as specified in subclause 8.5.3.1.8 is invoked with currPb, colPic, colPb, (xPCol, yPCol), mergeTMVP, and retfIdxLX as inputs and the output being assigned to mvLXCol and availableFlagLXCol.

In the modified version of section 8.5.3.1.7, a derivation process for temporal luma motion vector prediction receives a mergeTMVP variable as input. The mergeTMVP variable may be equal to 1 if the derivation process of section 8.5.3.1.7 is invoked for merge mode and may be equal to 0 if the derivation process of section 8.5.3.1.7 is invoked for AMVP mode. In the modified version of section 8.5.3.1.7, the mergeTMVP variable is provided as input to a derivation process of section 8.5.3.1.8.

Section 8.5.3.1.8 of HEVC Working Draft 9 describes a derivation process for collocated motion vectors. In accordance with the seventh example technique, section 8.5.3.1.8 of HEVC Working Draft 9 may be modified as follows.

8.53.1.8 Derivation Process for Collocated Motion Vectors

Inputs to this process are
- currPb specifying the current prediction block,
- colPic specifying the co-located picture,
- colPb specifying the collocated prediction block inside the co-located picture specified by colPic,
- a luma location (xPCol, yPCol) specifying the top-left sample of the collocated luma prediction block specified by colPb relative to the top-left luma sample of the co-located picture specified by colPic,
- a variable mergeTMVP,
- a reference index refIdxLX (with X being 0 or 1).

Outputs of this process are
- the motion vector prediction mvLXCol,
- the availability flag availableFlagLXCol.

The variable currPic specifies the current picture.

The arrays predFlagLXCol[x][y], mvLXCol[x][y] and refIdxLXCol[x][y] are set equal to the corresponding arrays of the co-located picture specified by colPic, PredFlagLX[x][y], MvLX[x][y] and RefIdxLX[x][y], respectively with X being the value of X this process is invoked for.

The variables mvLXCol and availableFlagLXCol are derived as follows.

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows.
    If predFlagL0Col[xPCol][yPCol] is equal to 0, mvCol, refIdxCol, and listCol are set equal to mvL1Col[xPCol][yPCol], refIdxL1Col[xPCol][yPCol], and L1, respectively.

Otherwise if predFlagL0Col[xPCol][yPCol] is equal to 1 and predFlagL1Col[xPCol][yPCol] is equal to 0, mvCol, refIdxCol, and listCol are set equal to mvL0Col[xPCol][yPCol], refIdxL0Col[xPCol][yPCol], and L0, respectively.

Otherwise (predFlagL0Col[xPCol][yPCol] is equal to 1 and predFlagL1Col[xPCol][yPCol] is equal to 1), the following assignments are made.

If DiffPicOrderCnt(currPic, pic) is less than or equal to 0 for every picture pic in every reference picture list of the current slice, mvCol, refIdxCol, and listCol are set equal to mvLXCol[xPCol][yPCol], refIdxLXCol[xPCol][yPCol] and LX, respectively with X being the value of X this process is invoked for.

Otherwise, mvCol, refIdxCol and listCol are set equal to mvLNCol[xPCol][yPCol], refIdxLNCol[xPCol][yPCol] and LN, respectively with N being the value of collocated_from_10_flag.

and mvLXCol and availableFlagLXCol are derived as follows.

When IF LongTermRefPic(currPic, currPb, refIdxLX, LX) is not equal to LongTermRefPic (colPic, colPb, refIdxCol, listCol), the following applies If refIdxLXA is greater than 0 and mergeTMVP is equal to 1, refIdxLX is set equal to refIdxLXA and availableFlagLXCol is set equal to 1.

Otherwise, both components of mvLXCol are set equal to 0 and availableFlagLXCol is set equal to 0.

OTHERWISE, When the variable availableFlagLXCol is set equal to 1, refPicListCol[refIdxCol] is set to be the picture with reference index refIdxCol in the reference picture list listCol of the slice containing prediction block currPb in the picture colPic, and the following applies.

$$colPocDiff=DiffPicOrderCnt(colPic, refPicListCol[refIdxCol]) \qquad (8\text{-}166)$$

$$currPocDiff=DiffPicOrderCnt(currPic, RefPicListX[refIdxLX]) \qquad (8\text{-}167)$$

If RefPicListX[refIdxLX] is a long-term reference picture, or colPocDiff is equal to currPocDiff, mvLXCol is derived as:

$$mvLXCol=mvCol \qquad (8\text{-}168)$$

Otherwise, mvLXCol is derived as scaled version of the motion vector mvCol as specified below.

$$tx=(16384+(Abs(td)>>1))/td \qquad (8\text{-}169)$$

$$distScaleFactor=Clip3(-4096,4095,(tb*tx+32)>>6) \qquad (8\text{-}170)$$

$$mvLXCol=Clip3(-32768,32767,Sign(distScaleFactor*mvCol)*((Abs(distScaleFactor*mCol)+127)>>8)) \qquad (8\text{-}171)$$

where td and tb are derived as $$td=Clip3(-128,127,colPocDiff) \qquad (8\text{-}172)$$

$$tb=Clip3(-128,127,currPocDiff) \qquad (8\text{-}173)$$

In the modified version of section 8.5.3.1.8 shown above, refIdxLX indicates a RefPicListX reference index of a temporal merging or MVP candidate. Furthermore, in the modified version of section 8.5.3.1.8, a video coder may determine whether a reference picture indicated by the RefPicListX reference index and a reference picture indicated by a RefPicListX reference index of a TMVP are not both long-term reference picture or not both short-term reference pictures. That is, the video coder may determine whether LongTermRefPic(currPic, currPb, refIdxLX, LX) is not equal to LongTermRefPic(colPic, colPb, refIdxCol, listCol). If so, the video coder may set the RefPicListX reference index of the temporal merging or MVP candidate to refIdxLXA if refIdxLXA is greater than 0 and mergeTMVP is equal to 0. Otherwise, the video coder may set both motion vector components of the temporal merging or MVP candidate to 0.

An eighth example technique may provide an additional possible improvement to the seventh example technique. The eighth example technique is applied if the reference picture types of the target TMVP reference picture and co-located reference pictures are different. There are two co-located sub-blocks to derive the motion information (i.e., bottom-right and center). The sub-block for motion information derivation may be switched from bottom-right to center if TMVP derivation is not possible. However, when the above method is applied, the zero TMVP reference index can be replaced with another one. As a result, a video coder may always be able to derive a TMVP. That means that the bottom-right block with available motion information may always be used and switching to the center sub-block may not happen, even if the video coder can derive the TMVP for zero reference index using the center sub-block.

An additional possible improvement may be to apply the above-described method (change TMVP reference index) after the bottom-right and the center blocks are checked for the possibility of deriving a TMVP with zero reference index. If the video coder fails to derive the TMVP, the video coder may change the reference index of the TMVP to a non-zero value. For the non-zero reference index, the video coder may derive the TMVP from bottom right or center sub-blocks or the video coder may apply a switching mechanism. This version has fewer changes to some versions of HEVC, if the TMVP with non-zero reference index is derived from the center sub-block since it may not be necessary to go back to the bottom-right block and repeat the TMVP derivation process. The latter solution can be implemented in the following modified versions of section 8.5.3.1.7 of HEVC Working Draft 9.

8.53.1.7 Derivation Process for Temporal Luma Motion Vector Prediction

Inputs to this process are
a luma location (xP, yP) specifying the top-left sample of the current luma prediction block relative to the top-left luma sample of the current picture,
variables specifying the width and the height of the luma prediction block, nPbW and nPbH,
a variable mergeTMVPFlag,
a reference index refIdxLX (with X being 0 or 1).

8.53.1.7 Derivation Process for Temporal Luma Motion Vector Prediction

Inputs to this process are
a luma location (xP, yP) specifying the top-left sample of the current luma prediction block relative to the top-left luma sample of the current picture,
variables specifying the width and the height of the luma prediction block, nPbW and nPbH,
a variable mergeTMVP,
a reference index refIdxLX (with X being 0 or 1).

Outputs of this process are
the motion vector prediction mvLXCol,
the availability flag availableFlagLXCol.

The variable currPb specifies the current luma prediction block at luma location (xP, yP).

The variables mvLXCol and availableFlagLXCol are derived as follows.

If slice_temporal_mvp_enable_flag is equal to 0, both components of mvLXCol are set equal to 0 and availableFlagLXCol is set equal to 0.

Otherwise, the following ordered steps apply.

1. Depending on the values of slice_type, collocated_from_l0_flag, and collocated_ref_idx, the variable colPic, specifying the picture that contains the collocated partition, is derived as follows.

If slice_type is equal to B and collocated_from_l0_flag is equal to 0, the variable colPic specifies the picture that contains the collocated partition as specified by RefPicList1[collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

2. The bottom right collocated motion vector is derived as follows $$xPRb = xP + nPbW \quad (8\text{-}162)$$

$$yPRb = yP + nPbH \quad (8\text{-}163)$$

If (yP>>Log 2CtbSizeY) is equal to (yPRb>>Log 2CtbSizeY), and xPRb is less than pic_widthin_luma_samples, the following applies.

The variable colPb specifies the luma prediction block covering the modified location given by ((xPRb>>4)<<4, (yPRb>>4)<<4) inside the co-located picture specified by colPic.

The luma location (xPCol, yPCol) is set equal to the top-left sample of the of the collocated luma prediction block specified by colPb relative to the top-left luma sample of the co-located picture specified by colPic.

The derivation process for collocated motion vectors as specified in subclause 8.5.3.1.8 is invoked with currPb, colPic, colPb, (xPCol, yPCol), mergeTMVPFlag equal to zero and refIdxLX as inputs and the output being assigned to mvLXCol and availableFlagLXCol.

Otherwise, both components of mvLXCol are set equal to 0 and availableFlagLXCol is set equal to 0.

3. When availableFlagLXCol is equal to 0, the central collocated motion vector is derived as follows.

$$xPCtr = xP + (nPbW >> 1) \quad (8\text{-}164)$$

$$yPCtr = yP + (nPhH >> 1) \quad (8\text{-}165)$$

The variable colPb specifies the luma prediction block covering the modified location given by ((xPCtr>>4)<<4, (yPCtr>>4)<<4) inside the colPic.

The luma location (xPCol, yPCol) is set equal to the top-left sample of the of the collocated luma prediction block specified by colPb relative to the top-left luma sample of the co-located picture specified by colPic.

The derivation process for collocated motion vectors as specified in subclause 8.5.3.1.8 is invoked with currPb, colPic, colPb, (xPCol, yPCol), mergeTMVPFlag equal to mergeTMVP, and refIdxLX as inputs and the output being assigned to mvLXCol and availableFlagLXCol.

Furthermore, section 8.5.3.1.8 of HEVC Working Draft 9 (derivation process for collocated motion vectors) may be the same as section 8.5.3.1.8 as shown with regard to the seventh example technique but with "mergeTMVP" replaced with "mergeTMVPFlag" for every occurrence of "mergeTMVP."

A ninth example technique of this disclosure is similar to the eighth example technique described above. However, in the ninth example technique, the TMVP derivation for a non-zero reference index with the bottom-right block may be done if the motion information is not available for the center block.

In the ninth example technique, section 8.5.3.1.7 of HEVC Working Draft 9 may be modified as follows:

8.5.3.1.7 Derivation Process for Temporal Luma Motion Vector Prediction

Inputs to this process are
  a luma location (xP, yP) specifying the top-left sample of the current luma prediction block relative to the top-left luma sample of the current picture,
  variables specifying the width and the height of the luma prediction block, nPbW and nPbH,
  a variable mergeTMVP,
  a reference index refIdxLX (with X being 0 or 1).

Outputs of this process are
  the motion vector prediction mvLXCol,
  the availability flag availableFlagLXCol.

The variable currPb specifies the current luma prediction block at luma location (xP, yP).

The variables mvLXCol and availableFlagLXCol are derived as follows.

If slice_temporal_mvp_enable_flag is equal to 0, both components of mvLXCol are set equal to 0 and availableFlagLXCol is set equal to 0.

Otherwise, the following ordered steps apply.

1. Depending on the values of slice_type, collocated_from_l0_flag, and collocated_ref_idx, the variable colPic, specifying the picture that contains the collocated partition, is derived as follows.

If slice_type is equal to B and collocated_from_l0_flag is equal to 0, the variable colPic specifies the picture that contains the collocated partition as specified by RefPicList1 [collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

2. The bottom right collocated motion vector is derived as follows $$xPRb = xP + nPbW \quad (8\text{-}162)$$

$$yPRb = yP + nPbH \quad (8\text{-}163)$$

If(yP>>Log 2CtbSizeY) is equal to (yPRb>>Log 2CtbSizeY), and xPRb is less than pic_width_in_luma_samples, the following applies.

The variable colPb specifies the luma prediction block covering the modified location given by ((xPRb>>4)<<4, (yPRb>>4)<<4) inside the co-located picture specified by colPic.

The luma location (xPCol, yPCol) is set equal to the top-left sample of the of the collocated luma prediction block specified by colPb relative to the top-left luma sample of the co-located picture specified by colPic.

xPCtr=xP+(nPbW>>1)

yPCtr=yP+(nPbH>>1)

The variable colCtr specifies the luma prediction block covering the modified location given by ((xPCtr>>4)<<4, (yPCtr>>4)<<4) inside the colPic.

The derivation process for collocated motion vectors as specified in subclause 8.5.3.1.8 is invoked with currPb, colPic, colPb, (xPCol, yPCol), mergeTMVPFlag equal to mergeTMVP*(!predFlagL0Col[xColCtr][yColCtr] &&!predFlagL1Col[xColCtr][yColCtr]), and refIdxLX as inputs and the output being assigned to mvLXCol and availableFlagLXCol.

Otherwise, both components of mvLXCol are set equal to 0 and availableFlagLXCol is set equal to 0.

3. When availableFlagLXCol is equal to 0, the central collocated motion vector is derived as follows.

$$xPCtr=xP+(nPbW>>1) \quad (8\text{-}164)$$

$$yPCtr=yP+(nPbH>>1) \quad (8\text{-}165)$$

The variable colPb specifies the luma prediction block covering the modified location given by ((xPCtr>>4)<<4, (yPCtr>>4)<<4) inside the colPic.

The luma location (xPCol, yPCol) is set equal to the top-left sample of the of the collocated luma prediction block specified by colPb relative to the top-left luma sample of the co-located picture specified by colPic.

The derivation process for collocated motion vectors as specified in subclause 8.5.3.1.8 is invoked with currPb, colPic, colPb, (xPCol, yPCol), mergeTMVPFlag equal to mergeTMVP, and refIdxLX as inputs and the output being assigned to mvLXCol and availableFlagLXCol.

A tenth example technique is similar to the eighth example technique described above. However, in the tenth example technique, the video coder may check the bottom-right block or the center block twice if the video coder determines in the first check that the bottom-right block or the center block are unavailable because of different types of reference pictures. In the tenth example technique, section 8.5.3.1.7 of HEVC Working Draft 9 may be modified in one of the following ways:

8.53.1.7 Derivation Process for Temporal Luma Motion Vector Prediction

Inputs to this process are
a luma location (xP, yP) specifying the top-left sample of the current luma prediction block relative to the top-left luma sample of the current picture,
variables specifying the width and the height of the luma prediction block, nPbW and nPbH,
a variable mergeTMVPFlag,
a reference index refIdxLX (with X being 0 or 1).

8.53.1.7 Derivation Process for Temporal Luma Motion Vector Prediction

Inputs to this process are
a luma location (xP, yP) specifying the top-left sample of the current luma prediction block relative to the top-left luma sample of the current picture,
variables specifying the width and the height of the luma prediction block, nPbW and nPbH,
a variable mergeTMVP,
a reference index refIdxLX (with X being 0 or 1).

Outputs of this process are
the motion vector prediction mvLXCol,
the availability flag availableFlagLXCol.

The variable currPb specifies the current luma prediction block at luma location (xP, yP).

The variables mvLXCol and availableFlagLXCol are derived as follows.

If slice_temporal_mvp_enable_flag is equal to 0, both components of mvLXCol are set equal to 0 and availableFlagLXCol is set equal to 0.

Otherwise, the following ordered steps apply.
Variable numLoop is set to 0.
While numLoop is smaller than 2 and availableFlagLXCol is equal to I, the following steps apply in order, iteratively.

1. Depending on the values of slice_type, collocated_from_10_flag, and collocated_ref_idx, the variable colPic, specifying the picture that contains the collocated partition, is derived as follows.
   If slice_type is equal to B and collocated_from_10_flag is equal to 0, the variable colPic specifies the picture that contains the collocated partition as specified by RefPicList1[collocated_ref_idx].
   Otherwise (slice_type is equal to B and collocated_from_10_flag is equal to 1 or slice_type is equal to P), the variable colPic specifies the picture that contains the collocated partition as specified by RefPicList0[collocated_ref_idx].

2. The bottom right collocated motion vector is derived as follows $$xPRb=xP+nPbW \quad (8\text{-}162)$$

$$yPRb=yP+nPbH \quad (8\text{-}163)$$

If (yP>>Log 2CtbSizeY) is equal to (yPRb>>Log 2CtbSizeY), and xPRb is less than pic_width_in_luma_samples, the following applies.

The variable colPb specifies the luma prediction block covering the modified location given by ((xPRb>>4)<<4, (yPRb>>4)<<4) inside the co-located picture specified by colPic.

The luma location (xPCol, yPCol) is set equal to the top-left sample of the of the collocated luma prediction block specified by colPb relative to the top-left luma sample of the co-located picture specified by colPic.

The derivation process for collocated motion vectors as specified in subclause 8.5.3.1.8 is invoked with currPb, colPic, colPb, (xPCol, yPCol), mergeTMVPFlag equal to (numLoop & mergeTMVP), and refIdxLX as inputs and the output being assigned to mvLXCol and availableFlagLXCol.

Otherwise, both components of mvLXCol are set equal to 0 and availableFlagLXCol is set equal to 0.

3. When availableFlagLXCol is equal to 0, the central collocated motion vector is derived as follows.

$$xPCtr=xP+(nPbW>>1) \quad (8\text{-}164)$$

$$yPCtr=yP+(nPbH>>1) \quad (8\text{-}165)$$

The variable colPb specifies the luma prediction block covering the modified location given by ((xPCtr>>4)<<4, (yPCtr>>4)<<4) inside the colPic.

The luma location (xPCol, yPCol) is set equal to the top-left sample of the of the collocated luma prediction block specified by colPb relative to the top-left luma sample of the co-located picture specified by colPic.

The derivation process for collocated motion vectors as specified in subclause 8.5.3.1.8 is invoked with currPb, colPic, colPb, (xPCol, yPCol), mergeTM-VPFlag equal to (numLoop&mergeTMVP), and refIdxLX as inputs and the output being assigned to mvLXCol and availableFlagLXCol.

In the modified version of section 8.5.3.1.7 shown above, (numLoop&mergeTMVP) returns 1 if mergeTMVP is 1 and numLoop is 1, otherwise, (numLoop&mergeTMVP) returns 0.

Alternatively, the variable "mergeTMVP" may be replaced with "mergeTMVPFlag." Furthermore, in the tenth example technique, section 8.5.3.1.8 may be the same as the version of section 8.5.3.1.8 for the seventh example technique described above. However, in the version of section 8.5.3.1.8 for the tenth example technique, the variable "mergeTMVP" is replaced with "mergeTMVPFlag" for every occurrence of "mergeTMVP".

In accordance with some example techniques of this disclosure, a video coder may derive a target reference index of a temporal merging candidate from spatial neighboring blocks of a current PU. Furthermore, when the target reference index of the temporal merging candidate corresponds to a reference picture that has a different reference picture type (e.g., temporal or inter-view) than the reference picture to which a TMVP points, a video coder may modify the temporal merging candidate to indicate a reference index value corresponding to a picture with the same type as that of the reference picture of the TMVP.

In accordance with such techniques, for a given reference picture list X (where X is equal to 0 or 1), the target reference index, after being modified, may be one specific value C or specific value D, which are fixed for a whole slice. C is a reference index that corresponds to the first entry in a reference picture list that corresponds to a long-term (or inter-view) reference picture. D is a reference index that corresponds to the first entry in a reference picture list that corresponds to a short-term (or temporal) reference picture. Either C or D is equal to 0.

Furthermore, the target reference index may be denoted "TarIdx_LX" and the reference picture to which the TMVP points may be denoted "coRefPic." When one of the following is true, a video coder may change TarIdx_LX:

If RefPicListX[TarIdx_LX] is a temporal reference picture and coRefPic was an inter-view reference picture of the co-located picture.

If RefPicListX[TarIdx_LX] is an inter-view reference picture and coRefPic was a temporal reference picture of the co-located picture.

In some examples, if one of the conditions above is true and if coRefPic is an inter-view reference picture, the video coder may set TarIdx_LX to C. If one of the conditions above is true and if coRefPic is a temporal reference picture, the video coder may set TarIdX_LX to D. When neither of the above conditions are true, the video coder does not change TarIdX_LX. Alternatively, in the above processes, "inter-view reference" is replaced by "long-term reference" and "temporal reference" is replaced by "short-term reference."

In one alternative example, if RefPicPicX[TarIdx_LX] and coRefPic are both inter-view reference pictures (i.e., disparity reference pictures), a video coder may scale the motion vector based on the AddPicId of each view. If AddPicId(RefPi-cListX[TarIdx_LX]) is equal to TargetAddPicId, the video coder may keep TarIdx_LX the same and return. Otherwise, the video coder may set the target reference index to TarIdx_LX and scale the motion vector based on the difference of AddPicId. In one example, the video coder may determine the motion vector of the TMVP (denoted "mv") as follows:

$$mv=mv*(AddPicId(RefPicListX[TarIdx\_LX])-AddPicId(\text{current picture}))/(AddPicId(coRefPic)-AddPicId(co\text{-located picture})),$$

where AddPicId may be the view identifier or layer identifier of a view.

In another alternative example, the video coder may change TarIdx_LX when one of the following conditions is true:

If RefPicListX[TarIdx_LX] is a temporal reference picture and coRefPic was an inter-view reference picture of the co-located picture.

If RefPicListX[TarIdx_LX] is an inter-view reference picture and coRefPic was a temporal reference picture of the co-located picture.

In this example, when both of the conditions above are true, the video coder does not change TarIdx_LX. However, if coRefPic is an inter-view reference picture, the video coder may set TarIdx_LX to C. When coRefPic is a temporal reference picture, the video coder may set TarIdx_LX to the reference index TIdx that satisfies the following: the POC value of RefPicListX[Tidx] is equal to that of coRefPic. If such a TIdx does not exist, the video coder may set TarIdX_LX to D. Alternatively, if such a TIdx does not exist, the video coder may consider the temporal merging candidate to be unavailable for listX direction.

Another example alternative is similar to the previous two alternative examples. However, in this example, the video coder sets the D to one pre-defined temporal reference index. The pre-defined value may be signaled in a slice header, a picture parameter set, a sequence parameter set, a video parameter set, or another type of parameter set.

Furthermore, the procedure described above can be applied to the AMVP mode. That is, the video coder may use an adaptive target reference index for a temporal MVP candidate in AMVP mode. When the procedure is applied to the AMVP mode, the video coder may initialize TIdx_LX to the decoded reference index and the video coder may set RefPicListX equal to the decoded reference picture list of the current CU/PU.

As mentioned above, in some example techniques of this disclosure, a video coder does not add an inter-view predicted motion vector to a merging candidate list for skip/merge mode even when the inter-view predicted motion vector is available. Rather, in accordance with such techniques, the video coder may determine, based on information of spatial neighboring blocks, whether to add the inter-view predicted motion vector or an inter-view disparity motion vector to the merging candidate list. If the video coder makes the determination to add the inter-view disparity motion vector to the merging candidate list, the video coder may convert a disparity vector to an inter-view disparity motion vector and add the inter-view disparity motion vector into the merging candidate list.

In accordance with such techniques, the video coder may perform adaptive inter-view candidate selection in merge mode. For instance, an inter-view candidate may be either an inter-view predicted motion vector or an inter-view disparity motion vector. When both an inter-view predicted motion vector and an inter-view disparity motion vector are available, the video coder may determine which one of the inter-view predicted motion vector and the inter-view disparity motion vector to add to a merging candidate list based on a frequency of the types of spatial/temporal merging candidates (for example, $A_0$, $B_0$, $A_1$, $B_1$, $B_2$, and TMVP as defined in the HEVC base specification) as follows. If there are K motion vectors that point to temporal reference pictures and K is less than a pre-defined threshold N, the inter-view disparity motion vector is added to the merging candidate list. Otherwise, the video coder may add the inter-view predicted motion vector to the merging candidate list. N may be set to e.g. 1, 2, 3, 4, etc. Alternatively, if the number of temporal motion vectors is less than that of disparity motion vectors in the spatial merging candidates, the video coder may add the inter-view disparity motion vector to the merging candidate list. Otherwise, the video coder may add the inter-view predicted motion vector to the merging candidate list.

In an alternative example, when both an inter-view predicted motion vector and an inter-view disparity motion vector are available, the video coder may determine, based on motion complexity of spatial/temporal merging candidates, which of the inter-view predicted motion vector and the inter-view disparity motion vector to add to the merging candidate list. For instance, if the motion complexity is larger than a given threshold, the video coder may add the inter-view disparity motion vector to the merging candidate list. Otherwise, the video coder may add the inter-view predicted motion vector to the merging candidate list. In some examples, the motion complexity may be defined by the sum of squares of horizontal and vertical values of motion vectors. In other examples, the motion complexity may be defined by the sum of absolute values of horizontal and vertical values of motion vectors. In another example, when both the inter-view predicted motion vector and the inter-view disparity motion vector are available, the video coder may add both the inter-view predicted motion vector and the inter-view disparity motion vector to the merging candidate list.

As indicated above, a video coder may, in accordance with some example techniques of this disclosure, collect, during a disparity vector derivation process, multiple available disparity motion vectors from neighboring blocks. The video coder may use a medium (e.g., median) or average of the disparity motion vectors as a derived disparity vector. In some examples, the multiple available disparity motion vectors may be all available disparity motion vectors from spatial/temporal neighboring blocks. Alternatively, the multiple available disparity motion vectors may be the first N available disparity motion vectors from spatial/temporal neighboring blocks, wherein N can be 2, 3, 4, 5 and 6.

The medium (e.g., median) of multiple disparity motion vectors is defined as a vector whose horizontal/vertical value is a medium of the horizontal/vertical values of the disparity motion vectors. In one alternative, the vertical value of the medium disparity vector is set to 0. In another alternative, the video coder may set the medium disparity motion vector to a disparity vector among the multiple disparity motion vectors that has a horizontal value equal to a medium value of the horizontal values of the multiple disparity vectors. When there are two or more disparity motion vectors with the same horizontal values equal to the median, the video coder may use the first available disparity motion vector as the final disparity vector.

In one example, the disparity motion vectors may be the motion vectors which neighboring blocks use and the disparity motion vectors may point to inter-view reference pictures. In an alternative example, the video coder may also consider, as disparity motion vectors, implicit disparity vectors that a spatial or temporal neighboring PU of the current PU uses in inter-view motion prediction. If a spatially or temporally neighboring PU of a current PU is coded using inter-view motion prediction, the disparity vector of the spatially or temporally neighboring PU is an implicit disparity vector.

In accordance with another example technique of the disclosure, a video coder may use an adaptive inter-view candidate position in merge mode. For example, in merge/skip mode, the video coder may determine, based on information of spatial neighboring blocks, whether to insert an inter-view candidate into a merging candidate list at a position before or after the first available spatial merging candidate. The inter-view candidate may be an inter-view predicted motion vector or an inter-view disparity motion vector. That is, the entry of the inter-view candidate into the merging candidate list may be based on the motion information of spatial neighboring blocks.

Suppose K motion vectors of spatial neighboring blocks (for example, $A_0$, $B_0$, $A_1$, $B_1$, $B_2$) point to temporal reference pictures and J of the motion vectors point to inter-view reference pictures. If K is less than J and the inter-view candidate also points to a temporal reference picture (inter-view predicted motion vector is added), or if K is larger than J and the inter-view candidate points to an inter-view reference picture (inter-view disparity vector is added), the video coder may insert the merging candidate after the M-th spatial merging candidate in the merging candidate list. In various examples, M can be 1, 2, 3, 4, etc.

In alternative example, if one of the following conditions is true, the video coder may insert the inter-view candidate after the first available spatial merging candidate.

The motion vector of the first available spatial merging candidate points to a temporal reference picture and the inter-view candidate points to an inter-view reference picture.

The motion vector of the first available spatial merging candidate points to an inter-view reference picture and the inter-view candidate points to a temporal reference picture.

When both of the above conditions are not true, the video coder may insert the inter-view candidate before all the spatial merging candidates.

Figure 9:
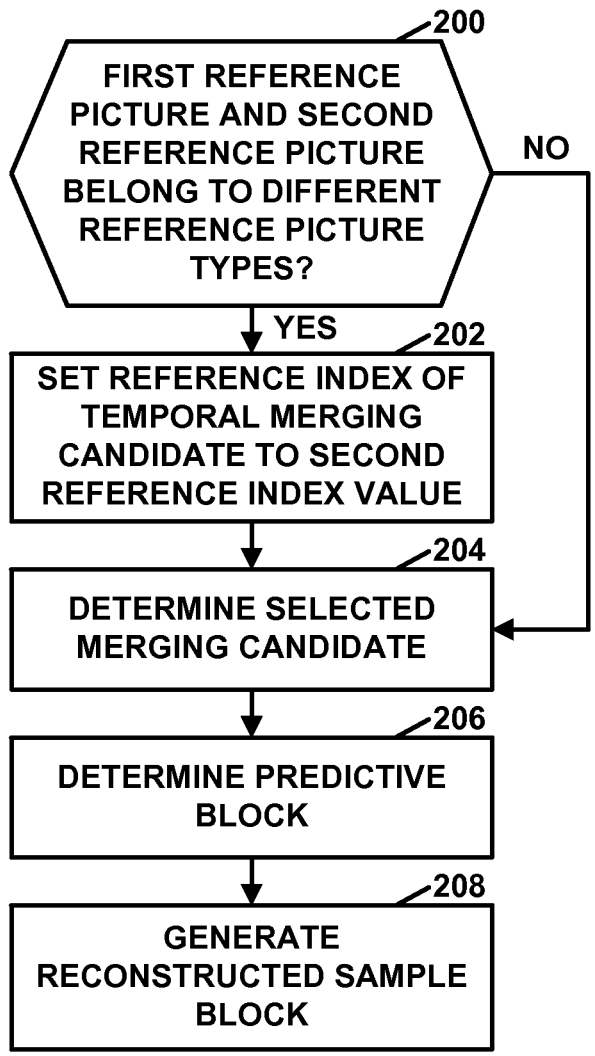
FIG. 9 is a flowchart illustrating an example operation of a video decoder, in accordance with one or more techniques of this disclosure.

FIG. 9 is a flowchart illustrating an example operation of video decoder 30, in accordance with one or more techniques of this disclosure. In the example of FIG. 9, a first reference index value indicates a position, within a reference picture list associated with a current PU of a current picture, of a first reference picture. In some examples, the first reference index value is equal to 0. A reference index of a co-located PU of a co-located picture indicates a position, within a reference picture list associated with the co-located PU of the co-located picture, of a second reference picture.

In the example of FIG. 9, video decoder 30 may determine whether the first reference picture and the second reference picture belong to different reference picture types (200). In one example, the reference picture type of the first reference picture may be one of: a temporal reference picture type or a disparity reference picture type. In this example, the reference picture type of the second reference picture may be one of the temporal reference picture type and the disparity reference picture type. In another example, the reference picture type of the first reference picture is one of a short-term reference picture type or a long-term reference picture type. In this example, the reference picture type of the second reference picture is one of the short-term reference picture type and the long-term reference picture type. A reference picture may belong to the short-term reference picture type if the reference picture is in a RefPicSetStCurrBefore or a RefPicSetStCurrAfter reference picture subset (or, in some examples, a RefPicSetStFollBefore or a RefPicSetStFollAfter reference picture subset) for the current picture. A reference picture may belong to the long-term reference picture type if the reference picture is in a RefPicSetLtCurr reference picture subset (or, in some examples, a RefPicSetLtFoll reference picture subset) for the current picture.

When the first reference picture and the second reference picture belong to different reference picture types ("YES" of 200), video decoder 30 may set a reference index of a temporal merging candidate to a second reference index value (202). The second reference index value may be different than the first reference index value. The second reference index value may indicate a position, within the reference picture list associated with the current picture, of a third reference picture. In some examples, the third reference picture and the second reference picture belong to the same reference picture type. However, when the first reference picture and the second reference picture belong to the same reference picture type, the reference index of the temporal merging candidate may remain equal to the first reference index value. Furthermore, in some examples, the second reference index value is signaled in a slice header.

In some examples, when the first reference picture belongs to the temporal reference picture type and the second reference picture belongs to the disparity reference picture type, video decoder 30 sets the reference index of the temporal merging candidate such that the reference index of the temporal merging candidate indicates an earliest position in the reference picture list of a disparity reference picture. Furthermore, in some examples, when the first reference picture belongs to the disparity reference picture type and the second reference picture belongs to the temporal reference picture type, video decoder 30 may set the reference index of the temporal merging candidate such that the reference index of the temporal merging candidate indicates an earliest position in the reference picture list of a temporal reference picture.

As indicated above, in some examples, either or both the first reference picture and the second reference picture may be short-term reference pictures or long-term reference pictures. In some such examples, when the first reference picture and the second reference picture belong to different reference picture types, video decoder 30 may set the reference index of the temporal merging candidate such that the reference index of the temporal merging candidate indicates an earliest position in the reference picture list that contains a reference picture belonging to the same reference picture type as the second reference picture.

Furthermore, video decoder 30 may determine a selected merging candidate from among a plurality of merging candidates in a merging candidate list that includes the temporal merging candidate (204). In some examples, video decoder 30 may obtain, from a bitstream, a syntax element that indicates a position in the merging candidate list of the selected merging candidate. Video decoder 30 may determine, based at least in part on motion information specified by the selected merging candidate, a predictive block for the current video unit (206). In addition, video decoder 30 may generate, based at least in part on the predictive block for the current video unit, a reconstructed sample block (208).

Figure 10:
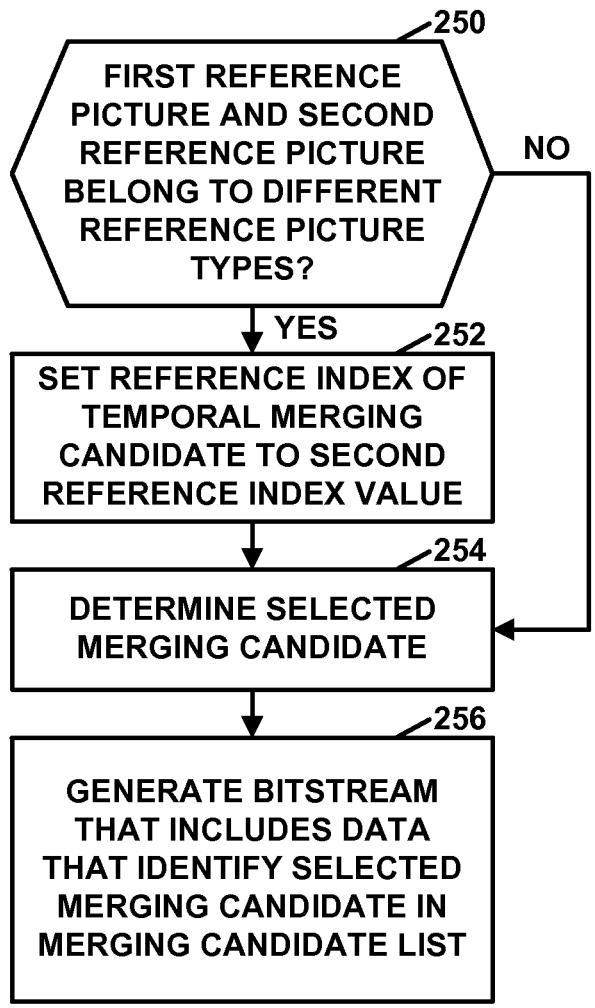
FIG. 10 is a flowchart illustrating an example operation of a video encoder, in accordance with one or more techniques of this disclosure.

FIG. 10 is a flowchart illustrating an example operation of video encoder 20, in accordance with one or more techniques of this disclosure. In the example of FIG. 10, a first reference index value indicates a position, within a reference picture list associated with a current PU of a current picture, of a first reference picture. In some examples, the first reference index value is equal to 0. A reference index of a co-located PU of a co-located picture indicates a position, within a reference picture list associated with the co-located PU of the co-located picture, of a second reference picture.

Furthermore, in the example of FIG. 10, video encoder 20 may determine whether the first reference picture and the second reference picture belong to different reference picture types (250). In one example, the reference picture type of the first reference picture may be one of: a temporal reference picture type or a disparity reference picture type. In this example, the reference picture type of the second reference picture may be one of: the temporal reference picture type and the disparity reference picture type. In another example, the reference picture type of the first reference picture is one of: a short-term reference picture type or a long-term reference picture type. In this example, the reference picture type of the second reference picture is one of: the short-term reference picture type and the long-term reference picture type.

When the first reference picture and the second reference picture belong to different reference picture types ("YES" of 250), video encoder 20 may set a reference index of a temporal merging candidate to a second reference index value (252). The second reference index value may be different than the first reference index value. The second reference index value may indicate a position, within the reference picture list associated with the current picture, of a third reference picture. In some examples, the third reference picture and the second reference picture belong to the same reference picture type. However, when the first reference picture and the second reference picture belong to the same reference picture type, the reference index of the temporal merging candidate may remain equal to the first reference index value. Furthermore, in some examples, the second reference index value is signaled in a slice header.

In some examples, when the first reference picture belongs to the temporal reference picture type and the second reference picture belongs to the disparity reference picture type, video encoder 20 sets the reference index of the temporal merging candidate such that the reference index of the temporal merging candidate indicates an earliest position in the reference picture list of a disparity reference picture. Furthermore, in some examples, when the first reference picture belongs to the disparity reference picture type and the second reference picture belongs to the temporal reference picture type, video encoder 20 may set the reference index of the temporal merging candidate such that the reference index of the temporal merging candidate indicates an earliest position in the reference picture list of a temporal reference picture.

As indicated above, in some examples, either or both the first reference picture and the second reference picture may be short-term reference pictures or long-term reference pictures. In some such examples, when the first reference picture and the second reference picture belong to different reference picture types, video encoder 20 may set the reference index of the temporal merging candidate such that the reference index of the temporal merging candidate indicates an earliest position in the reference picture list that contains a reference picture belonging to the same reference picture type as the second reference picture.

On the other hand, in some examples, when the first reference picture and the second reference picture do not belong to different reference picture types ("NO" of 250) or after setting the reference index of the temporal merging candidate to the second reference index value, video encoder 20 may determine a selected merging candidate from among a plurality of merging candidates in a merging candidate list that includes the temporal merging candidate (254). In some examples, video encoder 20 may determine the selected merging candidate based on a rate/distortion analysis. Furthermore, video encoder 20 may generate a bitstream that includes data that identify the selected merging candidate in the merging candidate list (256).

Figure 11:
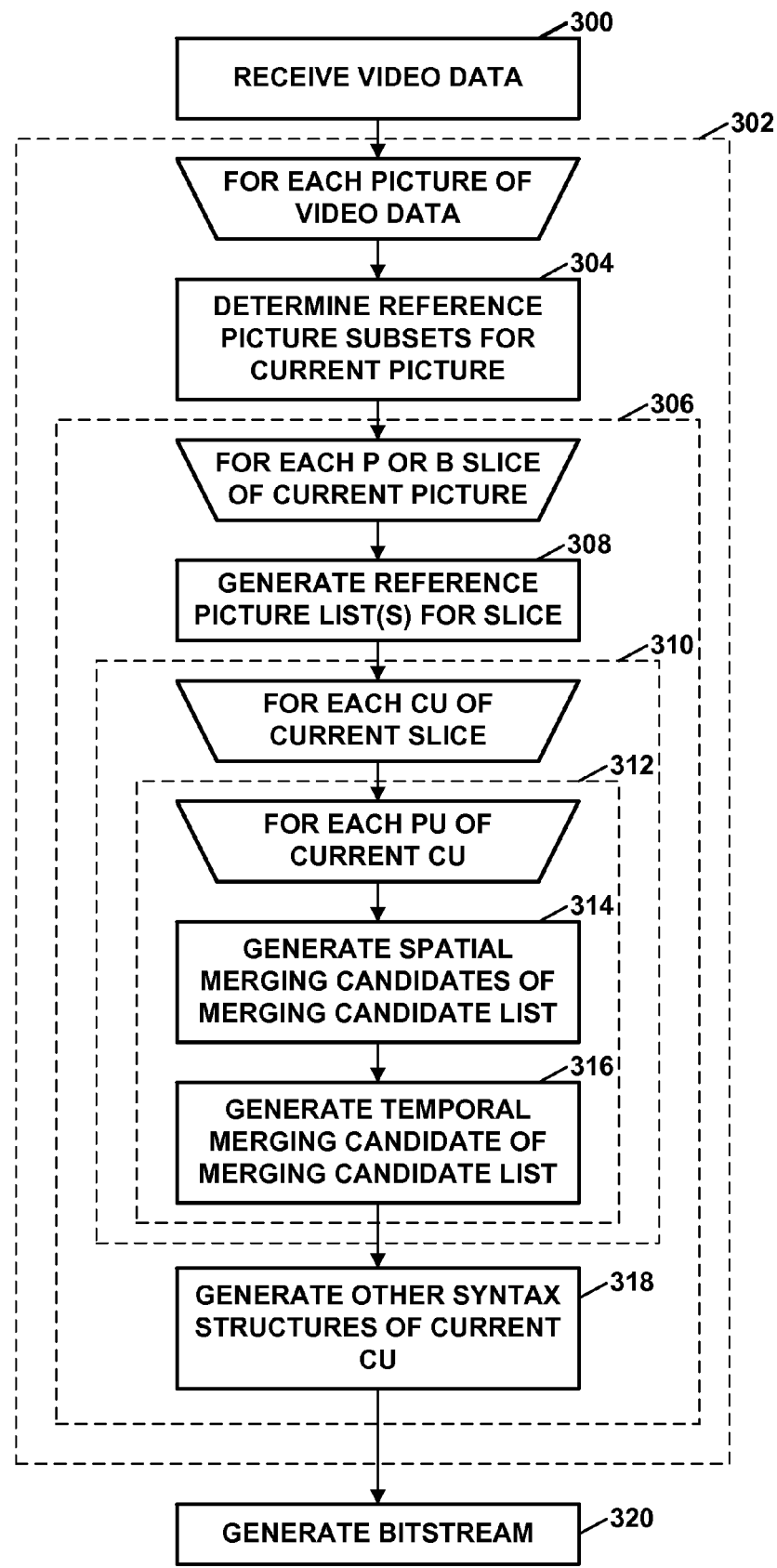
FIG. 11 is a flowchart illustrating an example operation of a video encoder, in accordance with one or more example techniques of this disclosure.

FIG. 11 is a flowchart illustrating an example operation of video encoder 20, in accordance with one or more example techniques of this disclosure. In the example of FIG. 11, video encoder 20 may receive video data (300). Video encoder 20 may perform actions in box 302 for each picture of the video data. In the example of FIG. 11, video encoder 20 may determine reference picture subsets for a current picture (304). Video encoder 20 may perform the actions in box 306 for each P or B slice of the current picture. For instance, video encoder 20 may generate one or more reference picture lists for the current slice (308). Video encoder 20 may perform the actions in box 310 for each CU of the current slice. Furthermore, video encoder 20 may perform the actions in box 312 for each PU of the current CU. In the example of FIG. 11, video encoder 20 may generate spatial merging candidates for a merging candidate list of the current PU (314). In addition, video encoder 20 may generate a temporal merging candidate for the merging candidate list of the current PU (316). Video encoder 20 may generate the temporal merging candidate according to any of the techniques of this disclosure. Furthermore, video encoder 20 may generate other syntax structures of the current CU (318). Video encoder 20 may generate a bitstream that includes an encoded representation of the video data (320). The encoded representation of the video data may include syntax elements that indicate selected merging candidates in merging candidate lists of PUs.

Figure 12:
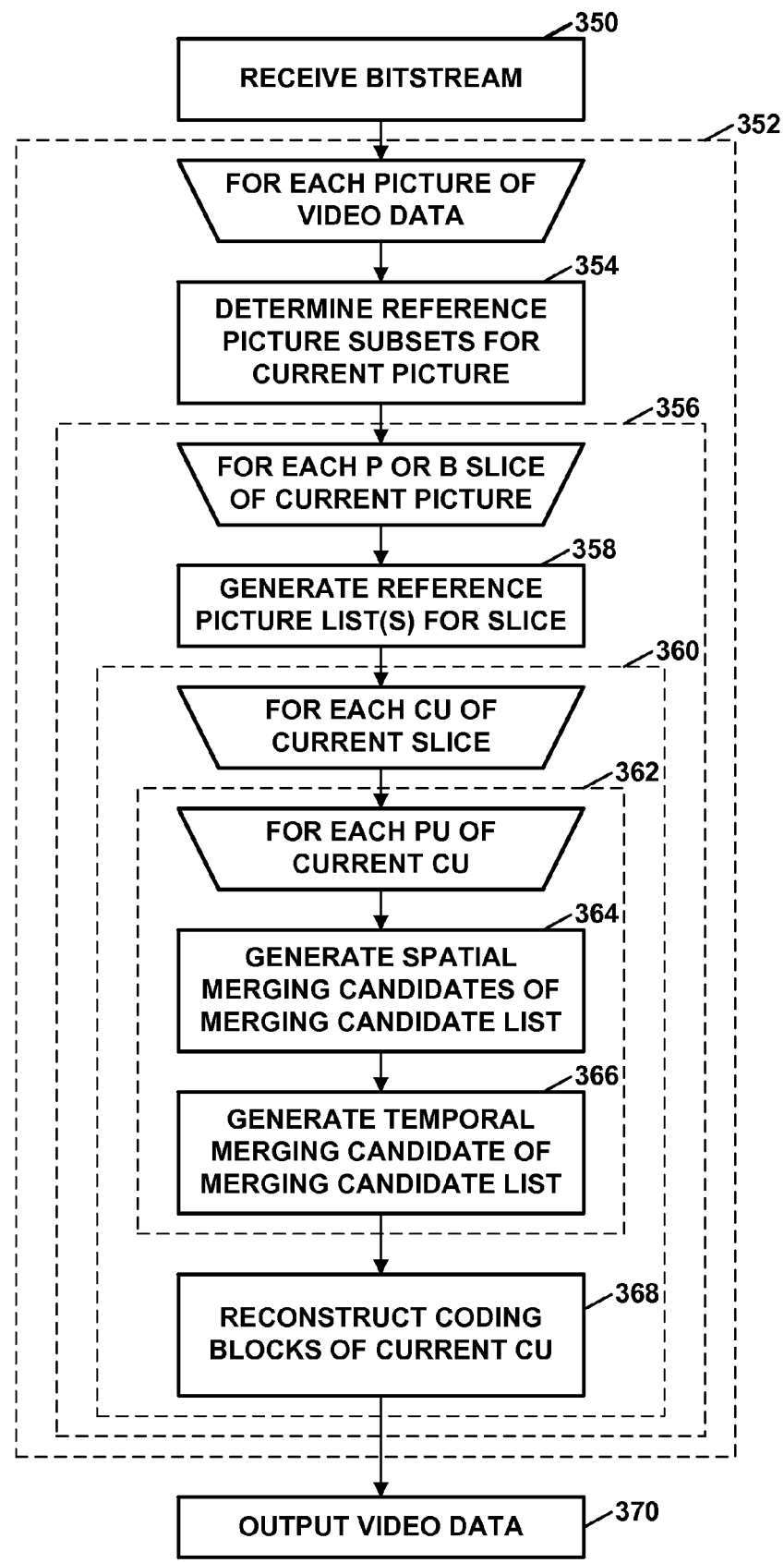
FIG. 12 is a flowchart illustrating an example operation of a video decoder, in accordance with one or more example techniques of this disclosure.

FIG. 12 is a flowchart illustrating an example operation of video decoder 30, in accordance with one or more example techniques of this disclosure. In the example of FIG. 12, video decoder 30 may receive a bitstream that includes an encoded representation of video data (350). Video decoder 30 may perform actions in box 352 for each picture of the video data. In the example of FIG. 12, video decoder 30 may determine reference picture subsets for a current picture (354). Video decoder 30 may perform the actions in box 356 for each P or B slice of the current picture. For instance, video decoder 30 may generate one or more reference picture lists for the current slice (358). Video decoder 30 may perform the actions in box 360 for each CU of the current slice. Furthermore, video decoder 30 may perform the actions in box 362 for each PU of the current CU. In the example of FIG. 12, video decoder 30 may generate spatial merging candidates for a merging candidate list of the current PU (364). In addition, video decoder 30 may generate a temporal merging candidate for the merging candidate list of the current PU (366). Video decoder 30 may generate the temporal merging candidate according to any of the techniques of this disclosure. Furthermore, video decoder 30 may reconstruct coding blocks of the current CU (368). In some instances, video decoder 30 may use the motion information specified by a selected merging candidate in the merging candidate list to reconstruct the coding blocks of the current CU. By reconstructing the coding blocks of the CUs of each slice of each picture, video decoder 30 may reconstruct the video data. Video decoder 30 may output the video data (370).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   generating a particular merging candidate for a merging candidate list, wherein generating the particular merging candidate comprises:
      determining a first reference picture, wherein a predictive block of a co-located prediction unit (PU) is determined based on samples of the first reference picture, wherein the co-located PU is co-located with a current PU and is at a different time instance from the current PU;
      determining a second reference picture, wherein the second reference picture is at a position, within a reference picture list associated with the current PU, indicated by a first reference index value, wherein the first reference index value is a predefined, default value;
      setting a reference index of the particular merging candidate such that the reference index of the particular merging candidate is equal to the first reference index value when the first reference picture and the second reference picture belong to the same type of reference picture and such that the reference index of the particular merging candidate is equal to a second reference index value when the first reference picture and the second reference picture belong to different types of reference pictures, the second reference index value indicating a position, within the reference picture list associated with the current PU, of a third reference picture, the second reference index value being different from the first reference index value, wherein the third reference picture and the first reference picture belong to the same type of reference picture;
      setting a motion vector of the particular merging candidate using a motion vector of the co-located PU;
      determining a selected merging candidate from among a plurality of merging candidates in the merging candidate list;
      determining, based on motion information specified by the selected merging candidate, a predictive block for the current PU; and
      generating, by adding samples of residual data and corresponding samples of the predictive block for the current PU, a reconstructed sample block.

2. The method of claim 1, wherein the first reference index value is equal to 0.

3. The method of claim 1, wherein the third reference picture is an earliest reference picture, within the reference picture list associated with the current PU of the current picture, belonging to the same reference picture type as the first reference picture.

4. The method of claim 1, wherein the second reference index value is signaled in a slice header.

5. The method of claim 1, wherein:
   a reference picture type of the first reference picture is one of: a short-term reference picture type and a long-term reference picture type, and
   a reference picture type of the second reference picture is one of: the short-term reference picture type and the long-term reference picture type.

6. The method of claim 1, wherein:
   a reference picture type of the first reference picture is one of: a temporal reference picture type and a disparity reference picture type, and
   a reference picture type of the second reference picture is one of: the temporal reference picture type and the disparity reference picture type.

7. The method of claim 1, wherein the co-located PU is a PU that covers a center block of a co-located region of a co-located picture or a PU that covers a bottom-right block of the co-located region of the co-located picture, the co-located region being co-located with the current PU.

8. A method of encoding video data, the method comprising:
   generating a particular merging candidate for a merging candidate list, wherein generating the particular merging candidate comprises:
      determining a first reference picture, wherein a predictive block of a co-located prediction unit (PU) is determined based on samples of the first reference picture, wherein the co-located PU is co-located with a current PU and is at a different time instance from the current PU;
      determining a second reference picture, wherein the second reference picture is at a position, within a reference picture list associated with the current PU, indicated by a first reference index value, wherein the first reference index value is a predefined, default value;
      setting a reference index of the particular merging candidate such that the reference index of the particular merging candidate is equal to the first reference index value when the first reference picture and the second reference picture belong to the same type of reference picture and such that the reference index of the particular merging candidate is equal to a second reference index value when the first reference picture and the second reference picture belong to different types of reference pictures, the second reference index value indicating a position, within the reference picture list associated with the current PU, of a third reference picture, the second reference index value being different from the first reference index value, wherein the third reference picture and the first reference picture belong to the same type of reference picture;
      setting a motion vector of the particular merging candidate using a motion vector of the co-located PU;
      determining a selected merging candidate from among a plurality of merging candidates in the merging candidate list; and
      generating a bitstream that includes data that identify the selected merging candidate within the merging candidate list.

9. The method of claim 8, wherein the first reference index value is equal to 0.

10. The method of claim 8, wherein the third reference picture is an earliest reference picture, within the reference picture list associated with the current PU of the current picture, belonging to the same reference picture type as the second first reference picture.

11. The method of claim 8, further comprising signaling the second reference index value in a slice header.

12. The method of claim 8, wherein:
   a reference picture type of the first reference picture is one of: a short-term reference picture type and a long-term reference picture type, and
   a reference picture type of the second reference picture is one of: the short-term reference picture type and the long-term reference picture type.

13. The method of claim 8, wherein:
  a reference picture type of the first reference picture is one of: a temporal reference picture type and a disparity reference picture type, and
  a reference picture type of the second reference picture is one of: the temporal reference picture type and the disparity reference picture type.

14. The method of claim 8, wherein the co-located PU is a PU that covers a center block of a co-located region of a co-located picture or a PU that covers a bottom-right block of the co-located region of the co-located picture, the co-located region being co-located with the current PU.

15. A video coding device comprising:
  a storage medium configured to store video data; and
  one or more processors configured to:
    generate a particular merging candidate for a merging candidate list, wherein the one or more processors are configured such that as part of generating the particular merging candidate, the one or more processors:
    determine a first reference picture, wherein a predictive block of a co-located prediction unit (PU) is determined based on samples of the first reference picture, wherein the co-located PU is co-located with a current PU and is at a different time instance from the current PU;
    determine a second reference picture, wherein the second reference picture is at a position, within a reference picture list associated with the current PU, indicated by a first reference index value, wherein the first reference index value is a predefined, default value;
    setting a reference index of the particular merging candidate such that the reference index of the particular merging candidate is equal to the first reference index value when the first reference picture and the second reference picture belong to the same type of reference picture and such that the reference index of the particular merging candidate is equal to a second reference index value when the first reference picture and the second reference picture belong to different types of reference pictures, the second reference index value indicating a position, within the reference picture list associated with the current PU, of a third reference picture, the second reference index value being different from the first reference index value, wherein the third reference picture and the first reference picture belong to the same type of reference picture;
    set a motion vector of the particular merging candidate using a motion vector of the co-located PU;
    determine a selected merging candidate from among a plurality of merging candidates in the merging candidate list; and
    perform at least one of: encoding the video data and decoding the video data,
      wherein encoding the video data comprises generating a bitstream that includes data that identify the selected merging candidate within the merging candidate list, and
      wherein decoding the video data comprises:
        determining, based on motion information specified by the selected merging candidate, a predictive block for the current PU; and
        generating, by adding samples of residual data and corresponding samples of the predictive block for the current PU, a reconstructed sample block.

16. The video coding device of claim 15, wherein the first reference index value is equal to 0.

17. The video coding device of claim 15, wherein the third reference picture is an earliest reference picture, within the reference picture list associated with the current PU of the current picture, belonging to the same reference picture type as the first reference picture.

18. The video coding device of claim 15, wherein the second reference index value is signaled in a slice header.

19. The video coding device of claim 15, wherein:
  a reference picture type of the first reference picture is one of: a short-term reference picture type and a long-term reference picture type, and
  a reference picture type of the second reference picture is one of: the short-term reference picture type and the long-term reference picture type.

20. The video coding device of claim 15, wherein:
  a reference picture type of the first reference picture is one of: a temporal reference picture type and a disparity reference picture type, and
  a reference picture type of the second reference picture is one of: the temporal reference picture type and the disparity reference picture type.

21. The video coding device of claim 15, wherein the co-located PU is a PU that covers a center block of a co-located region of a co-located picture or a PU that covers a bottom-right block of the co-located region of the co-located picture, the co-located region being co-located with the current PU.

22. A video coding device comprising:
  means for determining a first reference picture, wherein a predictive block of a co-located prediction unit (PU) is determined based on samples of the first reference picture, wherein the co-located PU is co-located with a current PU and is at a different time instance from the current PU;
  means for determining a second reference picture, wherein the second reference picture is at a position, within a reference picture list associated with the current PU, indicated by a first reference index value, wherein the first reference index value is a predefined, default value;
  means for setting a reference index of a particular merging candidate of a merging candidate list such that the reference index of the particular merging candidate is equal to the first reference index value when the first reference picture and the second reference picture belong to the same type of reference picture and such that the reference index of the particular merging candidate is equal to a second reference index value when the first reference picture and the second reference picture belong to different types of reference pictures, the second reference index value indicating a position, within a reference picture list associated with the current PU, of a third reference picture, the second reference index value being different from the first reference index value, wherein the third reference picture and the first reference picture belong to the same type of reference picture;
  means for setting a motion vector of the particular merging candidate using a motion vector of the co-located PU;
  means for determining a selected merging candidate from among a plurality of merging candidates in the merging candidate list; and
  means for performing at least one of: encoding the video data and decoding the video data,
    wherein encoding the video data comprises generating a bitstream that includes data that identify the selected merging candidate within the merging candidate list, and wherein decoding the video data comprises:
    determining, based on motion information specified by the selected merging candidate, a predictive block for the current PU; and
    generating, by adding samples of residual data and corresponding samples of the predictive block for the current PU, a reconstructed sample block.

23. A non-transitory computer-readable storage medium that stores instructions that, when executed, configure to a video coding device to:
    generate a particular merging candidate for a merging candidate list, wherein, as part of configuring the video coding device to generate the particular merging candidate, the instructions configure the video coding device to:
        determine a first reference picture, wherein a predictive block of a co-located prediction unit (PU) is determined based on samples of the first reference picture, wherein the co-located PU is co-located with a current PU and is at a different time instance from the current PU;
        determine a second reference picture, wherein the second reference picture is at a position, within a reference picture list associated with the current PU, indicated by a first reference index value, wherein the first reference index value is a predefined, default value;
        set a reference index of the particular merging candidate such that the reference index of the particular merging candidate is equal to the first reference index value when the first reference picture and the second reference picture belong to the same type of reference picture and such that the reference index of the particular merging candidate is equal to a second reference index value when a first reference picture and a second reference picture belong to different types of reference pictures, the second reference index value indicating a position, within a reference picture list associated with the current PU, of a third reference picture, the second reference index value being different from the first reference index value, wherein the third reference picture and the first reference picture belong to the same type of reference picture;
        set a motion vector of the particular merging candidate using a motion vector of the co-located PU;
    determine a selected merging candidate from among a plurality of merging candidates in the merging candidate list; and
    perform at least one of: encoding the video data and decoding the video data,
        wherein encoding the video data comprises generating a bitstream that includes data that identify the selected merging candidate within the merging candidate list, and
        wherein decoding the video data comprises:
            determining, based on motion information specified by the selected merging candidate, a predictive block for the current PU; and
            generating, by adding samples of residual data and corresponding samples of the predictive block for the current PU, a reconstructed sample block.

24. The non-transitory computer-readable storage medium of claim 23, wherein when the first reference picture and the second reference picture belong to the same reference picture type, the reference index of the temporal merging candidate remains equal to the first reference index value.

25. The video coding device of claim 15, wherein the video coding device comprises at least one of:
    an integrated circuit;
    a microprocessor; or
    a wireless handset.

26. The video coding device of claim 15, further comprising a display configured to display decoded video data.

27. The video coding device of claim 15, further comprising a camera configured to capture the video data.

* * * * *